US012726647B2

(12) United States Patent
Wang

(10) Patent No.: US 12,726,647 B2
(45) Date of Patent: Sep. 1, 2026

(54) ENCODING AND DECODING METHOD, ENCODER, DECODER, AND STORAGE MEDIUM

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 181 days.

(21) Appl. No.: 18/397,430

(22) Filed: Dec. 27, 2023

(65) Prior Publication Data

US 2024/0129512 A1 Apr. 18, 2024

Related U.S. Application Data

(63) Continuation of application No. PCT/CN2021/103306, filed on Jun. 29, 2021.

(51) Int. Cl.
*H04N 19/46* (2014.01)
*H04N 19/176* (2014.01)

(52) U.S. Cl.
CPC ........... *H04N 19/46* (2014.11); *H04N 19/176* (2014.11)

(58) Field of Classification Search
CPC ...... H04N 19/176; H04N 19/70; H04N 19/46; H04N 19/60; H04N 19/61; H04N 19/132; H04N 19/105; H04N 19/157; H04N 19/136; H04N 19/12; H04N 19/117;
(Continued)

(56) References Cited

U.S. PATENT DOCUMENTS 9,860,527 B2 1/2018 Kim
10,785,483 B2 9/2020 Kim
(Continued)

FOREIGN PATENT DOCUMENTS

CN 105993173 A 10/2016
WO 2022217417 A1 10/2022

OTHER PUBLICATIONS

International Search Report in the international application No. PCT/CN2021/103306, mailed on Dec. 24, 2021. 6 pages with English translation.

(Continued)

*Primary Examiner* — Farhan Mahmud
(74) *Attorney, Agent, or Firm* — BAYES PLLC

(57) ABSTRACT

An encoding and decoding method, an encoder, a decoder, and a storage medium. The decoder decodes a bitstream, determines high throughput mode identification information of a current block, and determines, on the basis of the high throughput mode identification information, a coefficient of the current block using at least one of a context mode, a bypass mode, and an alignment process. The decoder determines decoded information, determines the high throughput mode identification information of the current block according to the decoded information, and determines, on the basis of the high throughput mode identification information, the coefficient of the current block using at least one of the context mode, the bypass mode, and the alignment process.

20 Claims, 9 Drawing Sheets

(58) Field of Classification Search

CPC .. H04N 19/119; H04N 19/147; H04N 19/167; H04N 19/126; H04N 19/139; H04N 19/146

See application file for complete search history.

(56) References Cited

U.S. PATENT DOCUMENTS

| | | | | |
|---|---|---|---|---|
| 2013/0223521 | A1* | 8/2013 | Kim | H04N 19/91 375/240.03 |
| 2016/0165234 | A1 | 6/2016 | Kim | |
| 2016/0286215 | A1* | 9/2016 | Gamei | H04N 19/107 |

OTHER PUBLICATIONS

Written Opinion of the International Search Authority in the international application No. PCT/CN2021/103306, mailed on Dec. 24, 2021. 9 pages with English translation.

Joint Video Experts Team (JVET) of ITU-T SG 16 WP 3 and ISO/IEC JTC 1/SC 29, 22nd Meeting, by teleconference, Apr. 20-28, 2021, Document: JVET-V0178-v1, Title: AHG8: a combination of JVET-V0059 option 2 and JVET-V0122 for high bit depth and high bit rate extensions, Source: OPPO. Abstract, text sections 1 and 2. 10 pages.

Joint Video Experts Team (JVET) of ITU-T SG 16 WP 3 and ISO/IEC JTC 1/SC 29, 22nd Meeting, by teleconference, Apr. 20-28, 2021, Document: JVET-V0122-v2, Title: AHG8: a full-bypass mode in residual coding for high bit depth and high bit rate extensions, Source: OPPO. the whole document. 8 pages.

Supplementary European Search Report in the European application No. 21947488.9, mailed on Mar. 20, 2025. 8 pages.

Wang (Oppo) F et al "CE-3.2 a high throughput mode for high bit depth and high bit rate extensions", 135. MPEG Meeting; Jul. 12-Jul. 16, 2021; Online; (Motion Picture Expert Group or ISO/IBC JTC1/SC29/WG11), No. JVET-W0045 ;m57098; JVET-W0045; m57098 Jun. 26, 2021 (Jun. 26, 2021), XP030296626, abstract, section 1.

* cited by examiner

Area with possible non-zero coefficients zeroed out area

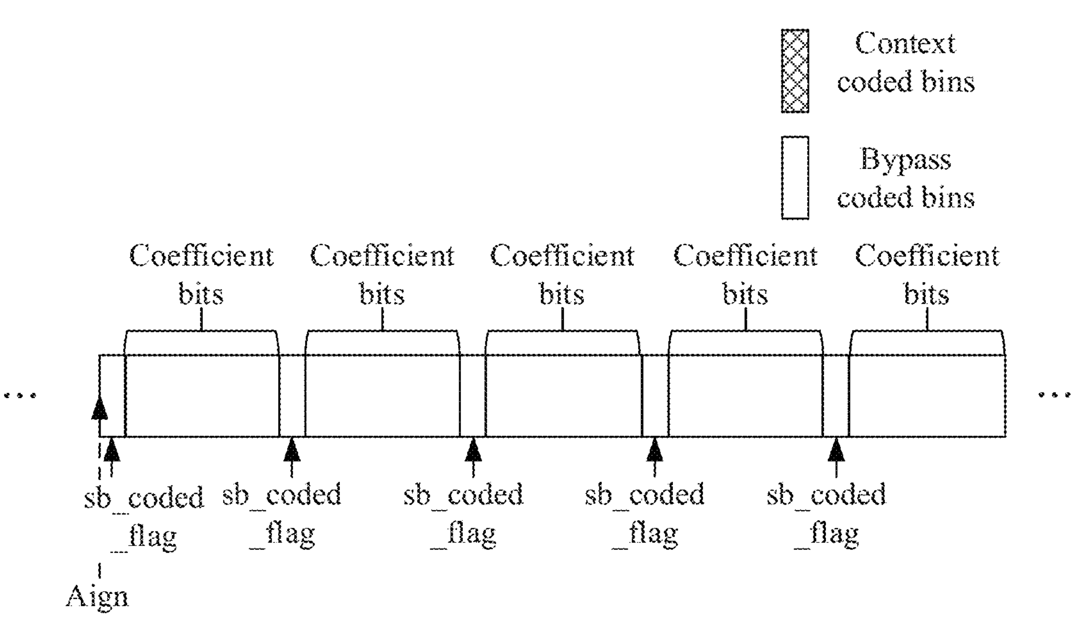
FIG. 13
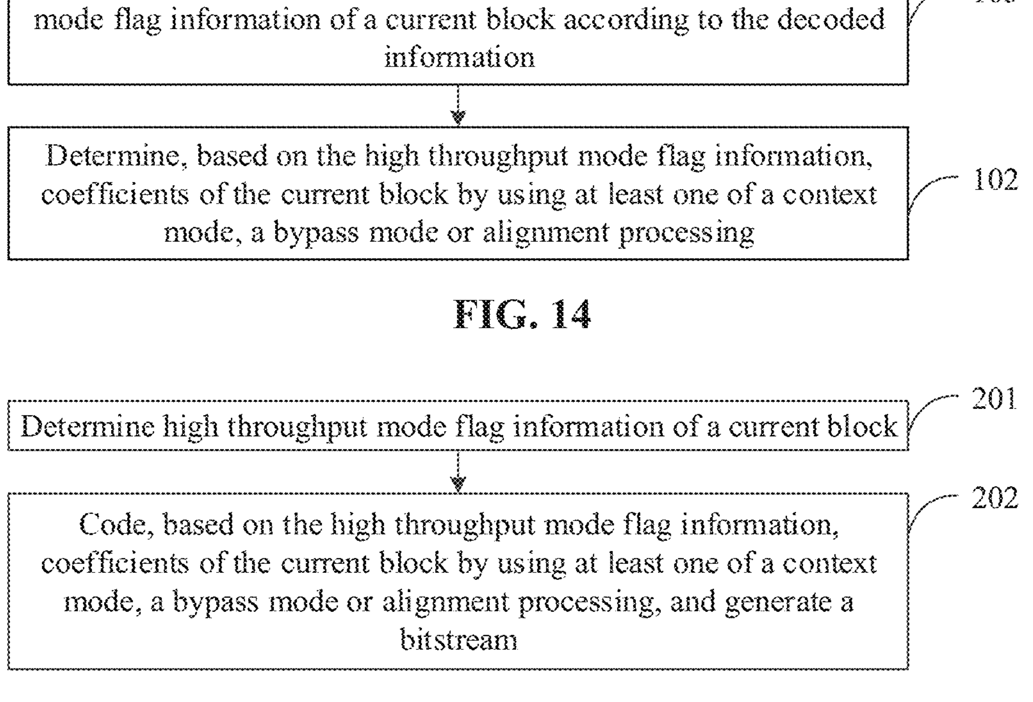
FIG. 14
FIG. 15

ENCODING AND DECODING METHOD, ENCODER, DECODER, AND STORAGE MEDIUM

CROSS REFERENCE TO RELATED APPLICATIONS

This is a continuation of International Application No. PCT/CN2021/103306, filed on Jun. 29, 2021, and entitled "ENCODING AND DECODING METHOD, ENCODER, DECODER, AND STORAGE MEDIUM", the disclosure of which is incorporated herein by reference in its entirety.

TECHNICAL FIELD

Embodiments of the disclosure relate to the technical field of picture processing, and in particular to an encoding method, a decoding method, an encoder, a decoder, and a storage medium.

BACKGROUND

As people's requirements on display quality of videos increase, computer vision-related fields have received more and more attentions. In recent years, picture processing technologies have been successfully applied in various walks of life. For coding and decoding processes of video pictures, at an encoder side, to-be-coded picture data, after being subjected to transform and quantization processing, are compressed and coded by an entropy coding unit, to generate a bitstream, which is transmitted to a decoder side; then the decoder side parses the bitstream, performs inverse quantization and inverse transform processing, and then restores the original input picture data.

At present, compared to coding and decoding of a video with low bit width, low quality and low bit rate (which may be referred to as a "regular video"), during coding and decoding of a video with high bit width, high quality and high bit rate (referred to as a "three-high video"), there are usually more coefficients which need to be coded/decoded, and the coefficients are larger. Therefore, with respect to the three-high video, existing relevant solutions may bring greater overhead, generate waste, and even affect speeds and throughput of coding and decoding.

SUMMARY

Technical solutions of the embodiments of the disclosure may be implemented as follows.

According to a first aspect, an embodiment of the disclosure provides a decoding method, applied to a decoder. The method includes the following operations.

A bitstream is decoded, and high throughput mode flag information of a current block is determined.

Coefficients of the current block are determined based on the high throughput mode flag information, by using at least one of a context mode, a bypass mode or alignment processing.

According to a second aspect, an embodiment of the disclosure provides a decoding method, applied to a decoder. The method includes the following operations.

Decoded information is determined, and high throughput mode flag information of a current block is determined according to the decoded information.

Coefficients of the current block are determined based on the high throughput mode flag information, by using at least one of a context mode, a bypass mode or alignment processing.

According to a third aspect, an embodiment of the disclosure provides an encoding method, applied to an encoder. The method includes the following operations.

High throughput mode flag information of a current block is determined.

Coefficients of the current block are coded based on the high throughput mode flag information, by using at least one of a context mode, a bypass mode or alignment processing, and a bitstream is generated.

According to a fourth aspect, an embodiment of the disclosure provides an encoding method, applied to an encoder. The method includes the following operations.

Decoded information is determined, and high throughput mode flag information of a current block is determined according to the decoded information.

Coefficients of the current block are coded based on the high throughput mode flag information, by using at least one of a context mode, a bypass mode or alignment processing, and a bitstream is generated.

According to a fifth aspect, an embodiment of the disclosure provides a decoder, the decoder includes a decoding part and a first determination part.

The decoding part is configured to decode a bitstream.

The first determination part is configured to determine high throughput mode flag information of a current block, and determine, based on the high throughput mode flag information, coefficients of the current block by using at least one of a context mode, a bypass mode or alignment processing.

According to a sixth aspect, an embodiment of the disclosure provides a decoder, the decoder includes a first determination part.

The first determination part is configured to determine decoded information, determine high throughput mode flag information of a current block according to the decoded information, and determine, based on the high throughput mode flag information, coefficients of the current block by using at least one of a context mode, a bypass mode or alignment processing.

According to a seventh aspect, an embodiment of the disclosure provides an encoder, the encoder includes a second determination part and a coding part.

The second determination part is configured to determine high throughput mode flag information of a current block.

The coding part is configured to code, based on the high throughput mode flag information, coefficients of the current block by using at least one of a context mode, a bypass mode or alignment processing, and generate a bitstream.

According to an eighth aspect, an embodiment of the disclosure provides an encoder, the encoder includes a second determination part and a coding part.

The second determination part is configured to determine decoded information, and determine high throughput mode flag information of a current block according to the decoded information.

The coding part is configured to code, based on the high throughput mode flag information, coefficients of the current block by using at least one of a context mode, a bypass mode or alignment processing, and generate a bitstream.

According to a ninth aspect, an embodiment of the disclosure provides a decoder, the decoder includes a first processor and a first memory storing instructions executable by the first processor. The instructions implement the above coding methods, when the instructions are executed by the first processor.

According to a tenth aspect, an embodiment of the disclosure provides an encoder, the encoder includes a second processor and a second memory storing instructions executable by the second processor. The instructions implement the above decoding methods, when the instructions are executed by the second processor.

According to an eleventh aspect, an embodiment of the disclosure provides a computer storage medium, having stored thereon a computer program. The computer program implements the above decoding methods, when the computer program is executed by a first processor, or, implements the above encoding methods, when the computer program is executed by a second processor.

BRIEF DESCRIPTION OF THE DRAWINGS

FIG. 13 is a schematic diagram of alignment processing in TSRC.

FIG. 14 is a second schematic flowchart of implementation of a decoding method.

FIG. 15 is a first schematic flowchart of implementation of an encoding method.

DETAILED DESCRIPTION

Figure 1:
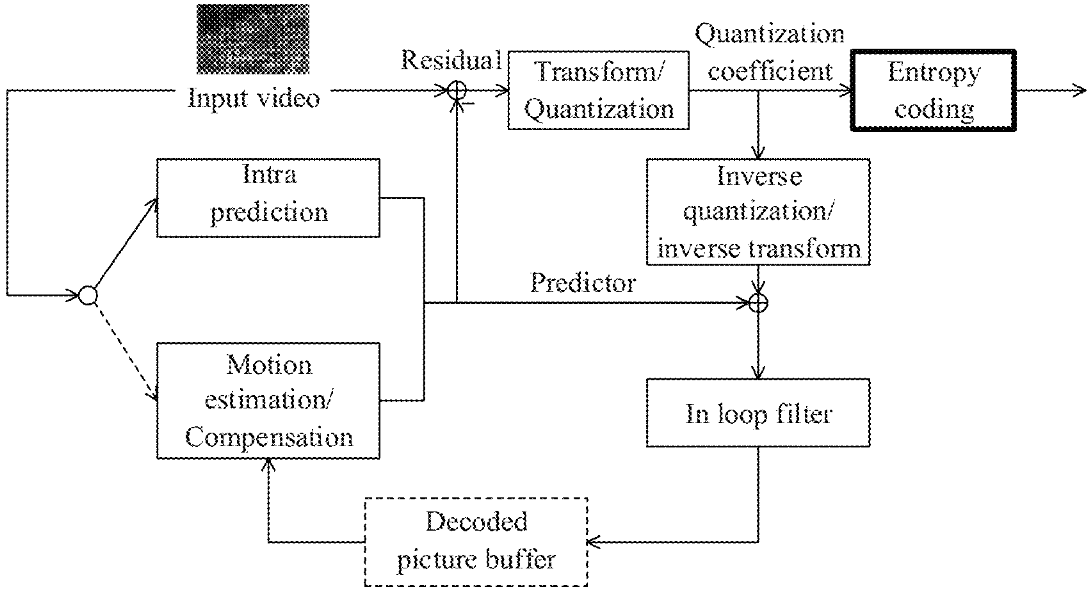
FIG. 1 is a schematic application diagram of a coding framework according to the related art.

The technical solutions in the embodiments of the disclosure will be clearly and completely described below with reference to the drawings in the embodiments of the disclosure. It may be understood that specific embodiments described here are only intended to explain relevant disclosure, rather than limiting the disclosures. Furthermore, it should also be noted that for convenience of descriptions, only parts relevant to the relevant disclosures are shown in the drawings.

In the following descriptions, reference is made to "some embodiments" which describe a subset of all possible embodiments, however, it may be understood that "some embodiments" may be the same or different subsets of all possible embodiments, and may be combined with each other without conflict. It should also be noted that terms "first\second\third" involved in the embodiments of the disclosure are only intended to distinguish similar objects and do not indicate a specific ordering of the objects. It may be understood that specific orders or sequences of "first\second\third" may be interchanged if allowable, so that the embodiments of the disclosure described here may be implemented in an order other than that shown or described here.

At present, commonly used video encoding and decoding standards are based on a block-based hybrid coding framework. Each picture in a video picture is partitioned into square Largest Coding Units (LCUs) or Coding Tree Units (CTUs) of the same size (such as 128×128, 64×64, etc.). Each LCU or CTU may also be partitioned into rectangular Coding Units (CUs) according to a rule; and the CU may also be partitioned into smaller Prediction Units (PUs), Transform Units (TUs), etc.

Specifically, FIG. 1 is a schematic application diagram of a coding framework according to the related art. As shown in FIG. 1, a hybrid coding framework may include a prediction module, a transform module, a quantization module, an entropy coding module, an in loop filter, and other modules. The prediction module may include intra prediction and inter prediction, and the inter prediction may include motion estimation and motion compensation. Since there is a strong correlation between neighbouring pixels within a picture of a video picture, usage of an intra prediction mode in video encoding and decoding technologies may eliminate spatial redundancy between neighbouring pixels. However, since there is also a strong correlation between neighbouring pictures of the video picture, an inter prediction mode is used in video encoding and decoding technologies to eliminate time redundancy between neighbouring pictures, thereby improving encoding and decoding efficiencies.

A basic process of a video codec is as follows. At an encoder side, a picture of picture is partitioned into blocks, intra prediction or inter prediction is applied to a current block to generate a prediction block of the current block, the prediction block is subtracted from an original block of the current block to obtain a residual block, the residual block is transformed and quantized to obtain a quantization coefficient matrix, and the quantization coefficient matrix is entropy-coded and then output to a bitstream. At a decoding side, intra prediction or inter prediction is applied to the current block to generate the prediction block of the current block; on the other hand, the bitstream is decoded to obtain the quantization coefficient matrix, the quantization coefficient matrix is inversely quantized and inversely transformed to obtain the residual block, and the prediction block and the residual block are added to obtain a reconstructed block. The reconstructed block forms a reconstructed picture, and loop filtering is performed on the reconstructed picture based on pictures or blocks, to obtain a decoded picture. The encoding side also needs similar operations to operations of the decoding side to obtain the decoded picture. The decoded picture may be used as a reference picture of inter prediction for subsequent pictures. Block division information, mode or parameter information of prediction, transform, quantization, entropy coding, loop filtering or the like determined by the encoding side need to be output to the bitstream if necessary. The decoding side determines the same block division information, mode or parameter information of prediction, transform, quantization, entropy coding, loop filtering or the like as the encoding side through parsing and analyzing according to existing information, thereby ensuring that the decoded picture obtained at the encoding side is the same as the decoded picture obtained at the decoding side. Usually, the decoded picture obtained at the encoding side is also referred to as the reconstructed picture. The current block may be partitioned into PUs during prediction, and the current block may be partitioned into TUs during transform. Division of PUs may be different from division of TUs. The above is a basic process of the video codec in the block-based hybrid coding framework. With the development of technologies, some modules or steps of the framework or process may be optimized. The embodiments of the disclosure are applicable to the basic process of the video codec in the block-based hybrid coding framework, but are not limited to the framework and process.

The current block may be a current CU, a current PU, or a current TU, etc.

The block division information, various mode and parameter information of prediction, transform and quantization, coefficients, or the like are written into the bitstream through entropy coding. Assuming that probabilities of different elements are different, elements with higher probability of occurrence are assigned with shorter codewords, and elements with lower probability of occurrence are assigned with longer codewords, which achieve higher coding efficiency than fixed-length coding. However, when probabilities of different elements are similar or basically the same, a compression space of entropy coding is limited.

Context-based adaptive binary arithmetic coding (CABAC) is a commonly used entropy coding method. Video compression standards, such as High Efficiency Video Coding (HEVC), Versatile Video Coding (VVC) or the like use CABAC for entropy coding. CABAC uses a context model to improve compression efficiency, however, usage and update of the context model also makes operations more complex. There is a bypass mode in CABAC. In the bypass mode, higher throughput may be achieved without using and updating the context model. In the disclosure, a mode in CABAC where the context model needs to be used and updated may be referred to as a context mode.

Figure 2:
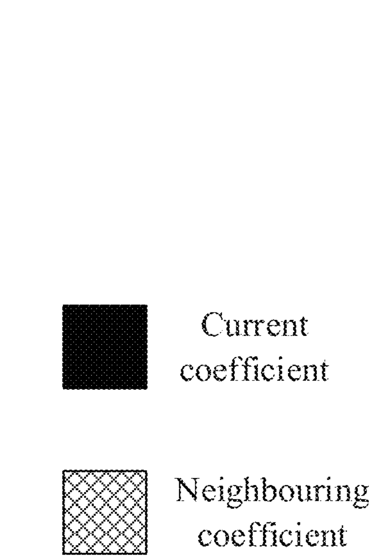
FIG. 2 is a schematic diagram of a positional relationship between a current coefficient and neighbouring coefficients according to the related art.

In general, the context model needs to be determined at first according to a defined method. When an arithmetic decoding process of defined binary symbols is invoked, parameters of the context model may be used as input. Selection of the context model also has dependencies between neighbouring coefficients. For example, FIG. 2 is a schematic diagram of a positional relationship between a current coefficient and neighbouring coefficients according to the related art. In FIG. 2, a black-filled block indicates the current coefficient, and mesh line-filled blocks indicate the neighbouring coefficients; as shown in FIG. 2, which context model selected by sig_coeff_flag of the current coefficient needs to be determined according to information of five coefficients neighbouring to its right edge, bottom edge and bottom right edge. It may be further seen from FIG. 2 that operations of the context mode are much more complicated than operations of the bypass mode, and also have dependencies between neighbouring coefficients.

When an arithmetic coding engine of CABAC needs to use the context mode, the arithmetic coding engine needs to invoke a defined arithmetic decoding process of binary symbols, which includes a state transition process, that is, update of the context model. In the arithmetic decoding process of binary symbols, a renormalization process of an arithmetic decoding engine may be invoked. When using the bypass mode, a bypass decoding process needs to be invoked.

The following is introduced by an example of using CABAC in VVC.

For the arithmetic coding engine of CABAC, inputs to the arithmetic decoding process are ctxTable, ctxIdx, bypassFlag, and state variables ivlCurrRange and ivlOffset of the arithmetic decoding engine, and output of the arithmetic decoding process is a value of a bin.

ctxTable is a table used when the context mode is selected, and ctxIdx is an index of the context model.

Figure 3:
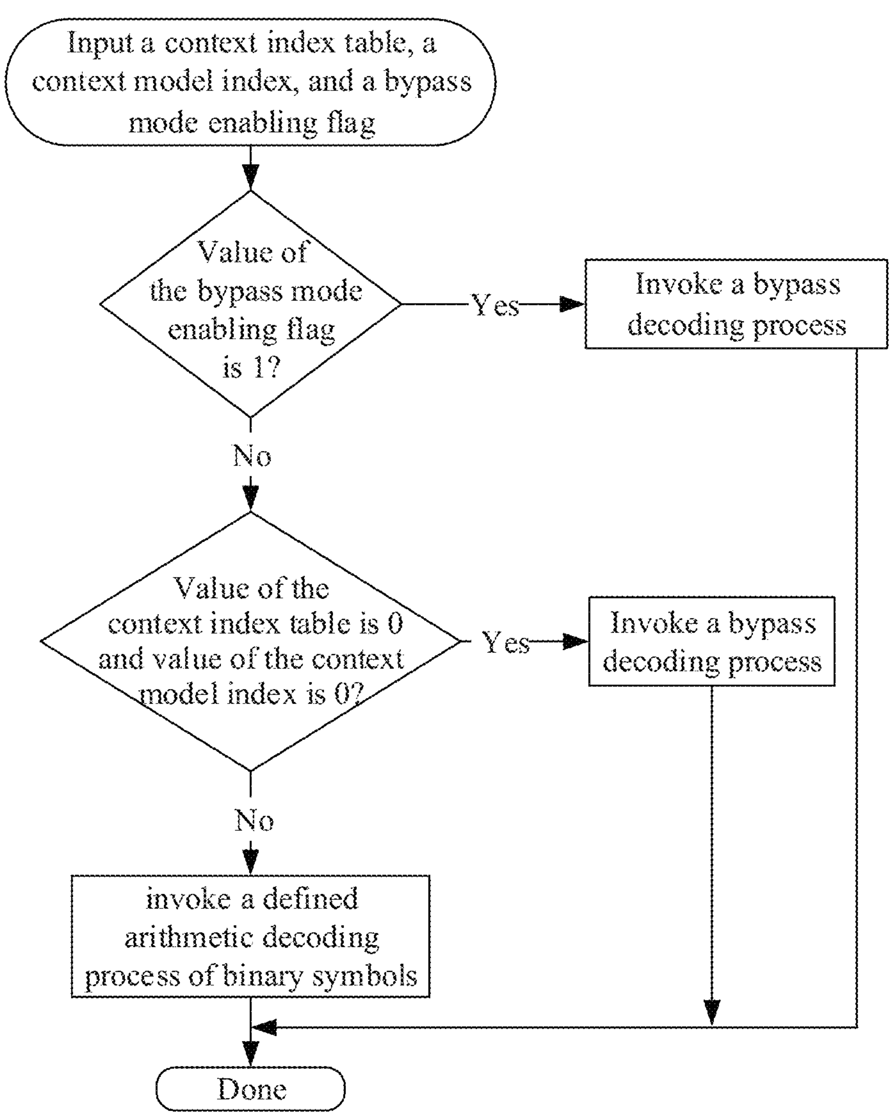
FIG. 3 is a schematic flowchart of an arithmetic decoding process of a bin according to the related art.

FIG. 3 is a schematic flowchart of an arithmetic decoding process of a bin according to the related art. As shown in FIG. 3, in order to decode the value of the bin, a context index table ctxTable, ctxIdx and bypassFlag are passed as inputs to the arithmetic decoding process DecodeBin(ctxTable, ctxIdx, bypassFlag), which is specified as follows.

If bypassFlag is equal to 1, a bypass decoding process DecodeBypass( ) is invoked.

Otherwise, if bypassFlag is equal to 0, ctxTable is equal to 0, and ctxIdx is equal to 0, DecodeTerminate( ) is invoked.

Otherwise (bypassFlag is equal to 0 and ctxTable is not equal to 0), the defined arithmetic decoding process of binary symbols DecodeDecision(ctxTable, ctxIdx) is invoked.

Furthermore, inputs to the arithmetic decoding process of binary symbols are variables ctxTable, ctxIdx, ivlCurrRange and ivlOffset, and outputs of the process are a decoded value binVal, and updated variables ivlCurrRange and ivlOffset.

Figure 4:
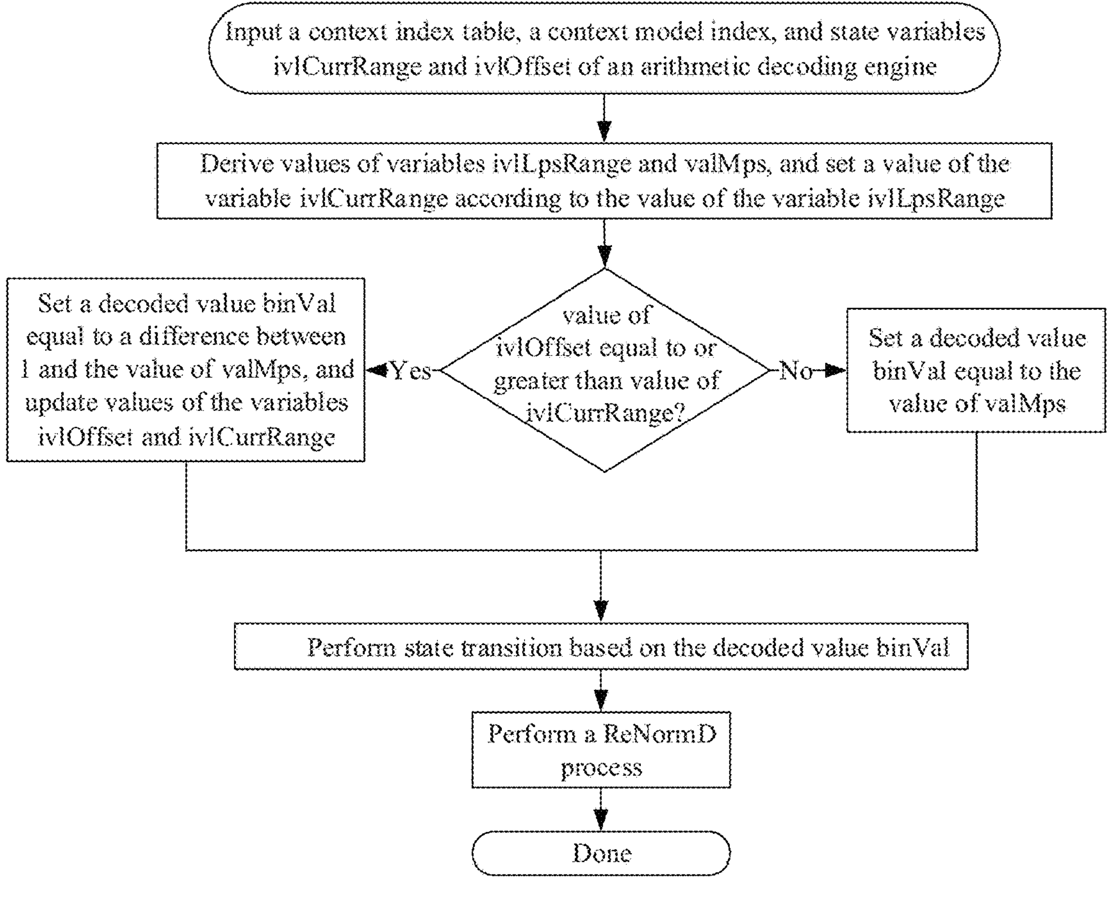
FIG. 4 is a schematic flowchart of an arithmetic decoding process of binary symbols according to the related art.

FIG. 4 is a schematic flowchart of an arithmetic decoding process of binary symbols according to the related art. As shown in FIG. 4, pStateIdx0 and pStateIdx1 are two states of a current context model.

1. Value of a variable ivlLpsRange is derived as follows.

Given a current value of ivlCurrRange, a variable qRangeIdx is derived as follows:

$$qRangeIdx = ivlCurrRange >> 5$$

Given qRangeIdx, pStateIdx0 and pStateIdx1 associated with ctxTable and ctxIdx, valMps and ivlLpsRange are derived as follows:

$$pState = pStateIdx1 + 16 x pStateIdx0$$

$$valMps = pState >> 14$$

$$ivlLpsRange = (qRangeIdx x ((valMps ? 32767 - pState : pState) >> 9) >> 1) + 4.$$

2. The variable ivlCurrRange is set equal to ivlCurrRange−ivlLpsRange, and the following operations are applied.

If ivlOffset is equal to or greater than ivlCurrRange, then the variable binVal is set equal to 1−valMps, ivlOffset is decremented by ivlCurrRange, and ivlCurrRange is set equal to ivlLpsRange.

Otherwise (ivlOffset is less than ivlCurrRange), the variable binVal is set equal to valMps.

Given the value of binVal, a defined state transition is performed. Depending on the current value of ivlCurrRange, a defined renormalization may be performed.

Furthermore, inputs to the state transition process are current pStateIdx0 and pStateIdx1, and a decoded value binVal. Outputs of the process are updated pStateIdx0 and pStateIdx1 of the context variables associated with ctxTable and ctxIdx. Variables shift0 and shift1 are derived from shiftIdx. Correspondences among shiftIdx, ctxTable and ctxIdx are defined here, as follows:

$$shift0=(shiftIdx>>2)+2$$

$$shift1=(shiftIdx \ \& \ 3)+3+shift0.$$

Depending on the decoded value binVal, update of two variables pStateIdx0 and pStateIdx1 associated with ctxTable and ctxIdx is derived as follows:

$$pStateIdx0=pStateIdx0-(pStateIdx0>>shift0)+(1023\times binVal>>shift0)$$

$$pStateIdx1=pStateIdx1-(pStateIdx1>>shift1)+(16383\times binVal>>shift1).$$

Furthermore, inputs to the renormalization process of the arithmetic decoding engine are bits from slice data and variables ivlCurrRange and ivlOffset, and outputs of the process are updated variables ivlCurrRange and ivlOffset.

Figure 5:
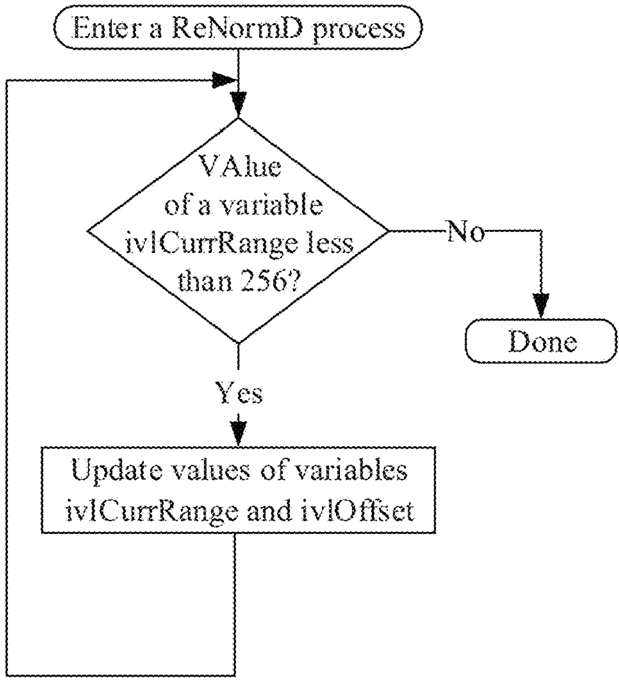
FIG. 5 is a schematic flowchart of renormalization of an arithmetic decoding engine according to the related art.

FIG. 5 is a schematic flowchart of renormalization of an arithmetic decoding engine according to the related art. As shown in FIG. 5, the current value of ivlCurrRange is first compared to 256. Subsequent operations are specified as follows.

If ivlCurrRange is equal to or greater than 256, no renormalization is needed and a RenormD process is finished.

Otherwise (ivlCurrRange is less than 256), a renormalization loop is entered. Within this loop, value of ivlCurrRange is doubled, i.e., left-shifted by 1; value of ivlOffset is doubled, i.e., left-shifted by 1. A single bit is shifted into ivlOffset by using read bits(1).

The bitstream shall not contain data that result in a value of ivlOffset being equal to or greater than ivlCurrRange upon completion of this process.

Furthermore, inputs to the bypass decoding process of binary symbols are bits from slice data and variables ivlCurrRange and ivlOffset, and outputs of the process are the updated variable ivlOffset and the decoded value binVal. The bypass decoding process is invoked when bypassFlag is equal to 1.

Figures 6, 7:
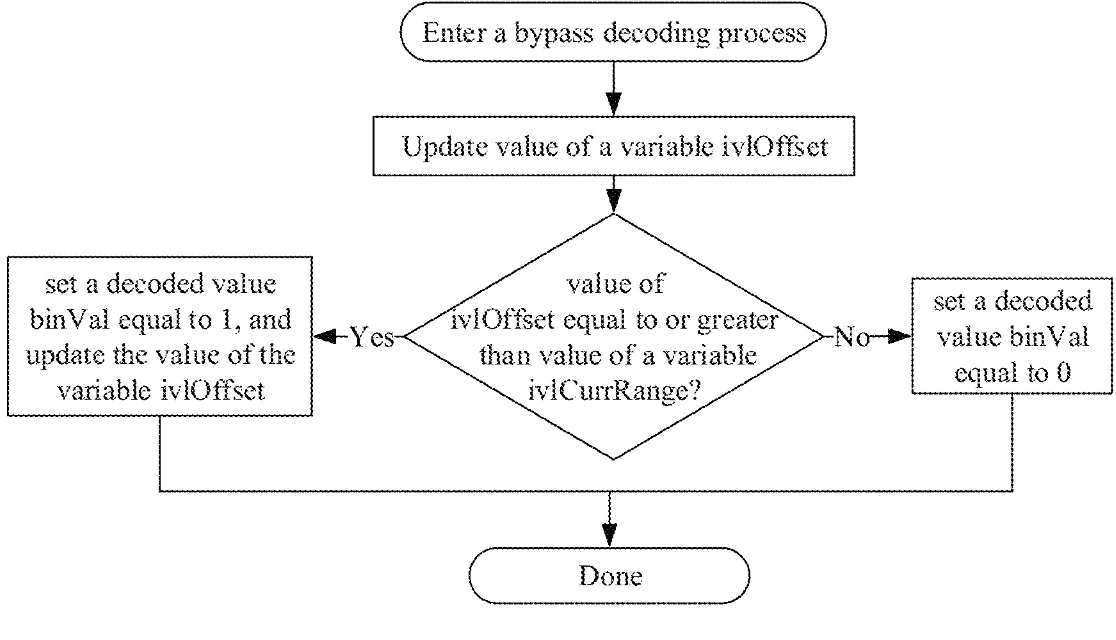
FIG. 6 is a schematic flowchart of a bypass decoding process according to the related art.
FIG. 7 is a schematic diagram of a positional relationship between an area with possible non-zero coefficients and a zeroed-out area.

FIG. 6 is a schematic flowchart of a bypass decoding process according to the related art. As shown in FIG. 6, at first, value of ivlOffset is doubled, i.e., left-shifted by 1. A single bit is shifted into ivlOffset by using read bits(1). Then, the value of ivlOffset is compared to the value of ivlCurrRange. Subsequent operations are specified as follows.

If ivlOffset is equal to or greater than ivlCurrRange, the value of binVal is set equal to 1, and ivlOffset is decremented by CurrRange.

Otherwise (ivlOffset is less than ivlCurrRange), the value of binVal is set equal to 0.

The bitstream shall not contain data that result in a value of ivlOffset being equal to or greater than ivlCurrRange upon completion of this process.

It should also be understood that in existing video encoding and decoding standards, one or more transforms and transform skips are usually supported by residuals. The transforms include Discrete Cosine Transform (DCT), etc. The residual block after the transform (and quantization) usually has certain characteristics. For example, energies are mostly concentrated in a low-frequency area after some transform (and quantization), so that coefficients at the area of the upper left corner are larger, and coefficients at the area of the lower right corner are smaller and even many zero coefficients. The transform skip, as its name implies, does not perform transform. A distribution rule of coefficients after the transform skip is different from that of coefficients after the transform, and therefore different coefficient coding methods may be used. For example, in VVC, Regular Residual Coding (RRC) is used for coefficients after the transform skip, and Transform Skip Residual Coding (TSRC) is used for coefficients after the transform skip.

In a general transform such as DCT transform, transformed blocks indicate low to high frequencies from left to right, and indicate low to high frequencies from top to bottom. The upper left corner indicates low frequency and the lower right corner indicates high frequency. Human eyes are more sensitive to low-frequency information, while are not very sensitive to high-frequency information. With this property, some high-frequency information are processed more or removed, which has less visual impact. Some technologies such as zero-out, may zero out certain high-frequency information (i.e., force certain high-frequency information to be equal to 0). For example, for a 64×64 block, coefficients at positions where abscissae are equal to or greater than 32, or ordinates are equal to or greater than 32 are zeroed out. The above is just a simple example. There may be more complex deriving methods in the scope of zero-out, which are not elaborated here. FIG. 7 is a schematic diagram of a positional relationship between areas with possible non-zero coefficients and zeroed-out areas. As shown in FIG. 7, there may be non-zero coefficients at parts of the upper left corner (that is, there may be areas with non-zero coefficients), and all parts at the lower right corner are set to 0 (that is, zeroed-out areas). In this way, when coding subsequent coefficients, coefficients in zeroed out areas do not need to be coded since they are definitely 0.

Furthermore, since after transforming (and quantizing) residuals of a normal video, distribution of coefficients has a characteristics that coefficients at the upper left corner are larger and many coefficients at the lower right corner are 0, some methods are usually used for coding the coefficients, so that coefficients within a certain range of the upper left corner need to be coded, while coefficients within a certain range of the lower right corner do not need to be coded, that is, these coefficients are equal to 0 by default. One method is to first determine a position of a last non-zero coefficient of a block in a scanning order when coding coefficients of the block. After the position is determined, all the coefficients following the position of the last non-zero coefficient in the scanning order are considered to be equal to 0, that is, do not need to be coded; only the last non-zero coefficient and coefficients therebefore need to be coded. For example, in VVC, last_sig_coeff_x_prefix, last_sig_coeff_y_prefix, last_sig_coeff_x_suffix and last_sig_coeff_y_suffix are used to determine the position of the last non-zero coefficient (LastSignificantCoeffX, LastSignificantCoeffY).

(a) last_sig_coeff_x_prefix specifies the prefix of the horizontal (or column) coordinate of the last non-zero coefficient in the scanning order within a current block. Values of last_sig_coeff_x_prefix shall be in a range of 0 to (log 2ZoTbWidth<<1)−1, inclusive.

When last_sig_coeff_x_prefix is not present, it is inferred to be 0.

(b) last_sig_coeff_y_prefix specifies the prefix of the vertical (or row) coordinate of the last non-zero coefficient in the scanning order within a current block. Values of last_sig_coeff_x_prefix shall be in a range of 0 to (log 2ZoTbHeight<<1)−1, inclusive.

When last_sig_coeff_y_prefix is not present, it is inferred to be 0.

(c) last_sig_coeff_x_suffix specifies the suffix of the horizontal (or column) coordinate of the last non-zero coefficient in the scanning order within a current block. Values of last_sig_coeff_x_suffix shall be in a range of 0 to (1<<((last_sig_coeff_x_prefix>>1)−1))−1, inclusive.

A value LastSignificantCoeffX of the horizontal (or column) coordinate of the last non-zero coefficient in the scanning order within a current Transform Block (TB) is derived as follows.

If last_sig_coeff_x_suffix is not present, the following applies:

$$LastSignificantCoeffX = last\_sig\_coeff\_x\_prefix.$$

Otherwise (last_sig_coeff_x_suffix is present), the following applies:

$$LastSignificantCoeffX = (1>>((last\_sig\_coeff\_x\_prefix>>1)-1))\times(2+(last\_sig\_coeff\_x\_prefix \ \& \ 1)) + last\_sig\_coeff\_x\_suffix.$$

(d) last_sig_coeff_y_suffix specifies the suffix of the vertical (or row) coordinate of the last non-zero coefficient in the scanning order within a current TB. Values of last_sig_coeff_y_suffix shall be in a range of 0 to (1>>((last_sig_coeff_y_prefix>>1)−1))−1, inclusive.

A value LastSignificantCoeffY of the vertical (or row) coordinate of the last non-zero coefficient in the scanning order within a current TB is derived as follows.

If last_sig_coeff_y_suffix is not present, the following applies:

$$LastSignificantCoeffY = last\_sig\_coeff\_y\_prefix.$$

Otherwise (last_sig_coeff_y_suffix is present), the following applies:

$$LastSignificantCoeffY = (1>>((last\_sig\_coeff\_y\_prefix>>1)-1))\times(2+(last\_sig\_coeff\_y\_prefix \ \& \ 1)) + last\_sig\_coeff\_y\_suffix.$$

Further, the last non-zero coefficient and coefficients therebefore all need to be coded. However, in a regular video, even among these coefficients, a certain proportion of the coefficients are still 0, a flag sb_coded_flag indicating whether to code a current subblock is used in VVC, to determine whether coefficients in the current subblock need to be coded. If the coefficients do not need to be coded, all the coefficients in the current subblock are considered to be 0. Here, the subblock is usually an n×n subblock, such as a 4×4 subblock.

sb_coded_flag[xS][yS] specifies the following information for a subblock at a location (xS, yS) within the current TB, here a subblock is an array of transform coefficient levels:

When sb_coded_flag[xS][yS] is equal to 0, all transform coefficient levels of the subblock at the location (xS, yS) within the current TB are inferred to be equal to 0;

When sb_coded_flag[xS][yS] is not present, it is inferred to be equal to 1.

Further, when coding the coefficients is processed, compression efficiency may be improved by using characteristics of the coefficients. For example, in a regular video, a certain proportion of the coefficients which need to be coded are 0, and therefore a syntax element may be used to indicate whether the current coefficient is equal to 0, and the syntax element is usually a binary symbol. When the current coefficient is equal to 0, it indicates that coding of the current coefficient is finished; otherwise, coding of the current coefficient needs to continue. For another example, in a regular video, absolute values of a certain proportion of the non-zero coefficients are 1, and therefore a syntax element may be used to indicate whether the absolute value of the current coefficient is greater than 1, and the syntax element is usually a binary symbol. When the absolute value of the current coefficient is not greater than 1, it indicates that coding of the current coefficient is finished; otherwise, coding of the current coefficient needs to continue. For example, syntax elements involved in VVC are as follows.

sig_coeff_flag[xC][yC] specifies for a transform coefficient location (xC, yC) within the current TB whether a corresponding transform coefficient level at the location (xC, yC) is non-zero as follows.

If sig_coeff_flag[xC][yC] is equal to 0, the transform coefficient level at the location (xC, yC) is set equal to 0.

Otherwise (sig_coeff_flag[xC][yC] is equal to 1), the transform coefficient level at the location (xC, yC) has a non-zero value.

If sig_coeff_flag[xC][yC] is not present, it is inferred as follows.

If transform skip flag[x0][y0][cIdx] is equal to 0 or sh_ts_residual_coding_disabled_flag is equal to 1:

If (xC, yC) is the position of the last non-zero coefficient in the scanning order (LastSignificantCoeffX, LastSignificantCoeffY) or all the following conditions are true, sig_coeff_flag[xC][yC] is inferred to be equal to 1:

$$(xC\&((1<<\log 2SbW)-1), yC\&((1<<\log 2SbH)-1)) \text{ is equal to } (0,0);$$

inferSbDcSigCoeffFlag is equal to 1;

sb_coded_flag[xS][yS] is 1;

Otherwise, sig_coeff_flag[xC][yC] is inferred to be equal to 0;

Otherwise (transform skip flag[x0][y0][cIdx] is equal to 1 and sh_ts_residual_coding_disabled_flag is equal to 0):

If all the following conditions are true, sig_coeff_flag[xC][yC] is inferred to be equal to 1:

$$(xC\&((1<<\log 2SbW)-1), yC\&((1<<\log 2SbH)-1)) \text{ is equal to } ((1<<\log 2SbW)-1, (1<<\log 2SbH)-1);$$

inferSbSigCoeffFlag is equal to 1;

sb_coded_flag[xS][yS] is equal to 1;

Otherwise, sig_coeff_flag[xC][yC] is inferred to be equal to 0.

abs_level_gtx_flag[n][j] specifies whether the absolute value of the transform coefficient level (at position n in the scanning order) is greater than (j<<1)+1. When abs_level_gtx_flag[n][j] is not present, it is inferred to be equal to 0.

In this way, when coding of the current coefficient is not finished after processing the above flags (or syntax elements), then a remaining value of the absolute value of the coefficient needs to be coded, such as abs_remainder in VVC.

abs_remainder[n] specifies a remaining absolute value of a transform coefficient level that is coded with Golomb-Rice code at the scanning position n. When abs_remainder[n] is not present, it is inferred to be equal to 0.

Furthermore, in VVC, syntax elements such as sig_coeff_flag, abs_level_gtx_flag, or the like are coded by using the context mode, while abs_remainder is coded by using the bypass mode. As mentioned above, the context mode coding is more complex than the bypass mode coding, of which an intuitive understanding is that it is slower to perform the context mode coding. When there are many coefficients which need to be coded, over usage of the context mode coding may affect decoding speeds. Therefore, the number of syntax elements to be coded by using the context mode may be limited. For example, if the number of binary symbols to be coded by using the context mode exceeds a threshold, coding of subsequent coefficients are forced to be done by using the bypass mode, such as dec_abs_level in VVC.

dec_abs_level[n] is an intermediate value that is coded with Golomb-Rice code at the scanning position n. Given ZeroPos[n] that is derived during the parsing of dec_abs_level[n], an absolute value of a quantization coefficient level at location (xC, yC) AbsLevel[xC][yC] is derived as follows.

If dec_abs_level[n] is not present or is equal to ZeroPos[n], AbsLevel[xC][yC] is set equal to 0.

Otherwise, if dec_abs_level[n] is less than ZeroPos[n], AbsLevel[xC][yC] is set equal to dec_abs_level[n]+1.

Otherwise (dec_abs_level[n] is greater than ZeroPos[n]), AbsLevel[xC][yC] is set equal to dec_abs_level[n].

All values involved as above are absolute values of coefficients. A sign of a non-zero coefficient may be determined by using a sign flag coeff_sign_flag of the coefficient or some sign-derived methods. coeff_sign_flag[n] may specify the sign of a transform coefficient level for the scanning position n as follows.

If coeff_sign_flag[n] is equal to 0, the corresponding transform coefficient level has a positive value.

Otherwise (coeff_sign_flag[n] is equal to 1), the corresponding transform coefficient level has a negative value.

When coeff_sign_flag[n] is not present, it is inferred to be equal to 0. The value of CoeffSignLevel[xC][yC] specifies the sign of a transform coefficient level at the location (xC, yC) as follows.

If CoeffSignLevel[xC][yC] is equal to 0, the corresponding transform coefficient level is equal to zero.

Otherwise, if CoeffSignLevel[xC][yC] is equal to 1, the corresponding transform coefficient level has a positive value.

Otherwise (CoeffSignLevel[xC][yC] is equal to −1), the corresponding transform coefficient level has a negative value.

It should also be noted that CoeffSignLevel[xC][yC] may also be derived by using some other methods, which are not elaborated here.

Furthermore, a parity flag par_level_flag of value of a coefficient is also used in VVC. Parity of the value of the current coefficient may be known from the flag, which may be used in determining the value of the current coefficient and Dependent Quantization (DQ).

par_level_flag[n] specifies the parity of the transform coefficient level at scanning position n. When par_level_flag[n] is not present, it is inferred to be equal to 0.

In addition to determining the parity of the transform coefficient, par_level_flag may also be used to determine size of the coefficient together with abs_level_gtx_flag, abs_remainder, etc.

Here, the context mode coding needs to select, use and update the context mode, and the bypass mode coding does not need to select, use and update the context mode, and therefore a usual practice is to put syntax elements to be coded by using the context mode together and put syntax elements to be coded by using the bypass mode together within a certain range, so that it is more friendly to hardware design. For example, all the syntax elements to be coded by using the context mode within a block are processed first, and then the syntax elements to be coded by using the bypass mode are processed. All the syntax elements to be coded by using the context mode within the current block may also be partitioned into several groups, and all the syntax elements to be coded by using the bypass mode within a block may also be partitioned into several groups.

In a specific example, specific syntax of RRC is shown in Table 1 below.

TABLE 1

| | Descriptor |
|---|---|
| residual_coding( x0, y0, log2TbWidth, log2TbHeight, cIdx ) { | |
| if( sps_mts_enabled_flag && cu_sbt_flag && cIdx = = 0 && log2TbWidth = = 5 && log2TbHeight < 6 ) | |
| log2ZoTbWidth = 4 | |
| Else | |
| log2ZoTbWidth = Min( log2TbWidth, 5 ) | |
| if( sps_mts_enabled_flag && cu_sbt_flag && cIdx = = 0 && log2TbWidth < 6 && log2TbHeight = = 5 ) | |
| log2ZoTbHeight = 4 | |
| Else | |
| log2ZoTbHeight = Min( log2TbHeight, 5 ) | |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2TbWidth = log2ZoTbWidth | |
| log2TbHeight = log2ZoTbHeight | |
| remBinsPass1 = ( ( 1 << ( log2TbWidth + log2TbHeight ) ) * 7 ) >> 2 | |
| log2SbW = ( Min( log2TbWidth, log2TbHeight ) < 2 ? 1 : 2 ) | |
| log2SbH = log2SbW | |
| if( log2TbWidth + log2TbHeight > 3 ) | |
| if( log2TbWidth < 2 ) { | |
| log2SbW = log2TbWidth | |
| log2SbH = 4 − log2SbW | |
| } else if( log2TbHeight < 2 ) { | |
| log2SbH = log2TbHeight | |

TABLE 1-continued

| | Descriptor |
|---|---|
| log2SbW = 4 − log2SbH | |
| } | |
| numSbCoeff = 1 << ( log2SbW + log2SbH ) | |
| lastScanPos = numSbCoeff | |
| lastSubBlock = ( | |
| 1 << ( log2TbWidth + log2TbHeight − ( log2SbW + log2SbH ) ) ) − 1 | |
| HistValue = sps_persistent_rice_adaptation_enabled_flag ? | |
| ( 1 << StatCoeff[ cIdx ] ) : 0 | |
| updateHist = sps_persistent_rice_adaptation_enabled_flag ? 1 : 0 | |
| do { | |
| if( lastScanPos = = 0 ) { | |
| lastScanPos = numSbCoeff | |
| lastSubBlock− − | |
| } | |
| lastScanPos− − | |
| xS = | |
| DiagScanOrder[ log2TbWidth − log2SbW ][ log2TbHeight − log2SbH ] | |
| [ lastSubBlock ][ 0 ] | |
| yS = | |
| DiagScanOrder[ log2TbWidth − log2SbW ][ log2TbHeight − log2SbH ] | |
| [ lastSubBlock ][ 1 ] | |
| xC = ( xS << log2SbW ) + | |
| DiagScanOrder[ log2SbW ][ log2SbH ][ lastScanPos ][ 0 ] | |
| yC = ( yS << log2SbH ) + | |
| DiagScanOrder[ log2SbW ][ log2SbH ][ lastScanPos ][ 1 ] | |
| } while( ( xC != LastSignificantCoeffX ) \|\| (yC != | |
| LastSignificantCoeffY ) ) | |
| if( lastSubBlock = = 0 && log2TbWidth >= 2 && log2TbHeight >= 2 | |
| && | |
| !transform_skip_flag[ x0 ][ y0 ][ cIdx ] && lastScanPos > 0 ) | |
| LfnstDcOnly = 0 | |
| if( ( lastSubBlock > 0 && log2TbWidth >= 2 && log2TbHeight >= 2 ) | |
| \|\| | |
| ( lastScanPos > 7 && ( log2TbWidth = = 2 \|\| log2TbWidth = = 3 ) | |
| && | |
| log2TbWidth = = log2TbHeight ) ) | |
| LfnstZeroOutSigCoeffFlag = 0 | |
| if( ( lastSubBlock > 0 \|\| lastScanPos > 0 ) && cIdx = = 0 ) | |
| MtsDcOnly = 0 | |
| QState = 0 | |
| for( i = lastSubBlock; i >= 0; i− − ) { | |
| startQStateSb = QState | |
| xS = | |
| DiagScanOrder[ log2TbWidth − log2SbW ][ log2TbHeight − log2SbH ] | |
| [ i ][ 0 ] | |
| yS = | |
| DiagScanOrder[ log2TbWidth − log2SbW ][ log2TbHeight − log2SbH ] | |
| [ i ][ 1 ] | |
| inferSbDcSigCoeffFlag = 0 | |
| if( i < lastSubBlock && i > 0 ) { | |
| sb_coded_flag[ xS ][ yS ] | ae(v) |
| inferSbDcSigCoeffFlag = 1 | |
| } | |
| if( sb_coded_flag[ xS ][ yS ] && ( xS > 3 \|\| yS > 3 ) && cIdx = = 0 ) | |
| MtsZeroOutSigCoeffFlag = 0 | |
| firstSigScanPosSb = numSbCoeff | |
| lastSigScanPosSb = −1 | |
| firstPosMode0 = ( i = = lastSubBlock ? lastScanPos : numSbCoeff − 1 ) | |
| firstPosMode1 = firstPosMode0 | |
| for( n = firstPosMode0; n >= 0 && remBinsPass1 >= 4; n− − ) { | |
| xC = (xS << log2SbW ) + | |
| DiagScanOrder[ log2SbW ][ log2SbH ][ n ][ 0 ] | |
| yC = ( yS << log2SbH ) + | |
| DiagScanOrder[ log2SbW ][ log2SbH ][ n ][ 1 ] | |
| if( sb_coded_flag[ xS ][ yS ] && ( n > 0 \|\| !inferSbDcSigCoeffFlag ) | |
| && | |
| ( xC != LastSignificantCoeffX \|\| yC != LastSignificantCoeffY ) | |
| ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if( sig_coeff_flag[ xC ][ yC ] ) { | |
| abs level_gtx_flag[ n ][ 0 ] | ae(v) |
| remBinsPass1− − | |
| if( abs_level_gtx_flag[ n ][ 0 ] ) { | |

TABLE 1-continued

```
                                                                  Descriptor
          par__level__flag[ n ]                                   ae(v)
          remBinsPass1− −
          abs__level__gtx__flag[ n ][ 1 ]                         ae(v)
          remBinsPass1− −
        }
        if( lastSigScanPosSb = = −1 )
          lastSigScanPosSb = n
        firstSigScanPosSb = n
      }
      AbsLevelPass1[ xC ][ yC ] = sig__coeff__flag[ xC ][ yC ] +
par__level__flag[ n ] +
          abs__level__gtx__flag[ n ][ 0 ] + 2 * abs__level__gtx__flag[ n ][ 1 ]
      if( sh__dep__quant__used__flag )
        QState = QStateTransTable[ QState ][ AbsLevelPass1[ xC ][ yC ] &
1 ]
      firstPosMode1 = n − 1
    }
    for( n = firstPosMode0; n > firstPosMode1; n− − ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      if( abs__level__gtx__flag[ n ][ 1 ] ) {
        abs__remainder[ n ]                                       ae(v)
        if( updateHist & & abs__remainder [ n ] > 0 ) {
          StatCoeff[ cIdx ] = (StatCoeff[ cIdx ] +
            Floor( Log2( dec__abs__level[ n ] ) ) + 2) >> 1
          updateHist = 0
        }
      }
      AbsLevel[ xC ][ yC ] = AbsLevelPass1[ xC ][ yC ]
+2 * abs__remainder[ n ]
    }
    for( n = firstPosMode1; n >= 0; n− − ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      if( sb__coded__flag[ xS ][ yS ] ) {
        dec__abs__level[ n ]                                      ae(v)
        if( updateHist & & dec__abs__level[ n ] > 0 ) {
          StatCoeff[ cIdx ] = (StatCoeff[ cIdx ] +
            Floor( Log2(dec__abs__level[ n ] ) ) ) >> 1
          updateHist = 0
        }
      }
      if( AbsLevel[ xC ][ yC ] > 0 ) {
        if( lastSigScanPosSb = = −1 )
          lastSigScanPosSb = n
        firstSigScanPosSb = n
      }
      if( sh__dep__quant__used__flag )
        QState = QStateTransTable[ QState ][ AbsLevel[ xC ][ yC ] & 1 ]
    }
    signHiddenFlag = sh__sign__data__hiding__used__flag &&
        ( lastSigScanPosSb − firstSigScanPosSb > 3 ? 1 : 0 )
    for( n = numSbCoeff − 1; n >= 0; n− − ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      if( ( AbsLevel[ xC ][ yC ] > 0 ) &&
        ( !signHiddenFlag || ( n != firstSigScanPosSb ) ) )
        coeff__sign__flag[ n ]                                    ae(v)
    }
    if( sh__dep__quant__used__flag ) {
      QState = startQStateSb
      for( n = numSbCoeff − 1; n >= 0; n− − ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( AbsLevel[ xC ][ yC ] > 0 )
          TransCoeffLevel[ x0 ][ y0 ][ cIdx ][ xC ][ yC ] =
              ( 2 * AbsLevel[ xC ][ yC ] − ( QState > 1 ? 1 : 0 ) ) *
              ( 1 − 2 * coeff__sign__flag[ n ] )
        QState = QStateTransTable[ QState ][ AbsLevel[ xC ][ yC ] & 1 ]
      }
```

TABLE 1-continued

| | Descriptor |
|---|---|

```
    } else {
      sumAbsLevel = 0
      for( n = numSbCoeff − 1; n >= 0; n− − ) {
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( AbsLevel[ xC ][ yC ] > 0 ) {
          TransCoeffLevel[ x0 ][ y0 ][ cIdx ][ xC ][ yC ] =
              AbsLevel[ xC ][ yC ] * ( 1 − 2 * coeff_sign_flag[ n ] )
          if( signHiddenFlag ) {
            sumAbsLevel += AbsLevel[ xC ][ yC ]
            if( n = = firstSigScanPosSb && sumAbsLevel % 2 = = 1 )
              TransCoeffLevel[ x0 ][ y0 ][ cIdx ][ xC ][ yC ] =
                  −TransCoeffLevel[ x0 ][ y0 ][ cIdx ][ xC ][ yC ]
          }
        }
      }
    }
  }
}
```

The array AbsLevel[xC][yC] indicates an array of absolute values of transform coefficients of the current TB. The array AbsLevelPass1[xC][yC] indicates an array of partially reconstructed absolute values of the transform coefficients of the current TB. Indices xC and yC of the array indicate a (xC, yC) position in the current TB.

After entering a function residual_coding(x0, y0, log 2TbWidth, log 2TbHeight, cIdx), size information of some blocks need to be determined, for example, logarithms log 2ZoTbWidth and log 2ZoTbHeight of the size of the zeroed-out block are determined, coefficients with abscissae in a range [0, (1<<log 2ZoTbWidth)−1] and ordinates in a range [0, (1<<log 2ZoTbHeight)−1] may be non-zero coefficients. (1<<log 2ZoTbWidth) indicates a width of zeroed-out TB, and (1<<log 2ZoTbHeight) indicates a height of zeroed-out TB. Then, the position of the last non-zero coefficient is determined according to last_sig_coeff_x_prefix, last_sig_coeff_y_prefix, last_sig_coeff_x_suffix, last_sig_coeff_y_suffix, etc. Coefficients before the last non-zero coefficient in the scanning order may be non-zero coefficients. Then, the value of remBinsPass1 is determined, that is, by using an equation remBinsPass1=((1<<(log 2TbWidth+log 2TbHeight))×7)>>2. A number of syntax elements to be coded by using the context mode within the current block is determined by remBinsPass1. In the disclosure, it may be understood that remBinsPass1 means remaining binaries inpass1, which is the number of remaining binary symbols in the first round. Coefficients before the last non-zero coefficient in the scanning order need to be coded. For a subblock where these coefficients are located, whether the current subblock needs to be coded, is sequentially determined. When the current subblock needs to be coded, syntax elements coded by using the context mode within a subblock may be placed in the first round, and syntax elements coded by using the bypass mode may be placed behind. With respect to each coefficient, up to four syntax elements to be coded by using the context mode, including one sig_coeff_flag, two abs_level_gtx_flag and one par_level_flag, may need to be processed. In the first round, remBinsPass1 is decremented by 1, each time a syntax element to be coded by using the context mode is processed. If a coefficient is large enough, after processing several syntax elements to be coded by using the context mode in the first round, the remaining value, i.e., abs_remainder, needs to be processed. If remBinsPass1 is small enough (remBinsPass1>=4 is not met), it may be done with the first round, and the remaining coefficients may be directly processed by using the bypass mode, i.e., dec_abs_level.

In another specific example, specific syntax of TSRC is shown in Table 2 below.

TABLE 2

| | Descriptor |
|---|---|

```
residual_ts_coding( x0, y0, log2TbWidth, log2TbHeight, cIdx ) {
  log2SbW = ( Min( log2TbWidth, log2TbHeight ) < 2 ? 1 : 2 )
  log2SbH = log2SbW
  if( log2Tb Width + log2TbHeight > 3 )
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  numSbCoeff = 1 << ( log2SbW + log2SbH )
  lastSubBlock = (
1 << ( log2TbWidth + log2TbHeight − ( log2SbW + log2SbH ) ) ) − 1
  inferSbCbf = 1
  RemCcbs = ( ( 1 << ( log2TbWidth + log2TbHeight ) ) * 7 ) >> 2
  for( i =0; i <= lastSubBlock; i++ ) {
    xS =
```

TABLE 2-continued

```
                                                                        Descriptor
DiagScanOrder[ log2TbWidth − log2SbW ][ log2TbHeight − log2SbH ][ i ][ 0
]
    yS =
DiagScanOrder[ log2TbWidth − log2SbW ][ log2TbHeight − log2SbH ][ i ][ 1
]
    if( i != lastSubBlock || !inferSbCbf )
      sb_coded_flag[ xS ][ yS ]                                         ae(v)
    if( sb_coded_flag[ xS ][ yS ] && i < lastSubBlock )
      inferSbCbf = 0
  /* First scan pass */
    inferSbSigCoeffFlag = 1
    lastScanPosPass1 = −1
    for( n = 0; n <= numSbCoeff − 1 && RemCcbs >= 4; n++ ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      lastScanPosPass1 = n
      if( sb_coded_flag[ xS ][ yS ] &&
          ( n != numSbCoeff − 1 || !inferSbSigCoeffFlag ) ) {
        sig_coeff_flag[ xC ][ yC ]                                      ae(v)
        RemCcbs− −
        if( sig_coeff_flag[ xC ][ yC ] )
          inferSbSigCoeffFlag = 0
      }
      CoeffSignLevel[ xC ][ yC ] = 0
      if( sig_coeff_flag[ xC ][ yC ] ) {
        coeff_sign_flag[ n ]                                            ae(v)
        RemCcbs− −
        CoeffSignLevel[ xC ][ yC ] = ( coeff_sign_flag[ n ] > 0 ? −1 : 1 )
        abs_level_gtx_flag[ n ][ 0 ]                                    ae(v)
        RemCcbs− −
        if( abs_level_gtx_flag[ n ][ 0 ] ) {
          par_level_flag[ n ]                                           ae(v)
          RemCcbs− −
        }
      }
      AbsLevelPass1[ xC ][ yC ] =
          sig_coeff_flag[ xC ][ yC ] + par_level_flag[ n ] +
abs_level_gtx_flag[ n ][ 0 ]
    }
  /* Greater than X scan pass (numGtXFlags=5) */
    lastScanPosPass2 = −1
    for( n = 0; n <= numSbCoeff − 1 && RemCcbs >= 4; n++ ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      AbsLevelPass2[ xC ][ yC ] = AbsLevelPass1[ xC ][ yC ]
      for( j = 1; j < 5; j++ ) {
        if( abs_level_gtx_flag[ n ][ j − 1 ] ) {
          abs_level_gtx_flag[ n ][ j ]                                  ae(v)
          RemCcbs− −
        }
        AbsLevelPass2[ xC ][ yC ] += 2 * abs_level_gtx_flag[ n ][ j ]
      }
      lastScanPosPass2 = n
    }
  /* remainder scan pass */
    for( n = 0; n <= numSbCoeff − 1; n++ ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      if( ( n <= lastScanPosPass2 && AbsLevelPass2[ xC ][ yC ] >= 10 )
||
          ( n > lastScanPosPass2 && n <= lastScanPosPass1 &&
          AbsLevelPass1[ xC ][ yC ] >= 2 ) ||
          ( n > lastScanPosPass1 && sb_coded_flag[ xS ][ yS ] ) )
        abs_remainder[ n ]                                              ae(v)
      if( n <= lastScanPosPass2 )
        AbsLevel[ xC ][ yC ] =
AbsLevelPass2[ xC ][ yC ] + 2 * abs_remainder[ n ]
      else if(n <= lastScanPosPass1 )
        AbsLevel[ xC ][ yC ] =
AbsLevelPass1[ xC ][ yC ] + 2 * abs_remainder[ n ]
      else { /* bypass */
```

TABLE 2-continued

```
                                                                Descriptor
          AbsLevel[ xC ][ yC ] = abs_remainder[ n ]
          if( abs_remainder[ n ] )
            coeff_sign_flag[ n ]                                ae(v)
        }
        if( BdpcmFlag[ x0 ][ y0 ][ cIdx ] = = 0 && n <= lastScanPosPass1 )
{
          absLeftCoeff = xC > 0 ? AbsLevel[ xC − 1 ][ yC ] : 0
          absAboveCoeff = yC > 0 ? AbsLevel[ xC ][ yC − 1 ] : 0
          predCoeff = Max( absLeftCoeff, absAboveCoeff )
          if( AbsLevel[ xC ][ yC ] = = 1 && predCoeff > 0 )
            AbsLevel[ xC ][ yC ] = predCoeff
          else if( AbsLevel[ xC ][ yC ] > 0 && AbsLevel[ xC ][ yC ] <=
predCoeff )
            AbsLevel[ xC ][ yC ]− −
        }
        TransCoeffLevel[ x0 ][ y0 ][ cIdx ][ xC ][ yC ] = ( 1 − 2 *
coeff_sign_flag[ n ] ) *
            AbsLevel[ xC ][ yC ]
    }
  }
}
```

After entering a function residual_ts_coding(x0, y0, log 2TbWidth, log 2TbHeight, cIdx), some information of block size need to be determined. Then, the value of RemCcbs is determined by using an equation RemCcbs=((1<<(log 2TbWidth+log 2TbHeight))×7)>>2. The number of syntax elements to be coded by using the context mode within the current block is determined by RemCcbs. In the disclosure, it may be understood that RemCcbs means remaining context coded binaries, which is the number of remaining binary symbols to be coded by using the context mode. For each subblock, it is determined whether the current subblock needs to be coded. If the current subblock needs to be coded, unlike the above RRC, the TSRC method places syntax elements to be coded by using the context mode within a subblock in two rounds, and with respect to each coefficient, up to four syntax elements to be coded by using the context mode are processed in first and second rounds respectively. Syntax elements to be coded by using the bypass mode are placed behind. In the first and second rounds, RemCcbs is decremented by 1, each time a syntax element to be coded by using the context mode is processed. If a coefficient is large enough, after processing several syntax elements to be coded by using the context mode in the first and second rounds, the remaining value, i.e., abs_remainder, needs to be processed. If RemCcbs is small enough (RemCcbs>=4 is not met), it may be done with the first and second rounds, and the remaining coefficients may be directly processed by using the bypass mode, which is still abs_remainder here.

When formulating HEVC, in order to improve throughput at high bit rates, an alignment operation is used. For coding, inputs to a CABAC engine are bins, and outputs of the CABAC engine are bits. On the contrary, for coding, inputs to the CABAC engine are bits, and outputs of the CABAC engine are bins. CABAC may compress codes, therefore bits do not correspond to bins one-to-one. For example, n bits correspond to m bins. In a normal situation, n is less than m. Some statistical values of sequences show that in CABAC, n:m is approximately 1:1.2 to 1:1.8. The bypass mode itself does not compress codes, and therefore a pure bypass mode may achieve one-to-one correspondences between bits and bins. However, when switch is performed between the context mode and the bypass mode and a fractional number of bits are being processed just right, then the bypass mode may have to go on processing a fractional number of bits. When the alignment processing is being used to align bits at an integer number of bits, then the bypass mode may achieve one-to-one correspondences between bits and bins, so that operations of the CABAC engine may be simpler, thereby improving throughput. The cost is that some compression performance may be lost during alignment, since alignment means wasting a part of bits. In an actual operation, the alignment processing is to set the variable ivlCurrRange in the CABAC engine to 256. When ivlCurrRange is equal to 256, each of ivlOffset and the bitstream may be considered as a shift register. At this time, the value of the bin binVal is the second highest bit in the register. Since ivlOffset is less than limit of ivlCurrRange, the highest bit is always equal to 0. The alignment processing is described in HEVC 9.3.4.3.6 "Alignment process prior to aligned bypass decoding".

Existing coefficient coding methods can achieve good compression efficiency for current common videos, such as consumer videos. A bit width per pixel of the consumer video usually has 8 or 10 bits, and a bit rate of the consumer video is usually not too high, usually several MegaBytes per second (MB/s) or lower. However, pixels of videos of some applications require a higher bit width, for example, the bit width per pixel has 12 bits, 14 bits or 16 bits or more. The higher bit width usually brings a larger coefficient and thus a higher bit rate. Videos of some applications require higher quality, and higher quality usually brings a larger coefficient and thus a higher bit rate. The higher bit rate has higher requirements on the decoder's processing capabilities, such as throughput.

Compared to coding and decoding of a video with low bit width, low quality and low bit rate (a regular video), in a video with high bit width, high quality and high bit rate (a three-high video), there are usually more coefficients which need to be coded/decoded, and the coefficients are larger. For example, coefficients which need to be coded/decoded in a block of the three-high video are much more than coefficients which need to be coded/decoded in a block with the same size of the regular video. This is because a lot of the coefficients in the block of the regular video become 0 after prediction, transform and quantization, while a lot of the coefficients in the block of the three-high video are still non-zero coefficients after prediction, transform and quantization. Among the coefficients in the block of the regular video after prediction, transform and quantization, a certain proportion of coefficients which need to be coded are 0, and a large proportion of non-zero coefficients are small coefficients, for example, absolute values thereof are 1 or 2 or 3, etc. Furthermore, among the coefficients in the block of the three-high video after prediction, transform and quantization, a lot of coefficients which need to be coded have large values, and a proportion of coefficients with value of 0, absolute values of 1, 2 and 3 is small. Therefore, existing syntax elements which indicate whether the current coefficient is a non-zero coefficient, whether the absolute value of the current coefficient is greater than 1, whether the absolute value of the current coefficient is greater than 2, or the like do not improve compression efficiency of the three-high video. On the other hand, since these syntax elements are coded by using the context mode, the context mode is more complex than the bypass mode in processing, that is, more costs are spent to process by using the context mode without any positive effect.

Another possibility is that the present method is used for lossless compression, since quantization cannot be used during lossless compression, and coefficients are usually large.

In other words, the current design of CABAC uses a distribution rule of coefficients in the regular video. In some coding and decoding scenarios where a distribution rule of coefficients is different from that of the regular video, such as videos with high bit width, high bit rate and high quality, or the like, there is a defect of high complexity in usage of existing CABAC, which reduces compression efficiency.

With respect to the above issues, when the encoder and decoder code and decode the coefficients respectively, by setting a high throughput mode, the encoder and decoder may take the following items into consideration in combination: whether to perform coding and decoding by using only the bypass mode, whether to perform coding and decoding by using the context mode, and whether to perform the alignment processing, so that the coefficients of the current block are further determined by using at least one of the context mode, the bypass mode or the alignment processing. It can improve throughput for coding the coefficients and coding and decoding speeds, and reduce complexity. Furthermore, an adaptive high throughput mode may adaptively determine whether to use the high throughput mode in a current part according to situations of encoded/decoded videos, so that throughput can be significantly improved without significant loss of compression performance when the bit rate is high enough, and compression performance may not be significantly lost when the bit rate is not high, which has higher adaptability, thereby improving compression performance.

Figure 8:
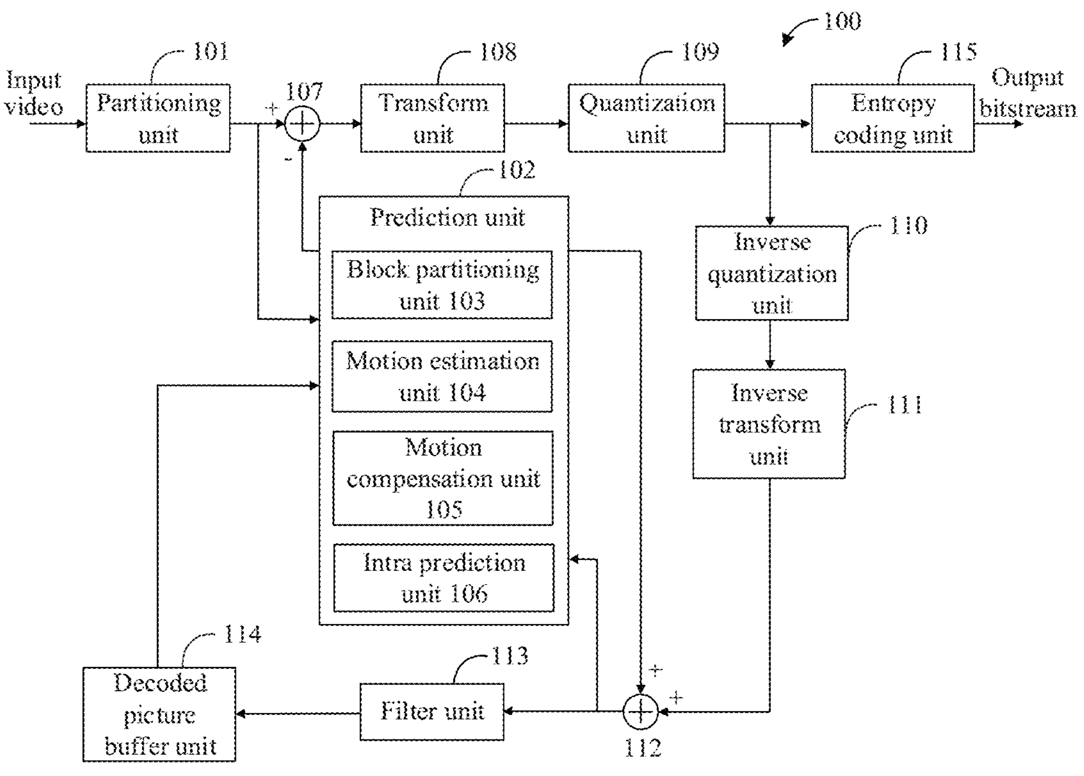
FIG. 8 is a schematic diagram of system compositions of an encoder according to an embodiment of the disclosure.

With reference to FIG. 8, an exemplary block diagram of system compositions of an encoder according to an embodiment of the disclosure is shown. As shown in FIG. 8, the encoder 100 may include a partitioning unit 101, a prediction unit 102, a first adder 107, a transform unit 108, a quantization unit 109, an inverse quantization unit 110, an inverse transform unit 111, a second adder 112, a filter unit 113, a Decoded Picture Buffer (DPB) unit 114 and an entropy coding unit 115. Here, input to the encoder 100 may be a video composed of a series of pictures or a static picture, and output of the encoder 100 may be a bit stream (also referred to as a "bitstream") to indicate a compression version of the input video.

The partitioning unit 101 partitions a picture in the input video into one or more CTUs. The partitioning unit 101 divides the picture into multiple tiles (or referred to as pieces of tiles), and may further divide a tile into one or more bricks. Here, a tile or a brick may include one or more complete and/or partial CTUs. Furthermore, the partitioning unit 101 may form one or more slices, here, a slice may include one or more tiles arranged in a mesh order in the picture, or one or more tiles covering a rectangular area in the picture. The partitioning unit 101 may also form one or more sub-pictures, here, a sub-picture may include one or more slices, tiles or bricks.

During coding of the encoder 100, the partitioning unit 101 transfers the CTU to the prediction unit 102. Usually, the prediction unit 102 may be composed of a block partitioning unit 103, a Motion Estimation (ME) unit 104, a Motion Compensation (MC) unit 105 and an intra prediction unit 106. Specifically, the block partitioning unit 103 iteratively uses quadtree partitioning, binary tree partitioning and ternary tree partitioning, to further divide the input CTU into smaller CUs. The prediction unit 102 may use the ME unit 104 and the MC unit 105 to obtain an inter prediction block of the CU. The intra prediction unit 106 may obtain an intra prediction block of the CU by using various intra prediction modes including a Mobile IP (MIP) mode. In an example, a rate-distortion optimized ME mode may be invoked by the ME unit 104 and the MC unit 105 to obtain the inter prediction block, and a rate-distortion optimized mode determination mode may be invoked by the intra prediction unit 106 to obtain the intra prediction block.

The prediction unit 102 outputs the prediction block of the CU, and the first adder 107 calculates a difference between the CU in the output of the partitioning unit 101 and the prediction block of the CU, i.e., a residual CU. The transform unit 108 reads the residual CU and performs one or more transform operations on the residual CU to obtain coefficients. The quantization unit 109 quantizes the coefficients and outputs quantization coefficients (i.e., levels). The inverse quantization unit 110 performs a scaling operation on the quantization coefficients to output reconstruction coefficients. The inverse transform unit 111 performs one or more inverse transforms corresponding to transform in the transform unit 108 and outputs a reconstructed residual. The second adder 112 calculates a reconstructed CU by adding the reconstructed residual to the prediction block of the CU from the prediction unit 102. The second adder 112 further sends its output to the prediction unit 102, to be used as an intra prediction reference. After all CUs in the picture or sub-picture are reconstructed, the falterer unit 113 performs loop filtering on a reconstructed picture or sub-picture. Here, the filter unit 113 includes one or more filters, such as a deblocking filter, a Sample Adaptive Offset (SAO) filter, an Adaptive Loop Filter (ALF), a Luma Mapping with Chroma Scaling (LMCS) filter, a filter based on a neural network, etc. Or, when the filter unit 113 determines that the CU is not used as a reference when other CUs are coded, the filter unit 113 performs loop filtering on one or more target pixels in the CU.

Output of the filter unit 113 are decoded pictures or sub-pictures, and these decoded pictures or sub-pictures are buffered to the DPB unit 114. The DPB unit 114 outputs the decoded pictures or sub-pictures according to timing and control information. Here, pictures stored in the DPB unit 114 may also be used as a reference when the prediction unit 102 performs inter prediction or intra prediction. Finally, the entropy coding unit 115 converts parameters required for the decoded pictures from the encoder 100 (such as control parameters, supplementary information, etc.) into a binary form, and writes such binary form into the bitstream according to a syntax structure of each data unit, that is, the encoder 100 outputs the bitstream finally.

Further, the encoder 100 may be provided with a first processor and a first memory recording a computer program. When the first processor reads and runs the computer program, the encoder 100 reads the input video and generates a corresponding bitstream. Furthermore, the encoder 100 may also be a computing device provided with one or more chips. These units implemented as integrated circuits on the chips have connection and data exchange functions similar to corresponding units in FIG. 8.

Figure 9:
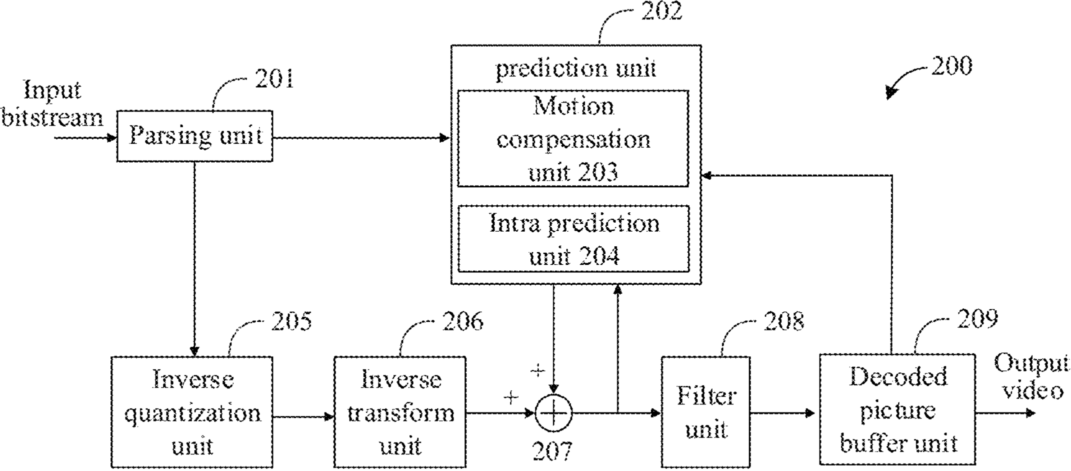
FIG. 9 is a schematic diagram of system compositions of a decoder according to an embodiment of the disclosure.

With reference to FIG. 9, an exemplary block diagram of system compositions of a decoder according to an embodiment of the disclosure is shown. As shown in FIG. 9, the decoder 200 may include a parsing unit 201, a prediction unit 202, an inverse quantization unit 205, an inverse transform unit 206, an adder 207, a filter unit 208 and a DPB unit 209. Here, input to the decoder 200 may be a bitstream to indicate a compressed version of a video or a static picture, and output of the decoder 200 may be a decoded video composed of a series of pictures or a decoded static picture.

The input bitstream of the decoder 200 may be the bitstream generated by the encoder 100. The parsing unit 201 parses the input bitstream and obtains values of syntax elements from the input bitstream. The parsing unit 201 converts a binary representation of the syntax elements into digital values and sends the digital values to units in the decoder 200 to obtain one or more decoded pictures. The parsing unit 201 may further parse one or more syntax elements from the input bitstream to display the decoded picture.

During decoding of the decoder 200, the parsing unit 201 sends the values of the syntax elements and one or more variables set or determined according to the values of the syntax elements to obtain one or more decoded pictures to units in the decoder 200.

The prediction unit 202 determines a prediction block of a current decoded block (e.g., CU). Here, the prediction unit 202 may include a MC unit 203 and an intra prediction unit 204. Specifically, when an inter decoding mode is indicated for decoding the current decoded block, the prediction unit 202 transmits relevant parameters from the parsing unit 201 to the MC unit 203 to obtain an inter prediction block; when an intra prediction mode (including a MIP mode indicated based on a MIP mode index value) is indicated for decoding the current decoding block, the prediction unit 202 transmits relevant parameters from the parsing unit 201 to the intra prediction unit 204 to obtain an intra prediction block.

The inverse quantization unit 205 has the same function as the inverse quantization unit 110 in the encoder 100. The inverse quantization unit 205 performs a scaling operation on quantization coefficients (i.e., levels) from the parsing unit 201 to obtain reconstruction coefficients.

The inverse transform unit 206 has the same function as the inverse transform unit 111 in the encoder 100. The inverse transform unit 206 performs one or more transform operations (i.e., inverse operations of one or more transform operations performed by the inverse transform unit 111 in the encoder 100) to obtain the reconstructed residual.

The adder 207 performs an addition operation on its inputs (the prediction block from the prediction unit 202 and the reconstructed residual from the inverse transform unit 206) to obtain a reconstructed block of the current decoded block. The reconstructed block is also sent to the prediction unit 202, to be used as a reference for other blocks encoded in the intra prediction mode.

After all CUs in the picture or sub-picture are reconstructed, the filterer unit 208 performs loop filtering on a reconstructed picture or sub-picture. The filter unit 208 includes one or more filters, such as a deblocking filter, a sample adaptive compensation filter, an ALF, a LMCS filter, a filter based on a neural network, etc. Or, when the filter unit 208 determines that the reconstructed block is not used as a reference when other blocks are decoded, the filter unit 208 performs loop filtering on one or more target pixels in the reconstructed block. Here, output of the filter unit 208 are decoded pictures or sub-pictures, and the decoded pictures or sub-pictures are buffered to the DPB unit 209. The DPB unit 209 outputs the decoded pictures or sub-pictures according to timing and control information. Pictures stored in the DPB unit 209 may also be used as a reference when the prediction unit 202 performs inter prediction or intra prediction.

Further, the decoder 200 may be provided with a second processor and a second memory recording a computer program. When the second processor reads and runs the computer program, the decoder 200 reads the input bitstream and generates a corresponding decoded video. Furthermore, the decoder 200 may also be a computing device provided with one or more chips. These units implemented as integrated circuits on the chips have connection and data exchange functions similar to corresponding units in FIG. 9.

It should also be noted that when the embodiments of the disclosure are applied to the encoder 100, "current block" specifically refers to a current to-be-coded block in the video picture (which may also be referred to as "coded block"); and when the embodiments of the disclosure are applied to the decoder 200, "current block" specifically refers to a current to-be-decoded block in the video picture (which may also be referred to as "decoded block").

Based on FIG. 8, the encoding method in the embodiment of the disclosure is mainly applied to the "entropy coding unit 115" part of the encoder 100. With respect to the entropy coding unit 115, the CABAC mode or the bypass mode may be used to perform entropy coding on relevant flag information (or syntax elements), and then write them into the bitstream.

Based on FIG. 9, the decoding method in the embodiment of the disclosure is mainly applied to the "parsing unit 201" part of the decoder 200. With respect to the parsing unit 201, the CABAC mode or the bypass mode may be used to perform decoding, to obtain values of relevant flag information (or syntax elements), and then reconstruct the coefficients.

The technical solutions in the embodiments of the disclosure will be clearly and completely described below with reference to the drawings in the embodiments of the disclosure.

Figure 10:
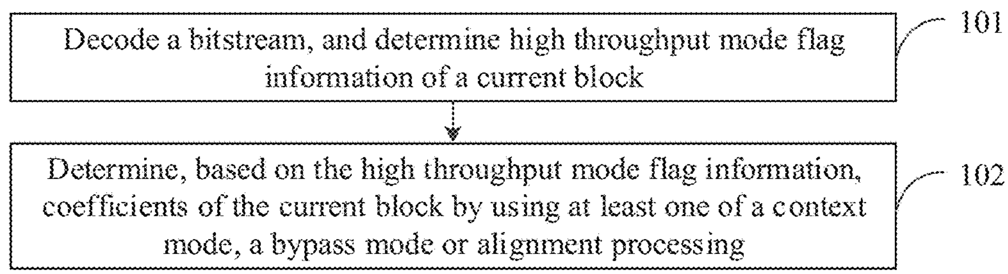
FIG. 10 is a first schematic flowchart of implementation of a decoding method.

An embodiment of the disclosure proposes a decoding method, applied to a decoder. FIG. 10 is a first schematic flowchart of implementation of the decoding method. As shown in FIG. 10, the method for the decoder to perform decoding may include the following operations 101 and 102.

At 101, a bitstream is decoded, and high throughput mode flag information of a current block is determined.

At 102, coefficients of the current block are determined based on the high throughput mode flag information, by using at least one of a context mode, a bypass mode or alignment processing.

In the embodiment of the disclosure, the decoder may determine the high throughput mode flag information of the current block by decoding the bitstream. Then, the decoder may determine the coefficients of the current block based on the high throughput mode flag information, by using at least one of the context mode, the bypass mode or the alignment processing.

It should be noted that in the embodiment of the disclosure, the high throughput mode flag information may be used to improve throughput of coding and decoding.

Further, in the disclosure, the current block may be a picture block which has not been transformed, or may be a TB which has been transformed. For example, the current block may be a zeroed-out TB.

Further, in the embodiment of the disclosure, the high throughput mode flag information may be understood as a flag bit indicating that the coefficients of the current block are determined by using at least one of the context mode, the bypass mode or the alignment processing; or, the high throughput mode flag information may be understood as a flag bit indicating that values of the coefficients of the current block are determined by using at least one of the context mode, the bypass mode or the alignment processing. Specifically, by decoding the bitstream, the decoder may determine a variable as the high throughput mode flag information, so as to determine the high throughput mode flag information through a value of the variable.

It should be noted that in the disclosure, the value of the high throughput mode flag information may be a first value or a second value. Specifically, when the high throughput mode flag information has different values, modes of determining the coefficients of the current block (or values of the coefficients of the current block) are also different.

Specifically, in the embodiment of the disclosure, based on the value of the high throughput mode flag information, at least one of the context mode, the bypass mode, the alignment processing, or other modes may be selected for determining the coefficients of the current block.

Further, in the embodiment of the disclosure, the high throughput mode flag information may be understood as a flag bit indicating whether to perform the alignment processing.

Optionally, in the disclosure, if the value of the high throughput mode flag information is the first value, the alignment processing may be selected to determine the coefficients of the current block; if the value of the high throughput mode flag information is the second value, the coefficients of the current block may be determined with the alignment processing skipped.

It may be seen that it may be determined, according to the value of the high throughput mode flag information, whether to determine the coefficients of the current block by using the alignment processing.

Further, in the embodiment of the disclosure, the high throughput mode flag information may be understood as a flag bit indicating whether only the bypass mode is to be used.

Optionally, in the disclosure, if the value of the high throughput mode flag information is the first value, the bypass mode may be selected to determine the coefficients of the current block; if the value of the high throughput mode flag information is the second value, at least one of the context mode or the bypass mode may be selected to determine the coefficients of the current block.

It may be seen that whether the coefficients of the current block are determined by using only the bypass mode, may be determined according to the value of the high throughput mode flag information. That is, whether all the coefficients of the current block (or values of all the coefficients of the current block) are determined by using the bypass mode, may be determined based on the value of the high throughput mode flag information. For example, if the value of the high throughput mode flag information is the first value, then all the syntax elements sb_coded_flag of the current block which need to be decoded are coded by using the bypass mode.

Further, in the embodiment of the disclosure, the high throughput mode flag information may be understood as a flag bit indicating that an initial value of a quantity parameter is reduced (or, the quantity parameter is set to 0).

Optionally, in the disclosure, the initial value of the quantity parameter may be determined first according to the high throughput mode flag information; if the initial value of the quantity parameter is equal to or greater than a quantity threshold, then at least one of the context mode or the bypass mode may be selected to determine the coefficients of the current block; if the initial value of the quantity parameter is less than the quantity threshold, then the bypass mode may be selected to determine the coefficients of the current block.

It should be noted that in the embodiment of the disclosure, the initial value of the quantity parameter indicates a maximum number of syntax elements which may be coded/decoded by using the context mode. Specifically, the quantity parameter may be a parameter indicating a number of remaining syntax elements available in the current block and coded by using the context mode, and the initial value of the quantity parameter is a value initially set for the quantity parameter.

It may be seen that different modes may be selected according to different values of the high throughput mode flag information, to determine the initial value of the quantity parameter. That is, the high throughput mode flag information may be used to determine the initial value of the quantity parameter, and then it may be determined, based on the initial value of the quantity parameter, whether to determine the coefficients of the current block by using the context mode.

Exemplarily, in the disclosure, the first value may be set to 1, and the second value may be set to 0; or, the first value may be set to "true", and the second value may be set to "false". The disclosure does not impose any limitation thereto.

Exemplarily, in the disclosure, when the high throughput mode flag information is used to determine whether to determine the coefficients of the current block (or values of the coefficients of the current block) by using at least one of the context mode, the bypass mode or the alignment processing, then a flag high_throughput_mode_enabled_flag may be used to indicate the high throughput mode flag information.

For example, in the disclosure, if the value of high_throughput_mode_enabled_flag is 1, then it may indicate that the alignment processing is performed to determine the coefficients of the current block (or values of the coefficients of the current block); if the value of high_throughput_mode_enabled_flag is 0, then it may indicate that the coefficients of the current block (or values of the coefficients of the current block) are determined without performing the alignment processing.

For example, in the disclosure, if the value of high_throughput_mode_enabled_flag is 1, then it may indicate that the coefficients of the current block (or values of the coefficients of the current block) are determined by using only the bypass mode; if the value of high_throughput_mode_enabled_flag is 0, then it may indicate that the coefficients of the current block (or values of the coefficients of the current block) may be determined by using at least one of the context mode or the bypass mode.

For example, in the disclosure, if the value of high_throughput_mode_enabled_flag is 1, then the initial value of the quantity parameter may be determined as a first quantity value, and then it may be determined, according to the initial value of the quantity parameter, whether to determine the coefficients of the current block (or values of the coefficients of the current block) by using the context mode; if the value of high_throughput_mode_enabled_flag is 0, then the initial value of the quantity parameter may be determined according to height and width parameters of the current block, and then it may be determined, according to the initial value of the quantity parameter, whether to determine the coefficients of the current block (or values of the coefficients of the current block) by using the context mode.

It should be noted that in the embodiment of the disclosure, the decoder may also determine height and width parameters of the current block. Specifically, height and width parameters of the current block may be used to determine the size of the current block.

Exemplarily, in the disclosure, with respect to the current block after zero-out, after logarithms log 2ZoTbWidth and log 2ZoTbHeight of the size of the current block are determined, (1<<log 2ZoTbHeight) may be used to indicate a corresponding height parameter, and (1<<log 2ZoTbWidth) may be used to indicate a corresponding width parameter.

Exemplarily, in the disclosure, the first quantity value is an integer equal to or greater than 0 and less than the quantity threshold. For example, if the quantity threshold is 4, then the first quantity value may be set to 0 or 1 or 2 or 3.

For example, in the disclosure, if the value of high_throughput_mode_enabled_flag is 1, then the initial value of the quantity parameter may be determined as a second quantity value, and then it may be determined, according to the initial value of the quantity parameter, whether to determine the coefficients of the current block (or values of the coefficients of the current block) by using the context mode; if the value of high_throughput_mode_enabled_flag is 0, then the initial value of the quantity parameter may be determined according to height and width parameters of the current block, and then it may be determined, according to the initial value of the quantity parameter, whether to determine the coefficients of the current block (or values of the coefficients of the current block) by using the context mode.

Exemplarily, in the disclosure, the second quantity value may be used to reduce the initial value of the quantity parameter. Specifically, the second quantity value may be less than the initial value of the quantity parameter determined according to height and width parameters of the current block.

For example, in the disclosure, if the value of high_throughput_mode_enabled_flag is 1, then the initial value of the quantity parameter may be determined according to height and width parameters of the current block and a first shift parameter, and then it may be determined, according to the initial value of the quantity parameter, whether to determine the coefficients of the current block (or values of the coefficients of the current block) by using the context mode; if the value of high_throughput_mode_enabled_flag is 0, then the initial value of the quantity parameter may be determined according to height and width parameters of the current block and a second shift parameter, and then it may be determined, according to the initial value of the quantity parameter, whether to determine the coefficients of the current block (or values of the coefficients of the current block) by using the context mode.

Exemplarily, in the disclosure, the first shift parameter and the second shift parameter are used in right shift processing, and the first shift parameter is greater than the second shift parameter.

Further, in the embodiment of the disclosure, the decoder may also determine video flag information by decoding the bitstream; when the video flag information indicates that a video meets a first preset condition, then the process of determining the high throughput mode flag information may be performed, that is, the high throughput mode flag information of the current block is determined.

It should be noted that in the embodiment of the disclosure, the first preset condition at least includes one of the following conditions: a bit width being greater than a bit width threshold, a bit rate being greater than a bit rate threshold, a picture rate being greater than a picture rate threshold, a quantization parameter (QP) being less than a quality threshold, or lossless compression.

Specifically, in the disclosure, the bit width threshold may be set to 14 bits (or 12 bits, or 16 bits), and if a bit width of a video picture to be encoded/decoded is greater than 14 bits, the video may be considered as an irregular video with high bit width. The bit rate threshold may be set to 1 Gbit/s, and if a bit rate of a video picture to be encoded/decoded is greater than 1 Gbit/s, the video may be considered as an irregular video with high bit rate. The picture rate threshold may be set to 90 Hz (or 120 Hz), and if a picture rate of a video picture to be encoded/decoded is greater than 90 Hz, the video may be considered as an irregular video with high picture rate. The quality threshold may be set to different specific values according to different bit widths, for example, an input bit width is set to 12 bits and a corresponding quality threshold is 0 for 12-bits coding, and if the bit width of the video picture to be encoded/decoded has 12 bits, and QP determined based on the 12-bits coding is less than the corresponding quality threshold of 0, the video may be considered as an irregular video with high quality.

It may be understood that in the disclosure, the coefficient decoding method of the regular video is the same as existing method in the related art. However, in a certain situation, such as with respect to the irregular video with high bit width, high quality, high bit rate, high picture rate or lossless compression, according to the embodiment of the disclosure, when decoding the coefficients, a process of determining the high throughput mode flag information may be added, that is, the high throughput mode flag information of the current block is determined.

That is, the bit width of the irregular video is higher than that of the regular video, the quality of the irregular video is higher than that of the regular video, the bit rate of the irregular video is higher than that of the regular video, the picture rate of the irregular video is higher than that of the regular video, or the irregular video is lossless compressed.

Further, in the embodiment of the disclosure, at first, it needs to determine whether the current video is a regular video, which may be indicated by the video flag information. Specifically, if the value of the video flag information is a first value, then it may be determined that the video flag information indicates that a video meets a first preset condition, that is, the video is an irregular video; if the value of the video flag information is a second value, then it may be determined that the video flag information indicates that the video does not meet the first preset condition, that is, the video is a regular video.

Exemplarily, in the disclosure, the first value may be set to 1, and the second value may be set to 0; or, the first value may be set to "true", and the second value may be set to "false". The disclosure does not impose any limitation thereto.

Further, in the disclosure, the video flag information may be a sequence level flag, or even a higher level flag, such as Video Usability Information (VUI), Supplemental Enhancement Information (SEI), etc. Determining whether the video meets the first preset condition, may also be implemented by determining whether the video meets the high bit width, or the high bit rate, or the high quality, or the lossless compression, or the like. Descriptions are made below by taking the four situations as examples respectively.

Optionally, in the disclosure, when the video flag information is high-bit-width sequence flag information, if the video meets the high bit width, then it is determined that the high-bit-width sequence flag information indicates that the video meets the first preset condition.

Optionally, in the disclosure, when the video flag information is high-bit-rate sequence flag information, of the video meets the high bit rate, then it is determined that the high-bit-rate sequence flag information indicates that the video meets the first preset condition.

Optionally, in the disclosure, when the video flag information is high-quality sequence flag information, if the video meets the high quality, then it is determined that the high-quality sequence flag information indicates that the video meets the first preset condition.

Optionally, in the disclosure, when the video flag information is high-picture-rate sequence flag information, if the video meets the high picture rate, then it is determined that the high-picture-rate sequence flag information indicates that the video meets the first preset condition.

Optionally, in the disclosure, when the video flag information is lossless-compression sequence flag information, if the video meets the lossless compression, then it is determined that the lossless-compression sequence flag information indicates that the video meets the first preset condition.

That is, in the disclosure, the video flag information may be high-bit-width sequence flag information (indicated by sps_high_bit_depth_flag) to indicate whether the current video is a high-bit-width sequence; or, may be replaced by high-bit-rate sequence flag information (indicated by sps_high_bit_rate_flag) to indicate whether the current video is a high-bit-rate sequence; or, may be replaced by other flag information indicating the high bit width, the high bit rate, the high quality, the high picture rate or the lossless compression. The embodiment of the disclosure does not impose specific limitation thereto.

It may be seen that in the disclosure, determination of the high-throughput-mode flag information may depend on determination of the video flag information, that is, high_throughput_mode_enabled_flag may depend on some other flags, such as a high-bit-width flag, a high-bit-rate flag, a Sequence Parameter Set (SPS) extension flag (sps_extension_flag), or the like. The SPS extension flag may be enabled in extended versions of the standard, such as extended versions formulated by VVC for high-bit-width and high-bit-rate codings.

Exemplarily, in the disclosure, if the value of the high-bit-width flag, the high-bit-rate flag or the SPS extension flag is 1, the above flag high_throughput_mode_enabled_flag needs to be decoded; if the value of the high bit width flag, the high bit rate flag or the SPS extension flag is not 1, the above flag high_throughput_mode_enabled_flag does not need to be decoded.

It should be noted that in the embodiment of the disclosure, the high throughput mode flag information (high_throughput_mode_enabled_flag) may be a sequence level flag, a picture level flag, a slice level flag, a block level flag or other level flags. The block level flag includes a LCU level flag, a CTU level flag, a CU level flag or other block level flags. Here, high_throughput_mode_enabled_flag may even be a higher level flag, such as VUI, SEI, etc. For example, the high throughput mode flag information may include flag information of at least one of the following: a sequence level, a picture level, a slice level, a tile level, a block level, or a Coding Tree Unit (CTU) level It should be noted that coefficient coding usually mentioned in video standards may include two parts, i.e, coding and decoding. Therefore, coefficient coding includes a coefficient coding method at the encoder side and a coefficient decoding method at the decoder side. The embodiment of the disclosure describes the coefficient decoding method at the decoder side.

It should be noted that in the embodiment of the disclosure, subblock coded flag information may be indicated by sb_coded_flag. Exemplarily, if the value of sb_coded_flag is 1, then it may be determined that all the coefficients in a to-be-decoded subblock need to be decoded sequentially. If the value of sb_coded_flag is 0, then it may be determined that all the coefficients in the to-be-decoded subblock do not need to be decoded sequentially; and at this time, all the coefficients in the to-be-decoded subblock are zero.

Optionally, in the disclosure, in a certain situation, when coding the coefficients, all the scanned subblocks need to be coded by default, or in other words, all the scanned subblocks contain non-zero coefficients by default. That is, in a normal situation, the coefficient coding method is still the same as the existing method in the related art. For example, in a certain case, it may be a video with high bit width, high quality, high bit rate, high picture rate or lossless compression coding and decoding. In this case, there are many non-zero coefficients, and almost all the scanned subblocks need to be coded; in other words, almost all the scanned subblocks contain non-zero coefficients. In this way, there is no need to transmit sb_coded_flag in the bitstream, and there is no need for the encoder/decoder to process this flag, thereby increasing the encoding and decoding speed. Due to removal of an almost non-existent flag, a slight improvement in compression performance may also be achieved at this time.

Further, in the disclosure, if the value of the decoded high throughput mode flag information is the first value, then the subblock coded flag information sb_coded_flag of the current block may be determined by using the bypass mode, instead of determining the subblock coded flag information sb_coded_flag of the current block by using the context mode.

It should be noted that in the disclosure, in case of TSRC, sb_coded_flag is decoded by using the context mode. When sb_coded_flag is removed or sb_coded_flag is changed to be decoded by using the bypass mode, then all the coefficients in the entire block may be decoded by using the bypass mode, which can further improve the encoding and decoding speeds or throughput.

Exemplarily, in the disclosure, if the value of high_throughput_mode_enabled_flag is the first value, then sb_coded_flag is decoded by using the bypass mode; if the value of high_throughput_mode_enabled_flag is the second value, then sb_coded_flag is decoded by using the context mode.

Further, in the disclosure, if the value of the decoded high throughput mode flag information is the first value, then prefix information last_sig_coeff_x_prefix of a horizontal coordinate of a last non-zero coefficient, prefix information last_sig_coeff_y_prefix of a vertical coordinate of the last non-zero coefficient, suffix information last_sig_coeff_x_suffix of the horizontal coordinate of the last non-zero coefficient and suffix information last_sig_coeff_y_suffix of the vertical coordinate of the last non-zero coefficient of the current block are determined by using the bypass mode.

It should be noted that in the disclosure, in case of RRC, last_sig_coeff_x_prefix, last_sig_coeff_y_prefix, last_sig_coeff_x_suffix and last_sig_coeff_y_suffix are decoded by using the context mode. If last_sig_coeff_x_prefix, last_sig_coeff_y_prefix, last_sig_coeff_x_suffix and last_sig_coeff_y_suffix are removed or changed to be decoded by using the bypass mode, coding and decoding speeds or throughput can be further improved.

Exemplarily, in the disclosure, if the value of high_throughput_mode_enabled_flag is the first value, then last_sig_coeff_x_prefix, last_sig_coeff_y_prefix, last_sig_coeff_x_suffix and last_sig_coeff_y_suffix are decoded by using the bypass mode; if the value of high_throughput_mode_enabled_flag is the second value, then last_sig_coeff_x_prefix, last_sig_coeff_y_prefix, last_sig_coeff_x_suffix and last_sig_coeff_y_suffix are decoded by using the context mode.

It may be understood that in the embodiment of the disclosure, all the above methods take an example of uniformly using this technology in all the components of the video. All the components refer to R, G, B components of a video in RGB format or Y, U, V (Y, Cb, Cr) components of the video in YUV format. The above methods may also be used in only a certain component, such as only the Y component in YUV format. The above methods may also be used in each component respectively, that is, each component may be controlled to turn on or off independently. The disclosure does not impose specific limitation thereto.

It may be seen that in the process of coding and decoding the coefficients of the current block, by setting a high throughput mode, the decoding method proposed in the embodiment of the disclosure may take consideration of the following items in combination, i.e., whether to perform coding and decoding by using only the bypass mode, whether to perform coding and decoding by using the context mode, and whether to perform the alignment processing, so as to further determine the coefficients of the current block by using at least one of the context mode, the bypass mode or the alignment processing.

It may be understood that in the embodiment of the disclosure, when the high-throughput mode is enabled, syntax elements coded by using the context mode are not used in coding and decoding coefficient levels and residual levels. remBinsPass1 in RRC and RemCcbs in TSRC are set to 0, that is, a number of binary symbols (bins) which can be used by the current TB and coded by using the context mode is set to 0. Then, all the coefficient levels or residual levels are coded/decoded by using the bypass mode.

It may be understood that in the embodiment of the disclosure, when the high throughput mode is enabled, all the syntax elements sb_coded_flag which need to be decoded are coded/decoded by using the bypass mode.

Further, in the embodiment of the disclosure, when determining the coefficients of the current block by using the alignment processing, in case of RRC, the alignment processing may be selected to be performed after determining position of the last non-zero coefficient by using the context mode, and other syntax elements other than the position of the last non-zero coefficient are determined by using the bypass mode; in case of TSRC, the alignment processing may be selected to be performed before determining the first syntax element by using the bypass mode.

It may be understood that in the embodiment of the disclosure, when the high throughput mode is enabled, the alignment operation occurs before entering the subblock. That is, in case of RRC, the alignment processing occurs after last_sig_coeff_x_prefix, last_sig_coeff_y_prefix, last_sig_coeff_x_suffix and last_sig_coeff_y_suffix, and in case of TSRC, the alignment processing occurs at the beginning of the entire TB. In other words, the alignment processing occurs before the first syntax element coded by using the bypass mode in the TB.

Figure 11:
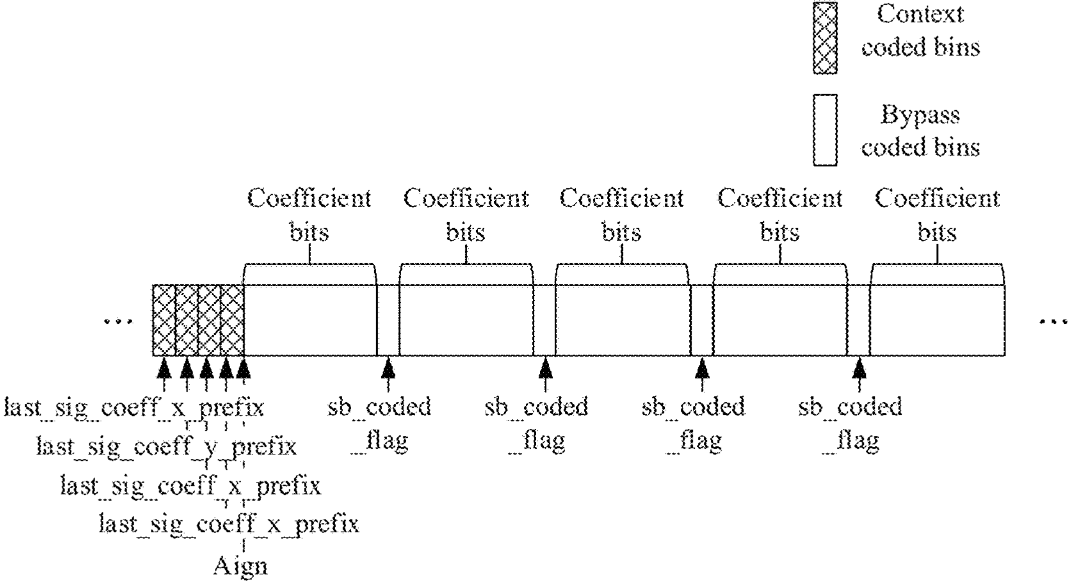
FIG. 11 is a first schematic diagram of alignment processing in RRC.

Exemplarily, FIG. 11 is a first schematic diagram of alignment processing in RRC. As shown in FIG. 11, in the bitstream of RRC, except that coding in the context mode needs to be used at the position of the last non-zero coefficient, the bypass mode is used in all other syntax elements, that is, the alignment processing is performed after horizontal coordinate prefix flag information last_sig_coeff_x_prefix, vertical coordinate prefix flag information last_sig_coeff_y_prefix, horizontal coordinate suffix flag information last_sig_coeff_x_suffix and vertical coordinate suffix flag information last_sig_coeff_y_suffix, and the alignment processing is performed after the position of the last non-zero coefficient, which allows subsequent large segments of contents coded by using the bypass mode to be decoded faster. Coefficient bits indicate bits of the coefficients, sb_coded_flag indicates coded flag information, Context coded bins indicates a context-mode coding group, Bypass coded bins indicates a bypass-mode coding group, and Aign indicates position of the alignment processing.

Figure 12:
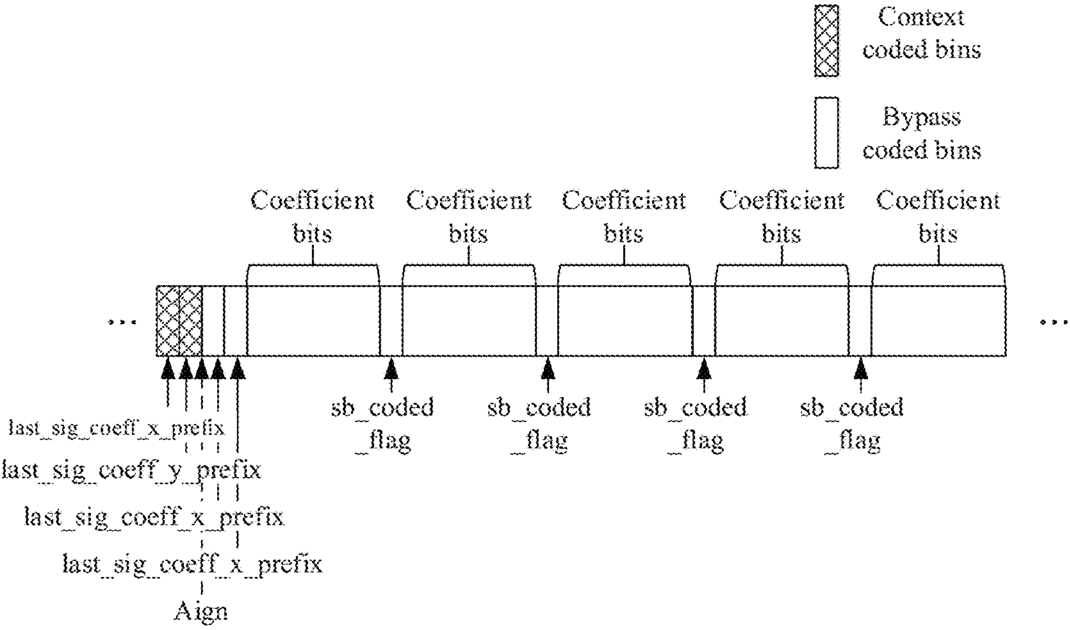
FIG. 12 is a second schematic diagram of alignment processing in RRC.

Further, in the current VVC, last_sig_coeff_x_prefix and last_sig_coeff_y_prefix may be coded by using the context mode, and last_sig_coeff_x_suffix and last_sig_coeff_y_suffix may be coded by using the bypass mode. Therefore, in an embodiment, all of last_sig_coeff_x_prefix, last_sig_coeff_y_prefix, last_sig_coeff_x_suffix and last_sig_coeff_y_suffix may be used as code of the last non-zero coefficient, and what follows is codes of subblocks and internal coefficients of the subblocks. Correspondingly, the above alignment processing method shown in FIG. 11 is performed based on distinguishing according to meanings of syntax elements. In another embodiment, FIG. 12 is a second schematic diagram of alignment processing in RRC. As shown in FIG. 12, the alignment processing may also be performed based on distinguishing syntax elements coded by using the context mode from syntax elements coded by using the bypass mode, that is, the alignment operation is performed after the syntax elements coded by using the context mode end and before the syntax elements coded by using the bypass mode begin. Coefficient bits indicate bits of the coefficients, sb_coded_flag indicates coded flag information, Context coded bins indicates a context mode coding group, Bypass coded bins indicates a bypass mode coding group, and Aign indicates position of the alignment processing. Therefore, in case of RRC, the alignment operation may be performed after last_sig_coeff_x_prefix, last_sig_coeff_y_prefix, last_sig_coeff_x_suffix and last_sig_coeff_y_suffix as shown above in FIG. 11, or may be performed after last_sig_coeff_x_prefix and last_sig_coeff_y_prefix and before last_sig_coeff_x_suffix and last_sig_coeff_y_suffix as shown above in FIG. 12.

It may be seen that when determining the coefficients of the current block by using the alignment processing, in case of RRC, the alignment processing may also be selected to be performed after determining the horizontal coordinate prefix flag information last_sig_coeff_x_prefix and the vertical coordinate prefix flag information last_sig_coeff_y_prefix of the last non-zero coefficient by using the context mode, and before determining the horizontal coordinate suffix flag information last_sig_coeff_x_suffix and the vertical coordinate suffix flag information last_sig_coeff_y_suffix of the last non-zero coefficient by using the bypass mode, and the bypass mode is used in other syntax elements other than the position of the last non-zero coefficient.

Exemplarily, in the disclosure, when the high throughput mode is enabled, last_sig_coeff_x_prefix and last_sig_coeff_y_prefix may also be changed to be coded by using the bypass mode. At this time, the position of the last non-zero coefficient is also coded by using the bypass mode, and the entire TB is also coded by using the bypass mode. In this way, in case of RRC, the alignment processing may also be placed at the beginning of the entire TB.

It should be noted that in the disclosure, if the entire TB is coded by using the bypass mode, and there are syntax elements coded by using the bypass mode before the TB, the alignment processing may also be placed before the TB.

It may be seen that in the disclosure, in case of both RRC and TSRC, the alignment processing may occur before the first syntax element coded by using the bypass mode in the TB. At this time, in case of RRC, the horizontal coordinate prefix flag information last_sig_coeff_x_prefix, the vertical coordinate prefix flag information last_sig_coeff_y_prefix, the horizontal coordinate suffix flag information last_sig_coeff_x_suffix and the vertical coordinate suffix flag information last_sig_coeff_y_suffix of the last non-zero coefficient may be selected to be determined by using the bypass mode, that is, the position of the last non-zero coefficient is coded by using the bypass mode.

Exemplarily, FIG. 13 is a schematic diagram of alignment processing in TSRC. As shown in FIG. 13, in the bitstream of TSRC, the bypass mode is used in all the syntax elements of the entire TB, and the alignment processing is performed at the beginning of the entire TB, which may allow contents coded by using the bypass mode of the entire TB to be decoded faster. Coefficient bits indicate bits of the coefficients, sb_coded_flag indicates coded flag information, and Aign indicates position of the alignment processing.

Exemplarily, in the disclosure, there is a sequence level flag sps_extension_flag. At the sequence level, if the value of sps_extension_flag is 1, sps_range_extension_flag needs to be decoded. If the value of sps_range_extension_flag is 1, sps_high_throughput_mode_enabled_flag needs to be decoded. sps_high_throughput_mode_enabled_flag is a flag of enabling a high throughput mode of a current sequence. If the value of sps_high_throughput_mode_enabled_flag is 1, it indicates that the high throughput mode is used in blocks within the current sequence. If the value of sps_high_throughput_mode_enabled_flag is 0, it indicates that the high throughput mode is not used in blocks within the current sequence.

sps_extension_flag may be considered as a flag indicating whether an extended version of the standard is applied to the current sequence. sps_range_extension_flag is a flag indicating whether a range extension, such as high bit width, high bit rate, etc, is applied to the current sequence.

Specifically, sequence parameter set RBSP syntax is shown in Table 3, and sequence parameter set range extension syntax is shown in Table 4.

TABLE 3

| | |
|---|---|
| ...... | |
| sps_extension_flag | u(1) |
| ...... | |
| if( sps_extension_flag ) { | |
| sps_range_extension_flag | u(1) |
| ...... | |
| if( sps_range_extension_flag ) | |
| sps_range_extension( ) | |
| } | |
| ...... | |

TABLE 4

| | Descriptor |
|---|---|
| sps_range_extension( ){ | |
| ...... | |
| sps_context_coded_level_bins_disabled_flag | u(1) |
| ...... | |
| } | |

Exemplarily, in the disclosure, in terms of syntax, an original sentence remBinsPass1=((1<<(log 2TbWidth+log 2TbHeight))×7)>>2 of residual_coding(x0, y0, log 2TbWidth, log 2TbHeight, cIdx) in residual coding syntax of Table 1 may be replaced by conditional sentences shown in Table 5 below:

TABLE 5

```
if (sps_high_throughput_mode_enabled_flag){
  remBinsPass1 = 0
}else{
  remBinsPass1 = ( ( 1 << ( log2TbWidth + log2TbHeight ) ) × 7 ) >> 2
}
```

Exemplarily, in the disclosure, in terms of syntax, an original sentence RemCcbs=((1<<(log 2TbWidth+log 2TbHeight))×7)>>2 of residual_ts_coding(x0, y0, log 2TbWidth, log 2TbHeight, cIdx) in residual coding syntax of Table 2 may be replaced by conditional sentences shown in Table 6 below:

TABLE 6

```
if (sps_high_throughput_mode_enabled_flag){
  RemCcbs = 0
}else{
  RemCcbs = ( ( 1 << ( log2TbWidth + log2TbHeight ) ) × 7 ) >> 2
}
```

It should be noted that in the embodiment of the disclosure, with respect to sb_coded_flag which needs to be decoded, if the value of sps_high_throughput_mode_enabled_flag is 1, sb_coded_flag is decoded by using the bypass mode; otherwise, sb_coded_flag is decoded by using a common context mode.

The following process is added in general descriptions of CABAC parsing process for slice data: if the value of sps_high_throughput_mode_enabled_flag is 1, the alignment processing is performed after last_sig_coeff_x_prefix, last_sig_coeff_y_prefix, last_sig_coeff_x_suffix and last_sig_coeff_y_suffix (if present) in residual_coding(x0, y0, log 2TbWidth, log 2TbHeight, cIdx), and the alignment processing is performed at the beginning of residual_ts_coding(x0, y0, log 2TbWidth, log 2TbHeight, cIdx). Or, the alignment processing is performed before the first dec_abs_level, abs_remainder or sb_coded_flag of the TB. Or, the alignment processing is performed before the first syntax element coded by using the bypass mode of the TB.

It should be noted that in the embodiment of the disclosure, input of the alignment processing is the variable ivlCurrRange, and output of the alignment processing is an updated variable ivlCurrRange, here, ivlCurrRange is set to 256.

Further, in the embodiment of the disclosure, whether to perform coding and decoding by using the high throughput mode, may be controlled by using sequence level flag information and slice level flag information. Specifically, the high throughput mode flag information may include the sequence level flag information and the slice level flag information; if the value of the sequence level flag information is a first value, then the value of the slice level flag information may be determined; if the value of the slice level flag information is the first value, the high throughput mode may be selected, that is, the coefficients of the current block may be determined by using the alignment processing; and/or, the coefficients of the current block may be determined by using the bypass mode; and/or, the coefficients of the current block may be determined by using at least one of the context mode or the bypass mode.

Exemplarily, in the disclosure, there is a sequence level flag sps_extension_flag. At the sequence level, if the value of sps_extension_flag is 1, sps_range_extension_flag needs to be decoded; and if the value of sps_range_extension_flag is 1, the sequence level flag information sps_high_throughput_mode_enabled_flag needs to be decoded. Specifically, the sequence parameter set RBSP syntax is shown above in Table 3, and the sequence parameter set range extension syntax is shown above in Table 4.

Further, in the disclosure, sps_high_throughput_mode_enabled_flag is a flag of enabling a high throughput mode of a current sequence. If the value of sps_high_throughput_mode_enabled_flag is 1, then the slice level flag information sh_high_throughput_mode_flag needs to be decoded at the slice level. If the value of sh_high_throughput_mode_flag is 1, it indicates that the high throughput mode is used in blocks within a current slice, and if the value of sh_high_throughput_mode_flag is 0, it indicates that the high throughput mode is not used in blocks within the current slice.

It should be noted that in the embodiment of the disclosure, if the value of sps_high_throughput_mode_enabled_flag is equal to 1, it indicates that sh_high_throughput_mode_flag appears in slice header of the current sequence, and if the value of sps_high_throughput_mode_enabled_flag is equal to 0, it indicates that sh_high_throughput_mode_flag does not appear in the slice header of the current sequence. If sps_high_throughput_mode_enabled_flag does not appear, the value of sps_high_throughput_mode_enabled_flag may be considered to be 0.

Specifically, in the disclosure, slice header syntax is shown in Table 7:

TABLE 7

| | Descriptor |
|---|---|
| slice_header( ) { | |
| ... | |
| if(sps_high_throughput_mode_enabled_flag) | |
| sh_high_throughput_mode_flag | u(1) |
| ... | |

If the value of sh_high_throughput_mode_flag is equal to 1, it indicates that the high throughput mode is used in blocks within the current slice, and if the value of sh_high_throughput_mode_flag is equal to 0, it indicates that the high throughput mode is not used in blocks within the current slice. If sh_high_throughput_mode_flag does not appear, the value of sh_high_throughput_mode_flag may be considered to be 0.

Exemplarily, in the disclosure, in terms of syntax, an original sentence remBinsPass1=((1<<(log 2TbWidth+log 2TbHeight))×7)>>2 of residual_coding(x0, y0, log 2TbWidth, log 2TbHeight, cIdx) in residual coding syntax of Table 1 may be replaced by conditional sentences shown in Table 8 below:

TABLE 8

```
if (sh_high_throughput_mode_flag){
  remBinsPass1 = 0
}else{
  remBinsPass1 = ( ( 1 << ( log2TbWidth + log2TbHeight ) ) × 7 ) >> 2
}
```

Exemplarily, in the disclosure, in terms of syntax, an original sentence RemCcbs=((1<<(log 2TbWidth+log 2TbHeight))×7)>>2 of residual_ts_coding(x0, y0, log 2TbWidth, log 2TbHeight, cIdx) in residual coding syntax of Table 2 may be replaced by conditional sentences shown in Table 9 below:

TABLE 9

```
if (sh_high_throughput _mode_flag){
  RemCcbs = 0
}else{
  RemCcbs = ( ( 1 << ( log2TbWidth + log2TbHeight ) )×7 ) >> 2
}
```

It should be noted that in the embodiment of the disclosure, with respect to sb_coded_flag which needs to be decoded, if the value of sh_high_throughput_mode_flag is 1, sb_coded_flag is decoded by using the bypass mode; otherwise, sb_coded_flag is decoded by using a common context mode.

The following process is added in general descriptions of CABAC parsing process for slice data: if the value of sh_high_throughput_mode_flag is 1, the alignment processing is performed after last_sig_coeff_x_prefix, last_sig_coeff_y_prefix, last_sig_coeff_x_suffix and last_sig_coeff_y_suffix (if present) in residual_coding(x0, y0, log 2TbWidth, log 2TbHeight, cIdx), and the alignment processing is performed at the beginning of residual_ts_coding (x0, y0, log 2TbWidth, log 2TbHeight, cIdx). Or, the alignment processing is performed before the first dec_abs_level, abs_remainder or sb_coded_flag of the TB. Or, the alignment processing is performed before the first syntax element coded by using the bypass mode of the TB.

It should be noted that in the embodiment of the disclosure, input of the alignment processing is the variable ivlCurrRange, and output of the alignment processing is the updated variable ivlCurrRange, here, ivlCurrRange is set to 256.

In conclusion, in the embodiment of the disclosure, according to the decoding method proposed by the above operations 101 and 102, during coding and decoding of the video with high bit width, high bit rate and high quality, it may take the following items into consideration in combination: whether to perform coding and decoding by using only the bypass mode, whether to perform coding and decoding by using the context mode, and whether to perform the alignment processing by setting a high throughput mode, so that the coefficients of the current block are further determined by using at least one of the context mode, the bypass mode or the alignment processing. Specifically, on one hand, since the distribution rule of coefficients is different from that of a regular video scenario, throughput of decoding the coefficients can be improved by reducing or even eliminating a number of syntax elements decoded by using the context mode during decoding of the coefficients. On the other hand, a large piece of continuous and aligned bypass mode coding may be formed in the high throughput mode, which can further improve throughput.

According to the decoding method provided in the embodiment of the disclosure, when the encoder and decoder code and decode the coefficients respectively, by setting a high throughput mode, the encoder and decoder may take the following items into consideration in combination: whether to perform coding and decoding by using only the bypass mode, whether to perform coding and decoding by using the context mode, and whether to perform the alignment processing, so that the coefficients of the current block are further determined by using at least one of the context mode, the bypass mode or the alignment processing. It can improve throughput for coding the coefficients and coding and decoding speeds, and reduce complexity, thereby improving the compression performance.

Based on the above embodiment, in another embodiment of the disclosure, the high throughput mode flag information may be understood as a flag bit indicating that an initial value of a quantity parameter is reduced, that is, the high throughput mode flag information is used to determine whether the initial value of the quantity parameter is reduced for the current block, then the high throughput mode flag information may be indicated by using the flag high_throughput_mode_enabled_flag.

Specifically, in the disclosure, if the value of high_throughput_mode_enabled_flag is 1, then it may indicate that the initial value of the quantity parameter is reduced; if the value of high_throughput_mode_enabled_flag is 0, then it may indicate that the initial value of the quantity parameter is not reduced.

It may be understood that in the embodiment of the disclosure, the initial value of the quantity parameter indicates a maximum number of syntax elements which may be coded/decoded by using the context mode. Specifically, the quantity parameter may be a parameter indicating a number of remaining syntax elements available in the current block and coded by using the context mode, and the initial value of the quantity parameter is a value initially set for the quantity parameter.

That is, in the disclosure, the quantity parameter may be understood as a parameter indicating a number of syntax elements decoded by using the context mode in the current block.

Further, in the disclosure, a parameter value that is set when the quantity parameter does not enter a stage of decoding the syntax elements is the initial value of the quantity parameter.

Exemplarily, based on Table 1, in case of RRC, the quantity parameter of the syntax element may be indicated by using the flag remBinsPass1. Then, an initial value of remBinsPass1 that is set before coding and decoding the syntax element is the initial value of the quantity parameter.

Exemplarily, based on Table 2, in case of TSRC, the quantity parameter may be indicated by using the flag RemCcbs. Then, an initial value of RemCcbs that is set before coding and decoding the syntax element is the initial value of the quantity parameter Further, in the embodiment of the disclosure, when determining the initial value of the quantity parameter according to the high throughput mode flag information, if the value of the high throughput mode flag information is the first value, the initial value of the quantity parameter may be determined as the first quantity value; if the value of the high throughput mode flag information is the second value, the initial value of the quantity parameter may be determined according to height and width parameters of the current block.

The first quantity value is an integer equal to or greater than 0 and less than a quantity threshold. For example, if the quantity threshold is 4, then the first quantity value may be set to 0, 1, 2 or 3.

It should be noted that in the disclosure, based on Table 1, with respect to any coefficient, up to four syntax elements decoded by using the context mode may need to be processed. Therefore, syntax elements decoded by using the context mode may be processed only when remBinsPass1 is equal to or greater than 4. That is, in case of remBinsPass1<4, the syntax elements decoded by using the context mode are not processed.

Correspondingly, in the disclosure, if the value of the high throughput mode flag information is the first value, then the initial value of the quantity parameter may be directly determined as the first quantity value, so that remBinsPass1>=4 is not established, and thus the syntax elements decoded by using the context mode are not processed. If the value of the high throughput mode flag information is the second value, a common mode may continue to be used, to determine the initial value of the quantity parameter according to height and width parameters of the current block. For example, remBinsPass1 is assumed to be equal to ((1<<(log 2TbWidth+log 2TbHeight))×7)>>2 based on Table 1.

That is, in the disclosure, based on Table 1, in case of RRC, it is determined by using the high throughput mode flag information whether to determine the coefficients of the current block (or values of the coefficients of the current block) by using the context mode, that is, the high throughput mode flag information is indicated by using the flag high_throughput_mode_enabled_flag, if the initial value of the quantity parameter remBinsPass1 is determined according to the high throughput mode flag information, the sentence remBinsPass1=((1<<(log 2TbWidth+log 2TbHeight))×7)>>2 in Table 1 may be replaced by conditional sentences shown in Table 10 below:

TABLE 10

```
if (high_throughput_mode _enabled_flag){
  remBinsPass1 = 0
}else{
  remBinsPass1 = ( ( 1 << ( log2TbWidth + log2TbHeight ) )×7 ) >> 2
}
```

It may be seen that after parsing the bitstream and determining the high throughput mode flag information high_throughput_mode_enabled_flag of the current block, if high_throughput_mode_enabled_flag is not 0, then remBinsPass1=0 (or, 1, 2 or 3) is set, so that remBinsPass1>=4 is not established, and thus the syntax elements decoded by using the context mode are not processed. If high_throughput_mode_enabled_flag is 0, the method for setting the initial value of remBinsPass1 may be consistent with Table 1, that is, remBinsPass1=((1<<(log 2TbWidth+log 2TbHeight))×7)>>2 is set.

It should be noted that in the disclosure, based on Table 2, the TSRC method places syntax elements decoded by using the context mode in two rounds, and with respect to any coefficient, up to four syntax elements decoded by using the context mode may be processed in first and second rounds respectively. Therefore, the syntax elements decoded by using the context mode are processed in the first or second round only when RemCcbs>=4 is established. That is, in case of RemCcbs<4, the syntax elements decoded by using the context mode are not processed.

Correspondingly, in the disclosure, if the value of the high throughput mode flag information is the first value, then the initial value of the quantity parameter may be directly determined as the first quantity value, so that RemCcbs>=4 is not established, and thus the syntax elements decoded by using the context mode are not processed. If the value of the high throughput mode flag information is the second value, a common mode may continue to be used, to determine the initial value of the quantity parameter according to height and width parameters of the current block. For example, RemCcbs is assumed to be equal to ((1<<(log 2TbWidth+log 2TbHeight))×7)>>2 based on Table 2.

That is, in the disclosure, based on Table 2, in case of TSRC, it is determined by using the high throughput mode flag information whether to determine the coefficients of the current block (or values of the coefficients of the current block) by using the context mode. That is, the high throughput mode flag information is indicated by using the flag high_throughput_mode_enabled_flag, if the initial value of the quantity parameter RemCcbs is determined according to the high throughput mode flag information, the sentence RemCcbs=((1<<(log 2TbWidth+log 2TbHeight))×7)>>2 in Table 2 may be replaced by conditional sentences shown in Table 11 below:

TABLE 11

```
if (high_throughput_mode _enabled_flag){
  RemCcbs = 0
}else{
  RemCcbs = ( ( 1 << ( log2TbWidth + log2TbHeight ) )×7 ) >> 2
}
```

It may be seen that after parsing the bitstream and determining the high throughput mode flag information high_throughput_mode_enabled_flag of the current block, if high_throughput_mode_enabled_flag is not 0, then RemCcbs=0 (or, 1, 2 or 3) is set, so that RemCcbs>=4 is not established, and thus the syntax elements decoded by using the context mode are not processed. If high_throughput_mode_enabled_flag is 0, the method for setting the initial value of RemCcbs may be consistent with Table 2, that is, RemCcbs=((1<<(log 2TbWidth+log 2TbHeight))×7)>>2 is set.

Further, in the embodiment of the disclosure, it is determined by using the high throughput mode flag information whether the initial value of the quantity parameter is reduced. When determining the initial value of the quantity parameter according to the high throughput mode flag information, if the value of the high throughput mode flag information is the first value, the initial value of the quantity parameter may be determined as the second quantity value; if the value of the high throughput mode flag information is the second value, then the initial value of the quantity parameter may be determined according to height and width parameters of the current block.

It should be noted that in the embodiment of the disclosure, the second quantity value may be used to reduce the initial value of the quantity parameter. Specifically, the second quantity value may be less than the initial value of the quantity parameter determined according to height and width parameters of the current block.

Optionally, in the disclosure, it is determined by using the high throughput mode flag information whether the initial value of the quantity parameter is reduced. When determining the initial value of the quantity parameter according to the high throughput mode flag information, if the value of the high throughput mode flag information is the first value, the initial value of the quantity parameter may be determined according to height and width parameters of the current block and the first shift parameter; if the value of the high throughput mode flag information is the second value, then the initial value of the quantity parameter may be determined according to height and width parameters of the current block and the second shift parameter.

It should be noted that in the embodiment of the disclosure, the first shift parameter and the second shift parameter may be used in right shift processing, and the first shift parameter is greater than the second shift parameter. That is, in a case that other conditions are the same, the initial value of the quantity parameter corresponding to the first shift parameter is less than the initial value of the quantity parameter corresponding to the second shift parameter, after performing right shift processing according to the first shift parameter and the second shift parameter.

It may be seen that in the disclosure, if the value of the high throughput mode flag information is the first value, then regardless of whether the initial value of the quantity parameter is determined as a fixed value (the second quantity value), or a number of right shifted bits is increased (the original first shift parameter is adjusted to the second shift parameter) when the initial value of the quantity parameter is calculated, an ultimate purpose thereof is to reduce the initial value of the quantity parameter, that is, reducing the initial value of the quantity parameter is to reduce a number of syntax elements decoded by using the context mode.

It should be noted that in the disclosure, based on Table 1, with respect to any coefficient, up to four syntax elements to be decoded by using the context mode may need to be processed. Therefore, syntax elements decoded by using the context mode may be processed only when remBinsPass1>=4 is established. That is, in case of remBinsPass1<4, the syntax elements decoded by using the context mode are not processed.

Correspondingly, in the disclosure, if the value of the high throughput mode flag information is the first value, then the initial value of the quantity parameter may be directly determined as a fixed value, for example, remBinsPass1 is equal to the second quantity value; or, the initial value of the quantity parameter is determined as remBinsPass1=((1<<(log 2TbWidth+log 2TbHeight))×7)>>4 (that is, the first shift parameter is 4), thereby reducing a number of syntax elements decoded by using the context mode. If the value of the high throughput mode flag information is the second value, a common mode may continue to be used, to determine the initial value of the quantity parameter according to height and width parameters of the current block. For example, let remBinsPass1=((1<<(log 2TbWidth+log 2TbHeight))×7)>>2 based on Table 1.

That is, in the disclosure, based on Table 1, in case of RRC, it is determined by using the high throughput mode flag information whether to reduce the syntax elements of the coefficients in the context mode, that is, the high throughput mode flag information is indicated by using the flag high_throughput_mode_enabled_flag, then when determining the initial value of the quantity parameter remBinsPass1 according to the high throughput mode flag information, a sentence remBinsPass1=((1<<(log 2TbWidth+log 2TbHeight))×7)>>2 in Table 1 may be replaced by conditional sentences shown in Table 12 below:

TABLE 12

```
if (high_throughput_mode _enabled_flag){
  remBinsPass1 = ( ( 1 << ( log2TbWidth + log2TbHeight ) )×7 ) >> 4
}else{
  remBinsPass1 = ( ( 1 << ( log2TbWidth + log2TbHeight ) )×7 ) >> 2
}
```

It may be seen that after parsing the bitstream and determining the high throughput mode flag information high_throughput_mode_enabled_flag of the current block, when high_throughput_mode_enabled_flag is not 0, then remBinsPass1=((1<<(log 2TbWidth+log 2TbHeight))×7)>>4 is set, so that a number of the syntax elements to be decoded by using the context mode later is reduced. If high_throughput_mode_enabled_flag is 0, the method for setting the initial value of remBinsPass1 may be consistent with Table 1, that is, remBinsPass1=((1<<(log 2TbWidth+log 2TbHeight))×7)>>2 is set.

Optionally, in the disclosure, if the value of the high throughput mode flag information is the first value, other modes may also be used to set remBinsPass1. For example, a parameter is set, the initial value of remBinsPass1 may be set as remBinsPass1=((1<<(log 2TbWidth+log 2TbHeight))×7)>>(2+parameter).

The parameter may be determined by a sequence level flag, a slice level flag or other level flags. Specifically, when the flag is not present, the value of the parameter is 0. The value of the parameter may be 0, 1, 2, 3, etc. Then, modification of such syntax may not use formats of "if" and "else". An adjustable range is more flexible too.

Exemplarily, in the disclosure, ccb_right_shift_level_flag may be set, and value of ccb_right_shift_level_flag may be 0, 1, 2, 3, 4, 5 or 6. The value of the parameter is equal to the value of ccb_right_shift_level_flag. If ccb_right_shift_level_flag is not present, the value of the parameter is 0.

It should be noted that in the disclosure, based on Table 2, the TSRC method places syntax elements decoded by using the context mode in two rounds, and with respect to any coefficient, up to four syntax elements decoded by using the context mode may be processed in first and second rounds respectively. Therefore, the syntax elements decoded by using the context mode are processed in the first or second round only when RemCcbs>=4 is established. That is, in case of RemCcbs<4, the syntax elements decoded by using the context mode are not processed.

Correspondingly, in the disclosure, if the value of the high throughput mode flag information is the first value, then the initial value of the quantity parameter may be directly determined as a fixed value, for example, RemCcbs is equal to the second quantity value; or, the initial value of the quantity parameter is determined as RemCcbs=((1<<(log 2TbWidth+log 2TbHeight))×7)>>4 (that is, the first shift parameter is 4), thereby reducing a number of syntax elements to be decoded by using the context mode. If the value of the high throughput mode flag information is the second value, a common mode may continue to be used, to determine the initial value of the quantity parameter according to height and width parameters of the current block. For example, RemCcbs is assumed to be equal to ((1<<(log 2TbWidth+log 2TbHeight))×7)>>2 based on Table 2.

That is, in the disclosure, based on Table 2, in case of TSRC, it is determined by using the high throughput mode flag information whether to reduce the syntax elements of the coefficients in the context mode. That is, the high throughput mode flag information is indicated by using the flag high_throughput_mode_enabled_flag. If the initial value of the quantity parameter RemCcbs is determined according to the high throughput mode flag information, a sentence RemCcbs=((1<<(log 2TbWidth+log 2TbHeight))×7)>>2 in Table 2 may be replaced by conditional sentences shown in Table 13 below:

TABLE 13

```
if (high_throughput_mode _enabled_flag){
  RemCcbs = ( ( 1 << ( log2TbWidth + log2TbHeight ) )×7 ) >> 4
}else{
  RemCcbs = ( ( 1 << ( log2TbWidth + log2TbHeight ) )×7 ) >> 2
}
```

It may be seen that after parsing the bitstream and determining the high throughput mode flag information high_throughput_mode_enabled_flag of the current block, if high_throughput_mode_enabled_flag is not 0, then RemCcbs=((1<<(log 2TbWidth+log 2TbHeight))×7)>>4 is set, so that a number of the syntax elements to be decoded by using the context mode later is reduced. If high_throughput_mode_enabled_flag is 0, the method for setting the initial value of RemCcbs may be consistent with Table 2, that is, RemCcbs=((1<<(log 2TbWidth+log 2TbHeight))×7)>>2 is set.

Optionally, in the disclosure, if the value of the high throughput mode flag information is the first value, other modes may also be used to set RemCcbs. For example, a parameter is set, the initial value of RemCcbs may be set as RemCcbs=((1<<(log 2TbWidth+log 2TbHeight))×7)>>(2+parameter).

The parameter may be determined by a sequence level flag, a slice level flag or other level flags. Specifically, if the flag is not present, the value of the parameter is 0. The value of the parameter may be 0, 1, 2, 3, etc. Then, modification of the syntax may not use formats of "if" and "else". An adjustable range is more flexible too.

Exemplarily, in the disclosure, ccb_right_shift_level_flag may be set, and the value of ccb_right_shift_level_flag may be 0, 1, 2, 3, 4, 5 or 6. The value of the parameter is equal to the value of ccb_right_shift_level_flag. If ccb_right_shift_level_flag is not present, the value of the parameter is 0.

Further, in the disclosure, since the parameter value that is set when the quantity parameter does not enter the decoding stage of the syntax elements may be considered as the initial value of the quantity parameter, even if RemCcbs=((1<<(log 2TbWidth+log 2TbHeight))×7)>>2 has been set according to the mode of Table 1 or Table 2, as long as it is established that the value of the high throughput mode flag information (high_throughput_mode_enabled_flag) is the first value before entering the stage of decoding the syntax elements (that is, before performing remBinsPass1—or RemCcbs—), then the initial value of the quantity parameter may be reset according to the methods proposed in the disclosure, and the reset parameter value may be determined as the initial value of the quantity parameter.

Exemplarily, based on Table 10, it may also be replaced by conditional sentences shown in Table 14 below:

TABLE 14

```
remBinsPass1 = ( ( 1 << ( log2TbWidth + log2TbHeight ) )×7 ) >> 2
if (high_throughput_mode _enabled_flag){
  remBinsPass1 = 0
}
......
```

Exemplarily, based on Table 11, it may also be replaced by conditional sentences shown in Table 15 below:

TABLE 15

```
RemCcbs = ( ( 1 << ( log2TbWidth + log2TbHeight ) )×7 ) >> 2
if (high_throughput_mode _enabled_flag){
  RemCcbs = 0
}
......
```

Exemplarily, based on Table 12, it may also be replaced by conditional sentences shown in Table 16 below:

TABLE 16

```
remBinsPass1 = ( ( 1 << ( log2TbWidth + log2TbHeight ) )×7 ) >> 2
if (high_throughput_mode _enabled_flag){
  remBinsPass1 = ( ( 1 << ( log2TbWidth + log2TbHeight ) )×7 ) >> 4
}
......
```

Exemplarily, based on Table 13, it may also be replaced by conditional sentences shown in Table 17 below:

TABLE 17

```
RemCcbs = ( ( 1 << ( log2TbWidth + log2TbHeight ) )×7 ) >> 2
if (high_throughput_mode _enabled_flag){
  RemCcbs = ( ( 1 << ( log2TbWidth + log2TbHeight ) )×7 ) >> 4
}
......
```

Further, in the embodiment of the disclosure, after the decoder determines the initial value of the quantity parameter according to the high throughput mode flag information, the decoder may determine whether to determine the coefficients of the current block by using the context mode, according to the initial value of the quantity parameter.

Further, in the embodiment of the disclosure, if the initial value of the quantity parameter is equal to or greater than the quantity threshold, then the coefficients of the current block may be determined by using the context mode; if the initial value of the quantity parameter is less than the quantity threshold, then the coefficients of the current block may be determined by using the bypass mode.

It should be noted that in the embodiment of the disclosure, if the initial value of the quantity parameter is equal to or greater than the quantity threshold, then the coefficients of the current block may be determined by using the bypass mode while the coefficients of the current block are determined by using the context mode, that is, the coefficients of the current block are determined by using at least the context mode.

It should be noted that in the embodiment of the disclosure, if the initial value of the quantity parameter is less than the quantity threshold, then the coefficients of the current block may be determined by using only the bypass mode without using the context mode.

It may be understood that in the disclosure, whether in case of RRC or TSRC, the syntax elements decoded by using the context mode are processed only when remBinsPass1>=4 or RemCcbs>=4 is established. Therefore, the quantity threshold may be set to 4.

It may be understood that in the embodiment of the disclosure, the initial value of the quantity parameter is reduced or set to 0 (or, 1, 2 or 3) based on the high throughput mode flag information, and whether the coefficients of the current block are not further reconstructed by using the context mode, is selected according to the initial value of the quantity parameter.

Furthermore, in the disclosure, all the coefficients before the position of the last non-zero coefficient may be decoded sequentially based on the context mode or the bypass mode, and finally reconstruction coefficients of the current block, i.e., coefficients for reconstructing the current block, may be determined.

It may be understood that in the disclosure, all the coefficients before the position of the last non-zero coefficient may be decoded sequentially in a preset scanning order, the preset scanning order may be diagonal, Zigzag, horizontal, vertical, 4×4 subblock scanning or any other scanning orders, the embodiment of the disclosure does not impose any limitation thereto.

It should be noted that in the disclosure, in case of RRC, after entering a function residual_coding(x0, y0, log 2TbWidth, log 2TbHeight, cIdx), some information of the block size need to be determined, for example, logarithms log 2ZoTbWidth and log 2ZoTbHeight of the block size after zero-out are determined, coefficients with abscissae in a range [0, (1<<log 2ZoTbWidth)−1] and ordinates in a range [0, (1<<log 2ZoTbHeight)−1] may be non-zero coefficients. (1<<log 2ZoTbWidth) indicates a width of zeroed-out TB, and (1<<log 2ZoTbHeight) indicates a height of zeroed-out TB. Then, the position of the last non-zero coefficient is determined according to last_sig_coeff_x_prefix, last_sig_coeff_y_prefix, last_sig_coeff_x_suffix, last_sig_coeff_y_suffix, etc. Coefficients before the last non-zero coefficient in the scanning order may be non-zero coefficients. Then, the value of remBinsPass1 is further determined according to the high throughput mode flag information (high_throughput_mode_enabled_flag), and if the value of the high throughput mode flag information high_throughput_mode_enabled_flag is the first value, the value of remBinsPass1 may be directly set to 0, or the value of remBinsPass1 may be set to a value less than ((1<<(log 2TbWidth+log 2TbHeight))×7)>>2. Then, a number of syntax elements to be decoded by using the context mode within the current block is determined through remBinsPass1. Coefficients before the last non-zero coefficient in the scanning order need to be decoded. For a subblock where these coefficients are located, whether the current subblock needs to be decoded, is sequentially determined. If the current subblock needs to be decoded, syntax elements decoded by using the context mode within a subblock may be placed in the first round. With respect to each coefficient, up to four syntax elements to be decoded by using the context mode, including one sig_coeff_flag, two abs_level_gtx_flag and one par_level_flag, may need to be processed in the first round. remBinsPass1 is decremented by 1, each time a syntax element to be decoded by using the context mode is processed. If a coefficient is large enough, after processing several syntax elements to be decoded by using the context mode in the first round, the remaining value, i.e., abs_remainder, needs to be processed. Furthermore, if remBinsPass1 is small enough (remBinsPass1>=4 is not met), it may be done with the first round, and the remaining coefficients may be directly processed by using the bypass mode, i.e., dec_abs_level.

Accordingly, in the disclosure, in case of TSRC, after entering a function residual_ts_coding(x0, y0, log 2TbWidth, log 2TbHeight, cIdx), some information of the block size need to be determined. Similarly, the value of RemCcbs needs to be further determined according to the high throughput mode flag information (high_throughput_mode_enabled_flag). If the value of the high throughput mode flag information high_throughput_mode_enabled_flag is the first value, the value of RemCcbs may be directly set to 0, or the value of RemCcbs may be set to a value less than ((1<<(log 2TbWidth+log 2TbHeight))×7)>>2. Then, a number of syntax elements to be decoded by using the context mode within the current block is determined through RemCcbs. Coefficients before the last non-zero coefficient in the scanning order need to be decoded. For a subblock where these coefficients are located, it is sequentially determined whether the current subblock needs to be decoded. If the current subblock needs to be decoded, syntax elements to be decoded by using the context mode within a subblock may be placed in two rounds. With respect to each coefficient, up to four syntax elements to be decoded by using the context mode are processed in first and second rounds respectively. In the first and second rounds, RemCcbs is decremented by 1, each time a syntax element to be decoded by using the context mode is processed. If a coefficient is large enough, after processing several syntax elements to be decoded by using the context mode in the first and second rounds, the remaining value, i.e., abs_remainder, needs to be processed. Furthermore, if RemCcbs is small enough (RemCcbs>=4 is not met), it may be done with the first and second rounds, and the remaining coefficients may be directly processed by using the bypass mode, which is still abs_remainder here.

Further, in the disclosure, with respect to coefficient sign flag information coeff_sign_flag, if transform skip flag[x0][y0] [cIdx]==0||n>lastScanPosPass1||sh_ts_residual_coding_disabled_flag is established, coeff_sign_flag is decoded by using the bypass mode; otherwise, coeff_sign_flag is decoded by using the context mode.

It may be understood that in the disclosure, if remBinsPass1 or RemCcbs is reduced, lastScanPosPass1 may be reduced, and then coeff_sign_flag decoded by using the context mode may also be reduced. If remBinsPass1 or RemCcbs is set to 0 when high_throughput_mode_enabled_flag is established, then the corresponding RRC or TSRC may not use the context mode when coeff_sign_flag is decoded. If the value of remBinsPass1 or RemCcbs is set to be less than that in the existing method when high_throughput_mode_enabled_flag is established, then the corresponding RRC or TSRC may reduce a number of context modes used when coeff_sign_flag is decoded. This further reduces a number of syntax elements decoded by using the context mode.

In conclusion, in the embodiment of the disclosure, during coding and decoding of the video with high bit width, high bit rate and high quality, since the distribution rule of coefficients is different from that in a regular video scenario, throughput of decoding the coefficients may be improved by reducing or even eliminating a number of syntax elements decoded by using the context mode during decoding of the coefficients. Furthermore, since the distribution rule of coefficients in the regular video is used when the syntax elements decoded by using the context mode are designed, compression efficiency of the regular video is significantly improved. However, design of syntax elements decoded by using the context mode does not conform to the distribution rule of coefficients in the video with high bit width, high bit rate and high quality. Reducing or even eliminating usage of syntax elements decoded by using the context mode in the video with high bit width, high bit rate and high quality, may not reduce the compression efficiency, instead, may improve the compression efficiency to a certain extent.

It may be understood that in the disclosure, in case of a specific scenario, the number of syntax elements to be wcoded by using the context mode may be reduced during decoding of the coefficients. That is, in a normal situation, the coefficient decoding method is still the same as a common method; while in a case of coding and decoding the video with high bit width, high quality, high bit rate or high picture rate, the number of syntax elements decoded by using the context mode is reduced during decoding of the coefficients.

Specifically, in the disclosure, the number of syntax elements to be decoded by using the context mode may be reduced to 0. Optionally, the number of syntax elements to be coded by using the context mode is reduced to 0, meanwhile, all the coefficients are coded by using the bypass mode. The methods proposed in the disclosure may be applied to RRC and/or TSRC.

Exemplarily, in the disclosure, there is a sequence level flag sps_high_bit_depth_flag to indicate whether the current sequence is a high bit width sequence. If the value of sps_high_bit_depth_flag is 1, it indicates that the current sequence is a high bit width sequence; otherwise, it indicates that the current sequence is not a high bit width sequence. At the sequence level, if the value of sps_high_bit_depth_flag is 1, sps_high_throughput_mode_enabled_flag needs to be decoded. sps_high_throughput_mode_enabled_flag is a flag of enabling a high throughput mode of the current sequence. If the value of sps_high_throughput_mode_enabled_flag is 1, it indicates that the high throughput mode is enabled for blocks within the current sequence. For example, the syntax elements of the coefficients coded by using the context mode are not used in blocks within the current sequence. If the value of sps_high_throughput_mode_enabled_flag is 0, it indicates that the high throughput mode is not used in blocks within the current sequence. high_throughput_mode_enabled_flag in the above syntax table is changed to sps_high_throughput_mode_enabled_flag. Specifically, sequence parameter set RBSP syntax is shown in Table 18.

TABLE 18

```
......
  sps_high_bit_depth_flag
  if( sps_high_bit_depth_flag )
    sps_high_throughput_mode_enabled_flag
......
```

Exemplarily, in the disclosure, there is a sequence level flag sps_extension_flag. At the sequence level, if the value of sps_extension_flag is 1, sps_range_extension_flag needs to be decoded. If the value of sps_range_extension_flag is 1, sps_high_throughput_mode_enabled_flag needs to be decoded. sps_high_throughput_mode_enabled_flag is a flag of enabling a high throughput mode of the current sequence. If the value of sps_high_throughput_mode_enabled_flag is 1, it indicates that the high throughput mode is used in blocks within the current sequence. For example, the syntax elements of the coefficients coded by using the context mode are not used in blocks within the current sequence. If the value of sps_high_throughput_mode_enabled_flag is 0, it indicates that the high throughput mode is not used in blocks within the current sequence. high_throughput_mode_enabled_flag in the above syntax table is changed to sps_high_throughput_mode_enabled_flag. sps_extension_flag may be considered as a flag indicating whether the current sequence uses extended versions of the standard. sps_range_extension_flag is a flag indicating whether the current sequence uses range extension, such as high bit width, high bit rate, etc. Sequence parameter set RBSP syntax is shown above in Table 3, and sequence parameter set range extension syntax is shown above in Table 4.

In terms of semantics, sps_extension_flag equal to 1 indicates that syntax elements sps_range_extension_flag and sps_extension_7 bits will appear in SPS RBSP syntax structure. sps_extension_flag equal to 0 indicates that these syntax elements will not appear. sps_range_extension_flag equal to 1 indicates that a sps_range_extension( ) syntax structure will appear in the SPS RBSP syntax structure. If sps_range_extension_flag does not appear, the value of sps_range_extension_flag is 0.

Exemplarily, in the disclosure, there is a sequence level flag sps_extension_flag. At the sequence level, if the value of sps_extension_flag is 1, sps_range_extension_flag needs to be decoded. If the value of sps_range_extension_flag is 1, sps_high_throughput_mode_enabled_flag needs to be decoded. sps_high_throughput_mode_enabled_flag is a flag of enabling a high throughput mode of the current sequence. If the value of sps_high_throughput_mode_enabled_flag is 1, it indicates that the high throughput mode may be enabled for blocks within the current sequence. For example, the syntax elements of the coefficients coded by using the context mode are not used in blocks within the current sequence. If the value of sps_high_throughput_mode_enabled_flag is 0, it indicates that the high throughput mode may not be enabled for blocks within the current sequence. When sps_high_throughput_mode_enabled_flag does not appear, the value of sps_high_throughput_mode_enabled_flag is 0

At the slice level, if the value of sps_high_throughput_mode_enabled_flag is 1, sh_high_throughput_mode_flag needs to be decoded. sh_high_throughput_mode_flag is a flag enabling a high throughput mode of the current slice. If the value of sh_high_throughput_mode_flag is 1, it indicates that the high throughput mode is used in the current slice. For example, the syntax elements of the coefficients coded by using the context mode are not used in blocks within the current slice. If the value of sh_high_throughput_mode_flag is 0, it indicates that the high throughput mode is not used in the current slice. Specifically, sequence parameter set RBSP syntax is shown in Table 19.

TABLE 19

| | |
|---|---|
| ...... | |
| if (sps_high_throughput_mode_enabled_flag) | |
| sh_high_throughput_mode_flag | u(1) |
| ...... | |

That is, in the disclosure, sps_high_throughput_mode_enabled_flag equal to 1 indicates that the high throughput mode is used in blocks within the current sequence; if the value of sps_high_throughput_mode_enabled_flag is 0, it indicates that the high throughput mode may not be used in blocks within the current sequence. sh_high_throughput_mode_flag equal to 1 indicates that the high throughput mode is used in blocks within the current slice, for example, remBinsPass1 and RemCcbs of the block within the current slice are set to 0; if the value of sh_high_throughput_mode_flag is 0, it indicates that the high throughput mode is not used in blocks within the current slice.

It should be noted that in the disclosure, the above sequence level flag sps_high_bit_depth_flag is a flag indicating whether the current sequence is a high bit width sequence, or may be replaced by sps_high_bit_rate_flag which is a flag indicating whether the current sequence is a high bit rate sequence, or by other flags indicating high bit width, high bit rate, high quality or lossless coding.

It may be understood that in the embodiment of the disclosure, all the above methods take an example of uniformly using this technology in all the components of the video. All the components refer to R, G, B of a video in RGB format or Y, U, V (Y, Cb, Cr) in YUV format. The above methods may also be used in only a certain component, such as only the Y component of YUV format. The above methods may also be used in each component respectively, that is, each component may be controlled to turn on or off independently.

According to the decoding method provided in the embodiment of the disclosure, when the encoder and decoder code and decode the coefficients respectively, by setting a high throughput mode, the encoder and decoder may take the following items into consideration in combination: whether to perform coding and decoding by using only the bypass mode, whether to perform coding and decoding by using the context mode, and whether to perform the alignment processing, so as to further determine the coefficients of the current block by using at least one of the context mode, the bypass mode or the alignment processing. It can improve throughput for coding the coefficients and coding and decoding speeds, and reduce complexity, thereby improving compression performance.

Another embodiment of the disclosure proposes a decoding method, applied to a decoder. FIG. 14 is a second schematic flowchart of implementation of the decoding method. As shown in FIG. 14, the method for the decoder to perform decoding may include the following operations 103 and 102.

At 103, decoded information is determined, and high throughput mode flag information of a current block is determined according to the decoded information.

At 102, coefficients of the current block are determined based on the high throughput mode flag information, by using at least one of a context mode, a bypass mode or alignment processing.

In the embodiment of the disclosure, the decoded information may be determined first. Then, the high throughput mode flag information of the current block may be determined according to the decoded information. Then, the coefficients of the current block may be determined based on the high throughput mode flag information, by using at least one of the context mode, the bypass mode or the alignment processing. The high throughput mode flag information may be used to improve throughput of coding and decoding.

It may be understood that in the embodiment of the disclosure, when coding/decoding the current block, the decoded information may indicate information of current coded/decoded blocks. Correspondingly, when coding/decoding current partial contents, the decoded information may indicate information of current coded/decoded partial contents.

Optionally, in the embodiment of the disclosure, the decoded information at least includes decoded information of one of the following: first n decoded slices, first n decoded LCUs, first n decoded CTUs, first n decoded CUs, first n decoded TUs, or first n decoded TBs, here, n is an integer greater than 0.

That is, in the disclosure, the current partial contents include but are not limited to a current slice, a current CTU, a current LCU, a current CU, a current TU, or a current TB, etc. Correspondingly, the coded/decoded partial contents include but are not limited to coded/decoded slices, coded/decoded LCUs, coded/decoded CUs, coded/decoded TUs, or coded/decoded TBs, etc.

Exemplarily, in the embodiment of the disclosure, the coded/decoded partial contents include but are not limited to the first n slices, the first n CTUs, the first n LCUs, the first n CUs, the first n TUs, the first n TBs, or the like, here, n is 1, 2 . . . etc.

Exemplarily, in the embodiment of the disclosure, the coded/decoded partial contents include but are not limited to all the slices, CTUs, LCUs, CUs, TUs, TBs or the like (in a certain range) before the current partial contents.

Further, in the embodiment of the disclosure, the decoded information at least includes one of the following information: bit rate, coefficients, residuals, or number of bits.

That is, in the disclosure, the decoded information includes but is not limited to bit rate, coefficients, residuals, number of bits, some other variables or parameters, or statistics of parameters.

Further, in the embodiment of the disclosure, the value of the high throughput mode flag information of the current block may be determined from the decoded information, so as to determine whether to use the high throughput mod based on the value of the high throughput mode flag information. That is, it may be determined whether to use high-throughput coding and decoding methods (the high throughput mode) to code and decode the current partial contents, according to information of the current coded/decoded partial contents.

It should be noted that in the embodiment of the disclosure, when determining the high throughput mode flag information of the current block according to the decoded information, if the decoded information meets a second preset condition, value of the high throughput mode flag information is determined as a first value; if the decoded information does not meet the second preset condition, the value of the high throughput mode flag information is determined as a second value.

Correspondingly, in the disclosure, the value of the high throughput mode flag information may be the first value or the second value. Specifically, for different values of the high throughput mode flag information, modes of determining the coefficients of the current block (or values of the coefficients of the current block) are also different. The encoding and decoding methods in the high throughput mode include but are not limited to the alignment operation, a full-bypass mode, etc.

It may be understood that in the embodiment of the disclosure, a method which does not use syntax elements of the coefficients coded by using the context mode may be determined as the full-bypass mode.

Further, in the embodiment of the disclosure, the second preset condition may be used to determine a level of the bit rate, that is, the second preset condition may determine whether the bit rate needs to be reduced. Specifically, the second preset condition may include one of the following conditions: the bit rate being equal to or greater than a first threshold, a sum of absolute values of the coefficients being equal to or greater than a second threshold, an average value of the absolute values of the coefficients being equal to or greater than a third threshold, a sum of absolute values of the residuals being equal to or greater than a fourth threshold, an average value of the absolute values of the residuals being equal to or greater than a fifth threshold, or the number of bits being equal to or greater than a sixth threshold.

Exemplarily, in the embodiment of the disclosure, with respect to the current CTU, when some variables or parameters of a previous CTU meet a condition (the decoded information meets the second preset condition), for example, a number of bits used by the previous CTU reaches or exceeds a threshold, or a sum of absolute values of coefficient levels or residual levels of the previous CTU exceeds a threshold, or an average value of the absolute values of the coefficient levels or residual levels of the previous CTU exceeds a threshold, then it may be determined that the value of the high throughput mode flag information is the first value, that is, it may be determined to use the high throughput mode in the current CTU; otherwise, it is considered that the decoded information does not meet the second preset condition, then it is determined that the value of the high throughput mode flag information is the second value, that is, the high throughput mode is not used in the current CTU.

Exemplarily, in the embodiment of the disclosure, with respect to the current TB, if some variables or parameters of a previous TB meet a condition (the decoded information meets the second preset condition), for example, a number of bits used by the previous TB reaches or exceeds a threshold, or a sum of absolute values of coefficient levels or residual levels of the previous TB exceeds a threshold, or an average value of the absolute values of the coefficient levels or residual levels of the previous TB exceeds a threshold, then it may be determined that the value of the high throughput mode flag information is the first value, that is, it may be determined that the high throughput mode is used in the current TB; otherwise, it is considered that the decoded information does not meet the second preset condition, then it is determined that the value of the high throughput mode flag information is the second value, that is, the high throughput mode is not used in the current TB.

Exemplarily, in the embodiment of the disclosure, with respect to the current CTU, if some variables or parameters of a previously coded CTU in the current slice meet a condition (the decoded information meets the second preset condition), for example, an average value of number of bits used by the previously coded CTU in the current slice reaches or exceeds a threshold, or an average value of absolute values of coefficient levels or residual levels of the previously coded CTU in the current slice exceeds a threshold, then it may be determined that the value of the high throughput mode flag information is the first value, that is, it may be determined that the high throughput mode is used in the current CTU; otherwise, it is considered that the decoded information does not meet the second preset condition, then it is determined that the value of the high throughput mode flag information is the second value, that is, the high throughput mode is not used in the current CTU.

Specifically, in the embodiment of the disclosure, based on the value of the high throughput mode flag information, at least one of the context mode, the bypass mode, the alignment processing, or other modes may be selected to be used for determining the coefficients of the current block.

Further, in the embodiment of the disclosure, the high throughput mode flag information may be understood as a flag bit indicating whether to perform the alignment processing.

Optionally, in the disclosure, if the value of the high throughput mode flag information is the first value, usage of the alignment processing may be selected to determine the coefficients of the current block; if the value of the high throughput mode flag information is the second value, the coefficients of the current block may be determined with the alignment processing skipped.

It may be seen that it may be determined whether the coefficients of the current block are determined by using the alignment processing, according to the value of the high throughput mode flag information.

Further, in the embodiment of the disclosure, the high throughput mode flag information may be understood as a flag bit indicating whether to use only the bypass mode.

Optionally, in the disclosure, if the value of the high throughput mode flag information is the first value, usage of the bypass mode may be selected to determine the coefficients of the current block; if the value of the high throughput mode flag information is the second value, usage of at least one of the context mode or the bypass mode may be selected to determine the coefficients of the current block.

It may be seen that it may be determined whether the coefficients of the current block are determined by using only the bypass mode, according to the value of the high throughput mode flag information. That is, it may be determined whether all the coefficients of the current block (or values of all the coefficients of the current block) are determined by using the bypass mode, based on the value of the high throughput mode flag information. For example, if the value of the high throughput mode flag information is the first value, then all the syntax elements sb_coded_flag of the current block which need to be decoded are coded by using the bypass mode.

Further, in the embodiment of the disclosure, the high throughput mode flag information may be understood as a flag bit indicating that an initial value of a quantity parameter is reduced (or, the quantity parameter is set to 0).

Optionally, in the disclosure, the initial value of the quantity parameter may be determined first according to the high throughput mode flag information; if the initial value of the quantity parameter is equal to or greater than a quantity threshold, then usage of at least one of the context mode or the bypass mode may be selected to determine the coefficients of the current block; if the initial value of the quantity parameter is less than the quantity threshold, then usage of the bypass mode may be selected to determine the coefficients of the current block.

It should be noted that in the embodiment of the disclosure, the initial value of the quantity parameter indicates a maximum number of syntax elements which may be coded/decoded by using the context mode. Specifically, the quantity parameter may be a parameter indicating a number of remaining syntax elements available to the current block and coded by using the context mode, and the initial value of the quantity parameter is a value initially set for the quantity parameter.

It may be seen that different modes may be selected according to the value of the high throughput mode flag information, to determine the initial value of the quantity parameter. That is, the high throughput mode flag information may be used to determine the initial value of the quantity parameter, and then it is determined whether the coefficients of the current block are determined by using the context mode, based on the initial value of the quantity parameter.

Exemplarily, in the disclosure, the first value may be set to 1, and the second value may be set to 0; or, the first value may be set to "true", and the second value may be set to "false". The disclosure does not impose any limitation thereto.

Exemplarily, in the disclosure, if the high throughput mode flag information is used to determine whether to determine the coefficients of the current block (or values of the coefficients of the current block) by using at least one of the context mode, the bypass mode or the alignment processing, then a flag high_throughput_mode_enabled_flag may be used to indicate the high throughput mode flag information.

It should be noted that in the embodiment of the disclosure, high_throughput_mode_enabled_flag may be a sequence level flag, a picture level flag, a slice level flag, a block level flag or other level flags. The block level flag includes a LCU level flag, a CTU level flag, a CU level flag or other block level flags. Here, high_throughput_mode_enabled_flag may even be a higher level flag, such as VUI, SEI, etc.

It may be understood that in the disclosure, it is just because the full-bypass mode or the high throughput mode may significantly improve throughput of coding and decoding, the full-bypass mode or the high throughput mode is suitable for coding and decoding a video with ultra-high bit rate. It is just because coding and decoding of the video with ultra-high bit rate itself have very high requirements on throughput of decoding, and on the other hand, there are usually very large coefficients in a bitstream of the video with ultra-high bit rate, sig_coeff_flag, abs_level_gtx_flag, par_level_flag or the like may not play an apparent role at this time, instead, may increase overhead. In other words, throughput is significantly improved in the full-bypass mode or the high throughput mode when the video with ultra-high bit rate is coded/decoded, while compression efficiency may not be reduced or significantly reduced.

However, the full-bypass mode or the high throughput mode is not suitable for coding and decoding a video with low bit rate or a video without high bit rate. This is because in a scenario where the video with low bit rate is coded/decoded, although throughput is significantly improved, compression performance may be significantly reduced. Furthermore, there are usually small coefficients in coding and decoding of the video with low bit rate, sig_coeff_flag, abs_level_gtx_flag, par_level_flag or the like are very helpful for compression performance at this time, and the full-bypass mode or the high throughput mode may skip sig_coeff_flag, abs_level_gtx_flag, par_level_flag. Such operation cannot guarantee compression performance. In the high throughput mode, all sb_coded_flag use the bypass mode, and the alignment operation may also lose compression efficiency.

It may be seen that when the bit rate of the video is not high, it may be considered that requirements on throughput of decoding are not high either, then it is unnecessary to obtain a higher throughput with cost of sacrificing compression performance. In view of this, an adaptive high throughput mode proposed in the disclosure may adaptively determine whether to use the high throughput mode in the current part according to situations of encoded/decoded videos, so that throughput can be significantly improved without significant loss of compression performance when the bit rate is high enough, and the compression performance may not be significantly lost when the bit rate is not high, thereby having higher adaptability.

It may be understood that in the embodiment of the disclosure, with respect to the adaptive high throughput mode, descriptions are mainly made by selecting the high throughput mode as an example, and the adaptive high throughput mode proposed in the embodiment of the disclosure may also be applied to the full-bypass mode to be evolved into an adaptive full-bypass mode, or applied to other modes for improving throughput. The disclosure does not impose specific limitation thereto.

Further, in the embodiment of the disclosure, VVC uses a history-based Rice parameter derivation technology for high bit width coding. This technology sets a variable StatCoeff [cIdx] for each component, cIdx may take values 0, 1 and 2 indicating three components of YUV respectively. The variable StatCoeff[cIdx] is initialized at the beginning of each slice or tile, and value of the variable StatCoeff[cIdx] is updated once when each TB is coded/decoded. The variable StatCoeff[cIdx] is used to derive Rice parameters for coding the coefficients.

That is, in the disclosure, the adaptive high throughput mode may determine whether to use the high throughput mode in the current part, by using the variable StatCoeff [cIdx].

It should be noted that in the embodiment of the disclosure, when initializing the variable StatCoeff[cIdx], if the history-based Rice parameter derivation technology is not used in the current sequence, the variable StatCoeff[cIdx] is initialized to 0, cIdx is equal to 0, 1, 2. Otherwise, when bitDepth of the variable is greater than 12, the variable StatCoeff[cIdx] is initialized to 4; otherwise, the variable StatCoeff[cIdx] is initialized to 2. Specifically, syntax for updating the variable StatCoeff[cIdx] may be shown in Table 20.

TABLE 20

```
  lastScanPos = numSbCoeff
  lastSubBlock = (
1 << ( log2TbWidth + log2TbHeight − ( log2SbW + log2SbH ) )
) − 1
  HistValue = sps_persistent_rice_adaptation_enabled_flag ?
( 1 << StatCoeff[ cIdx ] ) : 0
  updateHist = sps_persistent_rice_adaptation_enabled_flag ? 1
  : 0
...
      if( abs_level_gtx_flag[ n ][ 1 ] ) {
        abs_remainder[ n ]                                  ae(v)
        if( updateHist && abs_remainder[ n ] > 0 ) {
          StatCoeff[ cIdx ] = ( StatCoeff[ cIdx ] +
            Floor( Log2( abs_remainder[ n ] ) ) + 2 ) >> 1
          updateHist = 0
        }
      }
...
      if( sb_coded_flag[ xS ][ yS ] ) {
        dec_abs_level[ n ]                                  ae(v)
        if( updateHist && dec_abs_level[ n ] > 0 ) {
          StatCoeff[ cIdx ] = ( StatCoeff[ cIdx ] +
            Floor( Log2( dec_abs_level[ n ] ) ) ) >> 1
          updateHist = 0
        }
      }
```

sps_persistent_rice_adaptation_enabled_flag is a flag indicating whether to use the history-based Rice parameter derivation technology in the sequence.

Specifically, in the disclosure, when a first non-zero exponent-Golomb coded coefficient in TB uses abs_remainder, StatCoeff[cIdx] of a corresponding component is updated to StatCoeff[cIdx]=(StatCoeff[cIdx]+Floor(Log 2(abs_remainder[n]))+2)>>1. When the first non-zero exponent-Golomb coded coefficient in the TB uses dec_abs_level, StatCoeff[cIdx] of the corresponding component is updated to StatCoeff[cIdx]=(StatCoeff[cIdx]+Floor(Log 2(dec_abs_level[n])))>>1.

It may be seen that the case of using abs_remainder has one more "+2" than the case of dec_abs_level, because when there are many large coefficients in the TB, the first non-zero exponent-Golomb coded coefficient in the TB may usually use abs_remainder, and when the first non-zero exponent-Golomb coded coefficient in the TB uses dec_abs_level, it means that coefficients of the TB are generally small, since all the coefficients coded by using the context mode are less than 4. That is, there is a larger possibility that the coefficients are generally large in case that abs_remainder is used, and there is a very small possibility that the coefficients are generally large in case that dec_abs_level is used.

It should be noted that in the embodiment of the disclosure, since the coefficients may only use dec_abs_level in the high throughput mode, the above parts do not consider the high throughput mode. In the high throughput mode, it is apparent that the coefficient levels should be large, therefore it should be "+2" in this case.

That is, in the disclosure, before decoding of each TB starts, a variable StatCoeff[cIdx] determined according to TB of a coded side may be obtained, therefore it may be determined whether to use the high throughput mode in the current TB, according to the variable StatCoeff[cIdx]. The variable StatCoeff[cIdx] is updated in RRC, and it may be determined whether to use the high throughput mode in the current TB of RRC and TSRC, according to the variable StatCoeff[cIdx]. Or, it may only be determined whether to use the high throughput mode in the current TB of RRC, according to the variable StatCoeff[cIdx]. Or, it may be determined whether to use the high throughput mode in the current CU or current CTU of RRC, according to the variable StatCoeff[cIdx].

Further, in the embodiment of the disclosure, when the coded information is a Rice parameter, then when the coded information is determined, a value of a first variable may be determined first, the first variable may be a variable StatCoeff[cIdx]. Then, the coded information may be determined according to the value of the first variable.

Specifically, in the disclosure, when the coded information is determined according to the value of the first variable, and the value of the first variable is equal to or greater than a seventh threshold, it is determined that the Rice parameter meets the second preset condition, that is, it is determined that the value of the high throughput mode flag information is the first value, and then usage of the high throughput mode is selected; if the value of the first variable is less than the seventh threshold, it is determined that the Rice parameter does not meet the second preset condition, that is, it is determined that the value of the high throughput mode flag information is the second value, and then usage of the high throughput mode is not selected.

Exemplarily, if the value of the variable StatCoeff[cIdx] is equal to or greater than a threshold, the high throughput mode is used in the current TB; otherwise, the high throughput mode is not used in the current TB. Value of the threshold may be 3, 4, 5, etc.

Further, in the embodiment of the disclosure, a sequence level flag sps_high_throughput_mode_enabled_flag may be set in SPS syntax. A TB level flag high throughput mode flag is set. If the value of sps_high_throughput_mode_enabled_flag is equal to 1, it indicates that the high throughput mode may be used in blocks within the current sequence; otherwise, it indicates that the high throughput mode is not used in blocks within the current sequence.

It may be understood that in the disclosure, when it "may" be used at the sequence level, it is determined whether it is used at TB. Based on Table 1, semantics of sps_high_throughput_mode_enabled_flag is modified as shown in Table 21 below (the modified parts are marked with underline).

TABLE 21

| | Descriptor |
|---|---|
| residual_coding( x0, y0, log2TbWidth, log2TbHeight, cIdx ) { | |
| if( sps_mts_enabled_flag && cu_sbt_flag && cIdx = = 0 && | |
| log2TbWidth = = 5 && log2TbHeight < 6 ) | |
| log2ZoTbWidth = 4 | |
| Else | |
| log2ZoTbWidth = Min( log2TbWidth, 5 ) | |
| if( sps_mts_enabled_flag && cu_sbt_flag && cIdx = = 0 && | |
| log2TbWidth < 6 && log2TbHeight = = 5 ) | |
| log2ZoTbHeight = 4 | |
| Else | |
| log2ZoTbHeight = Min( log2TbHeight, 5 ) | |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last sig_coeff x prefix > 3 ) | |
| last_sig_coeff_x_suffix | ae(v) |
| if( last_sig_coeff_y_prefix > 3 ) | |
| last_sig_coeff_y_suffix | ae(v) |
| log2TbWidth = log2ZoTbWidth | |
| log2TbHeight = log2ZoTbHeight | |
| high_throughput_mode_flag=(StatCoeff[cIdx]>=4 && sps_high_throughput_mode_flag) ? 1:0 | |
| remBinsPass1 = high_throughput_mode_flag ? 0:( ( ( 1 << ( log2TbWidth + log2TbHeight ) ) × 7 ) >> 2) | |
| log2SbW = ( Min( log2TbWidth, log2TbHeight ) < 2 ? 1 : 2 ) | |
| log2SbH = log2SbW | |
| if( log2TbWidth + log2TbHeight > 3 ) | |
| if( log2TbWidth < 2 ) { | |
| log2SbW = log2TbWidth | |
| log2SbH = 4 − log2SbW | |
| } else if( log2TbHeight < 2 ) { | |
| log2SbH = log2TbHeight | |
| log2SbW = 4 − log2SbH | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| HistValue = sps_persistent_rice_adaptation_enabled_flag ? ( 1 << StatCoeff[ cIdx ] ) : 0 | |
| updateHist = sps_persistent_rice_adaptation_enabled_flag ? 1 : 0 | |
| do { | |
| if( lastScanPos = = 0 ) { | |
| lastScanPos = numSbCoeff | |
| lastSubBlock− − | |
| } | |
| lastScanPos− − | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| xC = ( xS << log2SbW ) + DiagScanOrder[ log2SbW ][ log2SbH ][ lastScanPos ][ 0 ] | |
| yC = ( yS << log2SbH ) + DiagScanOrder[ log2SbW ][ log2SbH ][ lastScanPos ][ 1 ] | |
| } while( ( xC != LastSignificantCoeffX ) \| \| ( yC != LastSignificantCoeffY ) ) | |
| if( lastSubBlock = = 0 && log2TbWidth >= 2 && log2TbHeight >= 2 && | |
| !transform_skip_flag[ x0 ][ y0 ][ cIdx ] && lastScanPos > 0 ) | |
| LfnstDcOnly = 0 | |
| if( ( lastSubBlock > 0 && log2TbWidth >= 2 && log2TbHeight >= 2 ) \| \| | |
| ( lastScanPos > 7 && ( log2TbWidth = = 2 \| \| log2TbWidth = = 3 ) && | |
| log2TbWidth = = log2TbHeight ) ) | |
| LfnstZeroOutSigCoeffFlag = 0 | |
| if( ( lastSubBlock > 0 \| \| lastScanPos > 0 ) && cIdx = = 0 ) | |
| MtsDcOnly = 0 | |
| QState = 0 | |
| for( i = lastSubBlock; i >= 0; i− − ) { | |
| startQStateSb = QState | |
| xS = DiagScanOrder[ log2TbWidth − log2SbW ][ log2TbHeight − log2SbH ] [ i ][ 0 ] | |

TABLE 21-continued

| | Descriptor |
|---|---|
| yS = DiagScanOrder[ log2TbWidth − log2SbW ][ log2TbHeight − log2SbH ] [ i ][ 1 ] | |
| inferSbDcSigCoeffFlag = 0 | |
| if( i < lastSubBlock && i > 0 ) { | |
| sb_coded_flag[ xS ][ yS ] | ae(v) |
| inferSbDcSigCoeffFlag = 1 | |
| } | |
| if( sb_coded_flag[ xS ][ yS ] && ( xS > 3 \| \| yS > 3 ) && cIdx = = 0 ) | |
| MtsZeroOutSigCoeffFlag = 0 | |
| firstSigScanPosSb = numSbCoeff | |
| lastSigScanPosSb = −1 | |
| firstPosMode0 = ( i = = lastSubBlock ? lastScanPos : numSbCoeff − 1 ) | |
| firstPosMode1 = firstPosMode0 | |
| for( n = firstPosMode0; n >= 0 && remBinsPass1 >= 4; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( sb_coded_flag[ xS ][ yS ] && ( n > 0 \| \| !inferSbDcSigCoeffFlag ) && ( xC != LastSignificantCoeffX \| \| yC != LastSignificantCoeffY ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if( sig_coeff flag[ xC ][ yC ] ) { | |
| abs_level_gtx_flag[ n ][ 0 ] | ae(v) |
| remBinsPass1− − | |
| if( abs_level_gtx_flag[ n ][ 0 ] ) { | |
| par_level_flag[ n ] | ae(v) |
| remBinsPass1− − | |
| abs_level_gtx_flag[ n ][ 1 ] | ae(v) |
| remBinsPass1− − | |
| } | |
| if( lastSigScanPosSb = = −1 ) | |
| lastSigScanPosSb = n | |
| firstSigScanPosSb = n | |
| } | |
| AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_flag[ n ][ 1 ] | |
| if( sh_dep_quant_used_flag ) | |
| QState = QStateTransTable[ QState ][ AbsLevelPass1[ xC ][ yC ] & 1 ] | |
| firstPosMode1 = n − 1 | |
| } | |
| for( n = firstPosMode0; n > firstPosMode1; n− − ) { | |
| xC = ( xS << log2SbW ) + DiagScanOrder[ log2SbW ][ log2SbH ][ n ][ 0 ] | |
| yC = (yS << log2SbH ) + DiagScanOrder[ log2SbW ][ log2SbH ][ n ][ 1 ] | |
| if( abs_level_gtx_flag[ n ][ 1 ] ) { | |
| abs_remainder[ n ] | ae(v) |
| if( updateHist & & abs_remainder [ n ] > 0 ) { | |
| StatCoeff[ cIdx ] = (StatCoeff[ cIdx ] + Floor( Log2( dec_abs_level[ n ] ) ) + 2) >> 1 | |
| updateHist = 0 | |
| } | |
| } | |
| AbsLevel[ xC ][ yC ] = AbsLevelPass1[ xC ][ yC ] +2 * abs_remainder[ n ] | |
| } | |
| for( n = firstPosMode1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( sb_coded_flag[ xS ][ yS ] ) { | |
| dec_abs_level[ n ] | ae(v) |
| if( updateHist & & dec_abs_level[ n ] > 0 ) { | |
| StatCoeff[ cIdx ] = (StatCoeff[ cIdx ] + Floor( Log2(dec_abs_level[ n ] ) ) ) >> 1 | |
| updateHist = 0 | |
| } | |
| } | |

TABLE 21-continued

| | Descriptor |
|---|---|
| if( AbsLevel[ xC ][ yC ] > 0 ) { | |
| if( lastSigScanPosSb = = −1 ) | |
| lastSigScanPosSb = n | |
| firstSigScanPosSb = n | |
| } | |
| if( sh_dep_quant_used_flag ) | |
| QState = QStateTransTable[ QState ][ AbsLevel[ xC ][ yC ] & 1 ] | |
| } | |
| signHiddenFlag = sh_sign_data_hiding_used_flag && | |
| ( lastSigScanPosSb − firstSigScanPosSb > 3 ? 1 : 0 ) | |
| for( n = numSbCoeff − 1; n >= 0; n− − ) { | |
| xC = ( xS << log2SbW ) + | |
| DiagScanOrder[ log2SbW ][ log2SbH ][ n ][ 0 ] | |
| yC = ( yS << log2SbH ) + | |
| DiagScanOrder[ log2SbW ][ log2SbH ][ n ][ 1 ] | |
| if( ( AbsLevel[ xC ][ yC ] > 0 ) && | |
| ( !signHiddenFlag \| \| ( n != firstSigScanPosSb ) ) ) | |
| coeff_sign_flag[ n ] | ae(v) |
| } | |
| if( sh dep quant used flag ) { | |
| QState = startQStateSb | |
| for( n = numSbCoeff − 1; n >= 0; n− − ) { | |
| xC = ( xS << log2SbW ) + | |
| DiagScanOrder[ log2SbW ][ log2SbH ][ n ][ 0 ] | |
| yC = ( yS << log2SbH ) + | |
| DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] = | |
| ( 2 * AbsLevel[ xC ][ yC ] − ( QState > 1 ? 1 : 0 ) ) * | |
| ( 1 − 2 * coeff_sign_flag[ n ] ) | |
| QState = QStateTransTable[ QState ][ AbsLevel[ xC ][ yC ] & 1 ] | |
| } | |
| } else { | |
| sumAbsLevel = 0 | |
| for( n = numSbCoeff − 1; n >= 0; n− − ) { | |
| xC = ( xS << log2SbW ) + | |
| DiagScanOrder[ log2SbW ][ log2SbH ][ n ][ 0 ] | |
| yC = ( yS << log2SbH ) + | |
| DiagScanOrder[ log2SbW ][ log2SbH ][ n ][ 1 ] | |
| if( AbsLevel[ xC ][ yC ] > 0 ) { | |
| TransCoeffLevel[ x0 ][ y0 ][ cIdx ][ xC ][ yC ] = | |
| AbsLevel[ xC ][ yC ] * ( 1 − 2 * coeff_sign_flag[ n ] ) | |
| if( signHiddenFlag ) { | |
| sumAbsLevel += AbsLevel[ xC ][ yC ] | |
| if( n = = firstSigScanPosSb && sumAbsLevel % 2 = = 1 ) | |
| TransCoeffLevel[ x0 ][ y0 ][ cIdx ][ xC ][ yC ] = | |
| ---.TransCoeffLevel[ x0 ][ y0 ][ cIdx ][ xC ][ yC ] | |
| } | |
| } | |
| } | |
| } | |
| } | |
| } | |

Exemplarily, in the disclosure, based on Table 2, semantics of sps_high_throughput_mode_enabled_flag is modified as shown in Table 22 below (the modified parts are marked with underline).

TABLE 22

| | Descriptor |
|---|---|
| residual_ts_coding( x0, y0, log2TbWidth, log2TbHeight, cIdx ) { | |
| log2SbW = ( Min( log2TbWidth, log2TbHeight ) < 2 ? 1 : 2 ) | |
| log2SbH = log2SbW | |
| if( log2TbWidth + log2TbHeight > 3 ) | |
| if( log2TbWidth < 2 ) { | |
| log2SbW = log2TbWidth | |
| log2SbH = 4 − log2SbW | |
| } else if( log2TbHeight < 2 ) { | |
| log2SbH = log2TbHeight | |
| log2SbW = 4 − log2SbH | |
| } | |
| numSbCoeff = 1 << ( log2SbW + log2SbH ) | |

TABLE 22-continued

```
                                                              Descriptor
  lastSubBlock = (
1 << ( log2TbWidth + log2TbHeight − ( log2SbW + log2SbH ) ) ) − 1
  inferSbCbf = 1
  high_throughput_mode_flag=(StatCoeff[cIdx]>=4 &&
sps_high_throughput_mode_flag) ? 1:0
  RemCcbs = high_throughput_mode_flag ? 0:( ( ( 1 << ( log2TbWidth +
log2TbHeight ) ) * 7 ) >> 2)
  for( i =0; i <= lastSubBlock; i++ ) {
......
```

Further, in the embodiment of the disclosure, when the coded information is a Rice parameter, then when the coded information is determined, a value of a second variable may be determined first, the second variable may be a variable sh_ts_residual_coding_rice_idx_minus1. Then, the coded information may be determined according to the value of the second variable.

Specifically, in the disclosure, when the coded information is determined according to the value of the second variable, and if the value of the second variable is equal to or greater than an eighth threshold, it is determined that the Rice parameter meets the second preset condition, that is, it is determined that the value of the high throughput mode flag information is the first value, and then usage of the high throughput mode is selected; if the value of the second variable is less than the eighth threshold, it is determined that the Rice parameter does not meet the second preset condition, that is, it is determined that the value of the high throughput mode flag information is the second value, and then usage of the high throughput mode is not selected.

It should be noted that in the embodiment of the disclosure, VVC uses a different way from RRC, in a method for deriving a Rice parameter of TSRC during high bit width coding. The Rice parameter of TSRC is derived according to sh_ts_residual_coding_rice_idx_minus1. sh_ts_residual_coding_rice_idx_minus1+1 determines a Rice parameter used by residual_ts_coding(x0, y0, log 2TbWidth, log 2TbHeight, cIdx). Therefore, with respect to TB of TSRC, whether to use the high throughput mode in the current TB, may be determined according to sh_ts_residual_coding_rice_idx_minus1. Specifically, if the value of sh_ts_residual_coding_rice_idx_minus1 is equal to or greater than a threshold, the high throughput mode is used in the TB of TSRC of the current slice; otherwise, the high throughput mode is not used in the TB of TSRC of the current slice. Furthermore, whether to use the high throughput mode in the current TB of RRC, may also be determined according to sh_ts_residual_coding_rice_idx_minus1.

Exemplarily, in the disclosure, based on Table 2, semantics of sps_high_throughput_mode_enabled_flag is modified as shown in Table 23 below (the modified parts are marked with underline).

TABLE 23

```
                                                              Descriptor
residual_ts_coding( x0, y0, log2TbWidth, log2TbHeight, cIdx ) {
  log2SbW = ( Min( log2TbWidth, log2TbHeight ) < 2 ? 1 : 2 )
  log2SbH = log2SbW
  if( log2TbWidth + log2TbHeight > 3 )
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  numSbCoeff = 1 << ( log2SbW + log2SbH )
  lastSubBlock = (
1 << ( log2TbWidth + log2TbHeight − ( log2SbW + log2SbH ) ) ) − 1
  inferSbCbf = 1
  high_throughput_mode_flag=( sh_ts_residual_coding_rice_idx_minus1 >=4
&& sps_high_throughput_mode_flag) ? 1:0
  RemCcbs = high_throughput_mode_flag ? 0:( ( (1 << ( log2TbWidth +
log2TbHeight ) ) * 7 ) >> 2)
  for( i =0; i <= lastSubBlock; i++ ) {
......
```

It may be considered that (a=b? c:d) expresses the same meaning as (if(b){a=c;}else{a=d;}).

It may be seen that in the embodiment of the disclosure, the variable StatCoeff[cIdx] and/or sh_ts_residual_coding_rice_idx_minus1 may be used to determine whether usage of the high throughput mode is suitable, which may improve adaptability of usage of the high throughput mode.

In conclusion, in the embodiment of the disclosure, whether to perform coding and decoding by using only the bypass mode, whether to perform coding and decoding by using the context mode, and whether to perform the alignment processing may be combined together by setting a high throughput mode, so that the coefficients of the current block are further determined by using at least one of the context mode, the bypass mode or the alignment processing. Specifically, on one hand, since the distribution rule of coefficients is different from that of a regular video scenario, throughput of decoding the coefficients may be improved by reducing or even eliminating a number of syntax elements decoded by using the context mode during decoding of the coefficients. On the other hand, a large piece of continuous and aligned bypass mode coding may be formed in the high throughput mode, which may further improve throughput. Furthermore, the adaptive high throughput mode may adaptively determine whether to use the high throughput mode in the current part according to situations of encoded/decoded videos, so that throughput may be significantly improved without significant loss of compression performance when the bit rate is high enough, and the compression performance may not be significantly lost when the bit rate is not high, thereby having higher adaptability.

That is, the high throughput mode proposed in the disclosure takes the following items into consideration in combination: whether to perform coding and decoding by using only the bypass mode, whether to perform coding and decoding by using the context mode, and whether to perform the alignment processing, and may form a piece of aligned bypass mode coding in case that the high throughput mode is used. Furthermore, the adaptive high throughput mode proposed in the disclosure may determine whether to use the high throughput mode in the current part based on information of coded/decoded parts, which may improve adaptability of usage of the high throughput mode.

The embodiment of the disclosure provides a decoding method, in which the decoder decodes the bitstream. When the encoder and decoder code and decode the coefficients respectively, the encoder and decoder may combine whether to perform coding and decoding by using only the bypass mode, whether to perform coding and decoding by using the context mode, and whether to perform the alignment processing by setting a high throughput mode, so that the coefficients of the current block are further determined by using at least one of the context mode, the bypass mode or the alignment processing. It may improve throughput for coding the coefficients and coding and decoding speeds, and reduce complexity; furthermore, the adaptive high throughput mode may adaptively determine whether to use the high throughput mode in the current part according to situations of encoded/decoded videos, so that throughput may be significantly improved without significant loss of compression performance when the bit rate is high enough, and compression performance may not be significantly lost when the bit rate is not high, which has higher adaptability, thereby improving compression performance.

Based on the above embodiments, another embodiment of the disclosure proposes an encoding method, applied to an encoder. FIG. 15 is a first schematic flowchart of implementation of the encoding method. As shown in FIG. 15, the method for the encoder to perform coding may include the following operations 201 and 202.

At 201, high throughput mode flag information of a current block is determined.

At 202, coefficients of the current block are coded based on the high throughput mode flag information, by using at least one of a context mode, a bypass mode or alignment processing, and a bitstream is generated.

In the embodiment of the disclosure, the encoder may determine the high throughput mode flag information of the current block. Then, the encoder may code the coefficients of the current block based on the high throughput mode flag information, by using at least one of the context mode, the bypass mode or the alignment processing, and thus generate the bitstream.

It should be noted that in the embodiment of the disclosure, the high throughput mode flag information may be used to improve throughput of coding and decoding.

Further, in the disclosure, the current block may be a picture block which has not been transformed, or may be a TB which has been transformed. For example, the current block may be a zeroed-out TB.

Further, in the embodiment of the disclosure, the high throughput mode flag information may be understood as a flag bit indicating that the coefficients of the current block are determined by using at least one of the context mode, the bypass mode or the alignment processing; or, the high throughput mode flag information may be understood as a flag bit indicating that values of the coefficients of the current block are determined by using at least one of the context mode, the bypass mode or the alignment processing. Specifically, the encoder may determine a variable as the high throughput mode flag information, so that the high throughput mode flag information may be determined through value of the variable.

It should be noted that in the disclosure, value of the high throughput mode flag information may be a first value or a second value. Specifically, when the high throughput mode flag information has different values, modes of determining the coefficients of the current block (or values of the coefficients of the current block) are also different.

Specifically, in the embodiment of the disclosure, based on the value of the high throughput mode flag information, at least one of the context mode, the bypass mode, the alignment processing, or other modes may be selected to be used when the coefficients of the current block are determined.

Further, in the embodiment of the disclosure, the high throughput mode flag information may be understood as a flag bit indicating whether to perform the alignment processing.

Optionally, in the disclosure, if the value of the high throughput mode flag information is the first value, usage of the alignment processing may be selected to code the coefficients of the current block and generate the bitstream; if the value of the high throughput mode flag information is the second value, skipping of the alignment processing may be selected to code the coefficients of the current block and generate the bitstream.

It may be seen that whether to code the coefficients of the current block by using the alignment processing, may be determined according to the value of the high throughput mode flag information.

Further, in the embodiment of the disclosure, the high throughput mode flag information may be understood as a flag bit indicating whether to use only the bypass mode.

Optionally, in the disclosure, if the value of the high throughput mode flag information is the first value, usage of the bypass mode may be selected to code the coefficients of the current block and generate the bitstream; if the value of the high throughput mode flag information is the second value, usage of at least one of the context mode or the bypass mode may be selected to code the coefficients of the current block and generate the bitstream.

It may be seen that whether to code the coefficients of the current block by using only the bypass mode, may be determined according to the value of the high throughput mode flag information. That is, whether to determine all the coefficients of the current block (or values of all the coefficients of the current block) by using the bypass mode, may be determined based on the value of the high throughput mode flag information. For example, if the value of the high throughput mode flag information is the first value, then all the syntax elements sb_coded_flag of the current block which need to be coded are coded by using the bypass mode.

Further, in the embodiment of the disclosure, the high throughput mode flag information may be understood as a flag bit indicating that an initial value of a quantity parameter is reduced (or, the quantity parameter is set to 0).

Optionally, in the disclosure, the initial value of the quantity parameter may be determined first according to the high throughput mode flag information; if the initial value of the quantity parameter is equal to or greater than a quantity threshold, then usage of at least one of the context mode or the bypass mode may be selected to code the coefficients of the current block and generate the bitstream; if the initial value of the quantity parameter is less than the quantity threshold, then usage of the bypass mode may be selected to code the coefficients of the current block and generate the bitstream.

It should be noted that in the embodiment of the disclosure, the initial value of the quantity parameter indicates a maximum number of syntax elements which may be coded/decoded by using the context mode. Specifically, the quantity parameter may be a parameter indicating a number of remaining syntax elements available to the current block and coded by using the context mode, and the initial value of the quantity parameter is a value initially set for the quantity parameter.

It may be seen that different modes may be selected according to the value of the high throughput mode flag information, to determine the initial value of the quantity parameter. That is, the high throughput mode flag information may be used to determine the initial value of the quantity parameter, and then whether to code the coefficients of the current block by using the context mode, is determined based on the initial value of the quantity parameter.

Exemplarily, in the disclosure, the first value may be set to 1, and the second value may be set to 0; or, the first value may be set to “true”, and the second value may be set to “false”. The disclosure does not impose any limitation thereto.

Exemplarily, in the disclosure, when the high throughput mode flag information is used to determine whether to determine the coefficients of the current block (or values of the coefficients of the current block) by using at least one of the context mode, the bypass mode or the alignment processing, then a flag high_throughput_mode_enabled_flag may be used to indicate the high throughput mode flag information.

For example, in the disclosure, if the value of high_throughput_mode_enabled_flag is 1, then it may indicate that the alignment processing is performed when determining the coefficients of the current block (or values of the coefficients of the current block); if the value of high_throughput_mode_enabled_flag is 0, then it may indicate that the alignment processing is not performed when determining the coefficients of the current block (or values of the coefficients of the current block).

For example, in the disclosure, if the value of high_throughput_mode_enabled_flag is 1, then it may indicate that the coefficients of the current block (or values of the coefficients of the current block) are determined by using only the bypass mode; if the value of high_throughput_mode_enabled_flag is 0, then it may indicate that when the coefficients of the current block (or values of the coefficients of the current block) may be determined by using at least one of the context mode or the bypass mode.

For example, in the disclosure, if the value of high_throughput_mode_enabled_flag is 1, then the initial value of the quantity parameter may be determined as a first quantity value, and then whether to determine the coefficients of the current block (or values of the coefficients of the current block) by using the context mode, is determined according to the initial value of the quantity parameter; if the value of high_throughput_mode_enabled_flag is 0, then the initial value of the quantity parameter may be determined according to height and width parameters of the current block, and then whether to determine the coefficients of the current block (or values of the coefficients of the current block) by using the context mode, is determined according to the initial value of the quantity parameter.

It should be noted that in the embodiment of the disclosure, the encoder may also determine height and width parameters of the current block. Specifically, height and width parameters of the current block may be used to determine size of the current block.

Exemplarily, in the disclosure, with respect to the current block after zero-out, after logarithms log 2ZoTbWidth and log 2ZoTbHeight of the size of the current block are determined, (1<<log 2ZoTbHeight) may be used to indicate a corresponding height parameter, while (1<<log 2ZoTbWidth) may be used to indicate a corresponding width parameter.

Exemplarily, in the disclosure, the first quantity value is an integer equal to or greater than 0 and less than the quantity threshold. For example, when the quantity threshold is 4, then the first quantity value may be set to 0 or 1 or 2 or 3.

For example, in the disclosure, if the value of high_throughput_mode_enabled_flag is 1, then the initial value of the quantity parameter may be determined as a second quantity value, and then whether to determine the coefficients of the current block (or values of the coefficients of the current block) by using the context mode, is determined according to the initial value of the quantity parameter; if the value of high_throughput_mode_enabled_flag is 0, then the initial value of the quantity parameter may be determined according to height and width parameters of the current block, and then whether to determine the coefficients of the current block (or values of the coefficients of the current block) by using the context mode, is determined according to the initial value of the quantity parameter.

Exemplarily, in the disclosure, the second quantity value may be used to reduce the initial value of the quantity parameter. Specifically, the second quantity value may be less than the initial value of the quantity parameter determined according to height and width parameters of the current block.

For example, in the disclosure, if the value of high_throughput_mode_enabled_flag is 1, then the initial value of the quantity parameter may be determined according to height and width parameters of the current block and a first shift parameter, and then whether to determine the coefficients of the current block (or values of the coefficients of the current block) by using the context mode, is determined according to the initial value of the quantity parameter; if the value of high_throughput_mode_enabled_flag is 0, then the initial value of the quantity parameter may be determined according to height and width parameters of the current block and a second shift parameter, and then whether to determine the coefficients of the current block (or values of the coefficients of the current block) by using the context mode, is determined according to the initial value of the quantity parameter.

Exemplarily, in the disclosure, the first shift parameter and the second shift parameter are used in right shift processing, and the first shift parameter is greater than the second shift parameter Further, in the embodiment of the disclosure, the encoder may determine video flag information; when the video flag information indicates that a video meets a first preset condition, then processes of determining the high throughput mode flag information may be performed, that is, the high throughput mode flag information of the current block is determined.

It should be noted that in the embodiment of the disclosure, the first preset condition at least includes one of the following conditions: a bit width being greater than a bit width threshold, a bit rate being greater than a bit rate threshold, a picture rate being greater than a picture rate threshold, a QP being less than a quality threshold, or lossless compression.

Specifically, in the disclosure, the bit width threshold may be set to 14 bits (or 12 bits, or 16 bits), if a bit width of a video picture to be encoded/decoded is greater than 14 bits, the video may be considered as an irregular video with high bit width; the bit rate threshold may be set to 1 Gbit/s, if a bit rate of a video picture to be encoded/decoded is greater than 1 Gbit/s, the video may be considered as an irregular video with high bit rate; the picture rate threshold may be set to 90 Hz (or 120 Hz), if a picture rate of a video picture to be encoded/decoded is greater than 90 Hz, the video may be considered as an irregular video with high picture rate; the quality threshold may be set to different specific values according to different bit widths, for example, when an input bit width is set to 12 bits and coding is performed according to 12 bits, a corresponding quality threshold is 0; when the bit width of the video picture to be encoded/decoded has 12 bits and QP determined in case that coding is performed according to 12 bits is less than the corresponding quality threshold of 0, the video may be considered as an irregular video with high quality.

It may be understood that in the disclosure, the coefficient coding and decoding methods of the regular video are the same as existing methods in the related art; however, in a certain situation, such as with respect to the irregular video with high bit width, high quality, high bit rate, high picture rate or lossless compression, when coefficients are coded/decoded according to the embodiment of the disclosure, processes of determining the high throughput mode flag information may be added, that is, the high throughput mode flag information of the current block is determined.

That is, the bit width of the irregular video is higher than that of the regular video, the quality of the irregular video is higher than that of the regular video, the bit rate of the irregular video is higher than that of the regular video, the picture rate of the irregular video is higher than that of the regular video, and the irregular video is lossless compressed.

Further, in the embodiment of the disclosure, at first, it needs to determine whether the current video is a regular video, which may be indicated by the video flag information. Specifically, if the value of the video flag information is a first value, then it may be determined that the video flag information indicates that a video meets a first preset condition, that is, the video is an irregular video; if the value of the video flag information is a second value, then it may be determined that the video flag information indicates that the video does not meet the first preset condition, that is, the video is a regular video.

Exemplarily, in the disclosure, the first value may be set to 1, and the second value may be set to 0; or, the first value may be set to "true", and the second value may be set to "false". The disclosure does not impose any limitation thereto.

Further, in the disclosure, the video flag information may be a sequence level flag, or even a higher level flag, such as VUI, SEI, etc. Determining whether the video meets the first preset condition, may also be achieved by determining whether the video meets high bit width, or high bit rate, or high quality, or lossless compression, or the like. Descriptions are made below by taking the four situations as examples respectively.

Optionally, in the disclosure, when the video flag information is high bit width sequence flag information, and the video meets high bit width, then it is determined that the high bit width sequence flag information indicates that the video meets the first preset condition.

Optionally, in the disclosure, when the video flag information is high bit rate sequence flag information, and the video meets high bit rate, then it is determined that the high bit rate sequence flag information indicates that the video meets the first preset condition.

Optionally, in the disclosure, when the video flag information is high quality sequence flag information, and the video meets high quality, then it is determined that the high quality sequence flag information indicates that the video meets the first preset condition.

Optionally, in the disclosure, when the video flag information is high picture rate sequence flag information, and the video meets high picture rate, then it is determined that the high picture rate sequence flag information indicates that the video meets the first preset condition.

Optionally, in the disclosure, when the video flag information is lossless compression sequence flag information, and the video meets lossless compression, then it is determined that the lossless compression sequence flag information indicates that the video meets the first preset condition.

That is, in the disclosure, the video flag information may be high bit width sequence flag information (indicated by sps_high_bit_depth_flag) to indicate whether the current video is a high bit width sequence; or, may be replaced by high bit rate sequence flag information (indicated by sps_high_bit_rate_flag) to indicate whether the current video is a high bit rate sequence; or, may be replaced by other flag information indicating high bit width, high bit rate, high quality, high picture rate or lossless compression. The embodiment of the disclosure does not impose specific limitation thereto.

It may be seen that in the disclosure, determination of the high throughput mode flag information may depend on determination of the video flag information, that is, high_throughput_mode_enabled_flag may depend on some other flags, such as a high bit width flag, a high bit rate flag, a SPS extension flag (sps_extension_flag), or the like. The SPS extension flag may be turned on in extended versions of the standard, such as extended versions formulated by VVC for coding at high bit width and high bit rate.

Exemplarily, in the disclosure, if the value of the high bit width flag, the high bit rate flag or the SPS extension flag is 1, the above flag high_throughput_mode_enabled_flag needs to be decoded; if the value of the high bit width flag, the high bit rate flag or the SPS extension flag is not 1, the above flag high_throughput_mode_enabled_flag does not need to be decoded.

It should be noted that in the embodiment of the disclosure, the high throughput mode flag information (high_throughput_mode_enabled_flag) may be a sequence level flag, a picture level flag, a slice level flag, a block level flag or other level flags. The block level flag includes a LCU level flag, a CTU level flag, a CU level flag or other block level flags. Here, high_throughput_mode_enabled_flag may even be a higher level flag, such as VUI, SEI, etc.

It should be noted that coefficient coding usually mentioned in video standards may include two parts: coding and decoding. Therefore, coefficient coding includes a coefficient coding method at the encoder side and a coefficient decoding method at the decoder side. The embodiment of the disclosure describes the coefficient decoding method at the decoder side.

It should be noted that in the embodiment of the disclosure, subblock encoded flag information may be indicated by sb_coded_flag. Exemplarily, if the value of sb_coded_flag is 1, then it may be determined that all the coefficients in a to-be-decoded subblock need to be decoded sequentially; if the value of sb_coded_flag is 0, then it may be determined that all the coefficients in the to-be-decoded subblock do not need to be decoded sequentially. At this time, all the coefficients in the to-be-decoded subblock are zero.

Optionally, in the disclosure, in a certain situation, when coefficients are coded, all the scanned subblocks need to be coded by default, or in other words, all the scanned subblocks contain non-zero coefficients by default. That is, in a normal situation, the coefficient coding method is still the same as existing method in the related art. For example, a certain case may refer to coding and decoding of the video with high bit width, high quality, high bit rate, high picture rate or lossless compression. In this case, there are many non-zero coefficients, and almost all the scanned subblocks need to be coded; in other words, almost all the scanned subblocks contain non-zero coefficients. In this way, it is unnecessary to transmit sb_coded_flag in the bitstream, and it is also unnecessary for the encoder/decoder to process this flag, thereby speeding up coding and decoding. Due to removal of an almost non-existent flag, a slight improvement in compression performance may also be achieved at this time.

Further, in the disclosure, if the value of the obtained high throughput mode flag information is the first value, then the subblock coded flag information sb_coded_flag of the current block may be determined by using the bypass mode, instead of determining the subblock coded flag information sb_coded_flag of the current block by using the context mode.

It should be noted that in the disclosure, in case of TSRC, sb_coded_flag is decoded by using the context mode. When sb_coded_flag is removed or sb_coded_flag is changed to be decoded by using the bypass mode, then all the coefficients in the entire block may be decoded by using the bypass mode, which may further improve coding and decoding speeds or throughput.

Exemplarily, in the disclosure, if the value of high_throughput_mode_enabled_flag is the first value, then sb_coded_flag is decoded by using the bypass mode; if the value of high_throughput_mode_enabled_flag is the second value, then sb_coded_flag is decoded by using the context mode.

Further, in the disclosure, if the value of the high throughput mode flag information obtained by decoding is the first value, then prefix information last_sig_coeff_x_prefix of a horizontal coordinate of a last non-zero coefficient corresponding to the current block, prefix information last_sig_coeff_y_prefix of a vertical coordinate of the last non-zero coefficient, suffix information last_sig_coeff_x_suffix of the horizontal coordinate of the last non-zero coefficient and suffix information last_sig_coeff_y_suffix of the vertical coordinate of the last non-zero coefficient are determined by using the bypass mode.

It should be noted that in the disclosure, in case of RRC, last_sig_coeff_x_prefix, last_sig_coeff_y_prefix, last_sig_coeff_x_suffix and last_sig_coeff_y_suffix are decoded by using the context mode. When last_sig_coeff_x_prefix, last_sig_coeff_y_prefix, last_sig_coeff_x_suffix and last_sig_coeff_y_suffix are removed or changed to be decoded by using the bypass mode, coding and decoding speeds or throughput may be further improved.

Exemplarily, in the disclosure, if the value of high_throughput_mode_enabled_flag is the first value, then last_sig_coeff_x_prefix, last_sig_coeff_y_prefix, last_sig_coeff_x_suffix and last_sig_coeff_y_suffix are decoded by using the bypass mode; if the value of high_throughput_mode_enabled_flag is the second value, then last_sig_coeff_x_prefix, last_sig_coeff_y_prefix, last_sig_coeff_x_suffix and last_sig_coeff_y_suffix are decoded by using the context mode.

It may be understood that in the embodiment of the disclosure, all the above methods take an example of uniformly using this technology in all the components of the video. All the components refer to R, G, B of a video in RGB format or Y, U, V (Y, Cb, Cr) in YUV format. The above methods may also be used in only a certain component, such as only the Y component of YUV format. The above methods may also be used in each component respectively, that is, each component may be controlled to turn on or off independently. The disclosure does not impose specific limitation thereto.

It may be seen that in processes of coding and decoding the coefficients of the current block, the encoding method proposed in the embodiment of the disclosure may combine whether to perform coding and decoding by using only the bypass mode, whether to perform coding and decoding by using the context mode, and whether to perform the alignment processing by setting a high throughput mode, so that the coefficients of the current block are further coded by using at least one of the context mode, the bypass mode or the alignment processing, and the bitstream is generated.

It may be understood that in the embodiment of the disclosure, when the high throughput mode is enabled, syntax elements coded by using the context mode are not used in coding and decoding coefficient levels and residual levels. remBinsPass1 in RRC and RemCcbs in TSRC are set to 0, that is, a number of binary symbols (bins) which may be used by the current TB and coded by using the context mode is set to 0. Then, all the coefficient levels or residual levels are coded/decoded by using the bypass mode.

It may be understood that in the embodiment of the disclosure, when the high throughput mode is enabled, all the syntax elements sb_coded_flag which need to be decoded are coded/decoded by using the bypass mode.

Further, in the embodiment of the disclosure, when the coefficients of the current block are determined by using the alignment process, in case of RRC, the alignment processing may be selected to be performed after determining position of the last non-zero coefficient by using the context mode, and other syntax elements other than the position of the last non-zero coefficient are determined by using the bypass mode; in case of TSRC, the alignment processing may be selected to be performed before determining the first syntax element by using the bypass mode.

It may be understood that in the embodiment of the disclosure, when the high throughput mode is enabled, the alignment operation occurs before entering the subblock. That is, in case of RRC, the alignment processing occurs after last_sig_coeff_x_prefix, last_sig_coeff_y_prefix, last_sig_coeff_x_suffix and last_sig_coeff_y_suffix, and in case of TSRC, the alignment processing occurs at the beginning of the entire TB. In other words, the alignment processing occurs before the first syntax element coded by using the bypass mode in the TB.

Exemplarily, as shown above in FIG. 11, in the bitstream of RRC, except that coding in the context mode needs to be used at the position of the last non-zero coefficient, the bypass mode is used in all other syntax elements, that is, the alignment processing is performed after last_sig_coeff_x_prefix, last_sig_coeff_y_prefix, last_sig_coeff_x_suffix and last_sig_coeff_y_suffix, and the alignment processing is performed after the position of the last non-zero coefficient, which may allow subsequent large segments of contents coded by using the bypass mode to be decoded faster.

Further, in the current VVC, last_sig_coeff_x_prefix and last_sig_coeff_y_prefix may be coded by using the context mode, and last_sig_coeff_x_suffix and last_sig_coeff_y_suffix may be coded by using the bypass mode. Therefore, in an embodiment, all of last_sig_coeff_x_prefix, last_sig_coeff_y_prefix, last_sig_coeff_x_suffix and last_sig_coeff_y_suffix may be used as coding of the last non-zero coefficient, and what follows is coding of subblocks and internal coefficients of the subblocks. Correspondingly, the above alignment processing method shown in FIG. 11 is performed based on distinguishing according to meanings of syntax elements. In another embodiment, as shown above in FIG. 12, the alignment processing may also be performed based on distinguishing syntax elements coded by using the context mode from syntax elements coded by using the bypass mode, that is, the alignment operation is performed after the syntax elements coded by using the context mode end and before the syntax elements coded by using the bypass mode begin. Therefore, in case of RRC, the alignment operation may be performed after last_sig_coeff_x_prefix, last_sig_coeff_y_prefix, last_sig_coeff_x_suffix and last_sig_coeff_y_suffix as shown above in FIG. 11, or may be performed after last_sig_coeff_x_prefix and last_sig_coeff_y_prefix and before last_sig_coeff_x_suffix and last_sig_coeff_y_suffix as shown above in FIG. 12.

It may be seen that when the coefficients of the current block are determined by using the alignment processing, in case of RRC, the alignment processing may also be selected to be performed after determining the horizontal coordinate prefix flag information last_sig_coeff_x_prefix and the vertical coordinate prefix flag information last_sig_coeff_y_prefix of the last non-zero coefficient by using the context mode, and before determining the horizontal coordinate suffix flag information last_sig_coeff_x_suffix and the vertical coordinate suffix flag information last_sig_coeff_y_suffix of the last non-zero coefficient by using the bypass mode, and the bypass mode is used in other syntax elements other than the position of the last non-zero coefficient.

Exemplarily, in the disclosure, when the high throughput mode is enabled, last_sig_coeff_x_prefix and last_sig_coeff_y_prefix may also be changed to be coded by using the bypass mode. At this time, the position of the last non-zero coefficient is also coded by using the bypass mode, and the entire TB is also coded by using the bypass mode. In this way, in case of RRC, the alignment processing may also be placed at the beginning of the entire TB.

It should be noted that in the disclosure, when the entire TB is coded by using the bypass mode, if there are syntax elements coded by using the bypass mode before the TB, the alignment processing may also be placed before the TB.

It may be seen that in the disclosure, in case of both RRC and TSRC, the alignment processing may occur before the first syntax element coded by using the bypass mode in the TB. At this time, in case of RRC, the horizontal coordinate prefix flag information last_sig_coeff_x_prefix, the vertical coordinate prefix flag information last_sig_coeff_y_prefix, the horizontal coordinate suffix flag information last_sig_coeff_x_suffix and the vertical coordinate suffix flag information last_sig_coeff_y_suffix of the last non-zero coefficient may be selected to be determined by using the bypass mode, that is, the position of the last non-zero coefficient is coded by using the bypass mode.

Exemplarily, as shown above in FIG. 13, in the bitstream of TSRC, the bypass mode is used in all the syntax elements of the entire TB, and the alignment processing is performed at the beginning of the entire TB, which may allow contents coded by using the bypass mode of the entire TB to be decoded faster.

Exemplarily, in the disclosure, there is a sequence level flag sps_extension_flag. At the sequence level, if the value of sps_extension_flag is 1, sps_range_extension_flag needs to be decoded. If the value of sps_range_extension_flag is 1, sps_high_throughput_mode_enabled_flag needs to be decoded. sps_high_throughput_mode_enabled_flag is a flag of enabling a high throughput mode of a current sequence. If the value of sps_high_throughput_mode_enabled_flag is 1, it indicates that the high throughput mode is used in blocks within the current sequence. When the value of sps_high_throughput_mode_enabled_flag is 0, it indicates that the high throughput mode is not used in blocks within the current sequence.

sps_extension_flag may be considered as a flag indicating whether the current sequence uses extended versions of the standard. sps_range_extension_flag is a flag indicating whether the current sequence uses range extension, such as high bit width, high bit rate, etc. Sequence parameter set RBSP syntax is shown above in Table 3, and sequence parameter set range extension syntax is shown above in Table 4.

Exemplarily, in the disclosure, in terms of syntax, an original sentence remBinsPass1=((1<<(log 2TbWidth+log 2TbHeight))×7)>>2 of residual_coding(x0, y0, log 2TbWidth, log 2TbHeight, cIdx) in residual coding syntax of Table 1 may be replaced by conditional sentences shown above in Table 5.

Exemplarily, in the disclosure, in terms of syntax, an original sentence RemCcbs=((1<<(log 2TbWidth+log 2TbHeight))×7)>>2 of residual_ts_coding(x0, y0, log 2TbWidth, log 2TbHeight, cIdx) in residual coding syntax of Table 2 may be replaced by conditional sentences shown above in Table 6.

It should be noted that in the embodiment of the disclosure, with respect to sb_coded_flag which needs to be decoded, if the value of sps_high_throughput_mode_enabled_flag is 1, sb_coded_flag is decoded by using the bypass mode; otherwise, sb_coded_flag is decoded by using a common context mode.

What added in general descriptions of CABAC parsing process for slice data is if the value of sps_high_throughput_mode_enabled_flag is 1, the alignment processing is performed after last_sig_coeff_x_prefix, last_sig_coeff_y_prefix, last_sig_coeff_x_suffix and last_sig_coeff_y_suffix (if present) in residual_coding(x0, y0, log 2TbWidth, log 2TbHeight, cIdx), and the alignment processing is performed at the beginning of residual_ts_coding(x0, y0, log 2TbWidth, log 2TbHeight, cIdx). Or, the alignment processing is performed before the first dec_abs_level, abs_remainder or sb_coded_flag of the TB. Or, the alignment processing is performed before the first syntax element coded by using the bypass mode of the TB.

It should be noted that in the embodiment of the disclosure, input to the alignment processing is the variable ivlCurrRange, and output of the alignment processing is the updated variable ivlCurrRange, here, ivlCurrRange is set to 256.

Further, in the embodiment of the disclosure, whether to perform coding and decoding by using the high throughput mode, may be controlled by using sequence level flag information and slice level flag information. Specifically, the high throughput mode flag information may include the sequence level flag information and the slice level flag information; if the value of the sequence level flag information is a first value, then value of the slice level flag information may be determined; if the value of the slice level flag information is the first value, usage of the high throughput mode may be selected, that is, the coefficients of the current block may be determined by using the alignment processing; and/or, the coefficients of the current block may be determined by using the bypass mode; and/or, the coefficients of the current block may be determined by using at least one of the context mode or the bypass mode.

Exemplarily, in the disclosure, there is a sequence level flag sps_extension_flag. At the sequence level, if the value of sps_extension_flag is 1, sps_range_extension_flag needs to be decoded. If the value of sps_range_extension_flag is 1, the sequence level flag information sps_high_throughput_mode_enabled_flag needs to be decoded. Specifically, the sequence parameter set RBSP syntax is shown above in Table 3, and the sequence parameter set range extension syntax is shown above in Table 4.

Further, in the disclosure, sps_high_throughput_mode_enabled_flag is a flag of enabling a high throughput mode of a current sequence. If the value of sps_high_throughput_mode_enabled_flag is 1, then the slice level flag information sh_high_throughput_mode_flag needs to be decoded at the slice level. If the value of sh_high_throughput_mode_flag is 1, it indicates that the high throughput mode is used in blocks within a current slice, and if the value of sh_high_throughput_mode_flag is 0, it indicates that the high throughput mode is not used in blocks within the current slice.

It should be noted that in the embodiment of the disclosure, if the value of sps_high_throughput_mode_enabled_flag is equal to 1, it indicates that sh_high_throughput_mode_flag appears in slice header of the current sequence, and if the value of sps_high_throughput_mode_enabled_flag is equal to 0, it indicates that sh_high_throughput_mode_flag does not appear in the slice header of the current sequence. When sps_high_throughput_mode_enabled_flag does not appear, the value of sps_high_throughput_mode_enabled_flag may be considered to be 0.

Specifically, in the disclosure, slice header syntax is shown above in Table 7. If the value of sh_high_throughput_mode_flag is equal to 1, it indicates that the high throughput mode is used in blocks within the current slice, and if the value of sh_high_throughput_mode_flag is equal to 0, it indicates that the high throughput mode is not used in blocks within the current slice. When sh_high_throughput_mode_flag does not appear, the value of sh_high_throughput_mode_flag may be considered to be 0.

Exemplarily, in the disclosure, in terms of syntax, an original sentence remBinsPass1=((1<<(log 2TbWidth+log 2TbHeight))×7)>>2 of residual_coding(x0, y0, log 2TbWidth, log 2TbHeight, cIdx) in residual coding syntax of Table 1 may be replaced by conditional sentences shown above in Table 8.

Exemplarily, in the disclosure, in terms of syntax, an original sentence RemCcbs=((1<<(log 2TbWidth+log 2TbHeight))×7)>>2 of residual_ts_coding(x0, y0, log 2TbWidth, log 2TbHeight, cIdx) in residual coding syntax of Table 2 may be replaced by conditional sentences shown above in Table 9.

It should be noted that in the embodiment of the disclosure, with respect to sb_coded_flag which needs to be decoded, if the value of sh_high_throughput_mode_flag is 1, sb_coded_flag is decoded by using the bypass mode; otherwise, sb_coded_flag is decoded by using a common context mode.

What added in general descriptions of CABAC parsing process for slice data is if the value of sh_high_throughput_mode_flag is 1, the alignment processing is performed after last_sig_coeff_x_prefix, last_sig_coeff_y_prefix, last_sig_coeff_x_suffix and last_sig_coeff_y_suffix (if present) in residual_coding(x0, y0, log 2TbWidth, log 2TbHeight, cIdx), and the alignment processing is performed at the beginning of residual_ts_coding(x0, y0, log 2TbWidth, log 2TbHeight, cIdx). Or, the alignment processing is performed before the first dec_abs_level, abs_remainder or sb_coded_flag of the TB. Or, the alignment processing is performed before the first syntax element coded by using the bypass mode of the TB.

Figure 16:
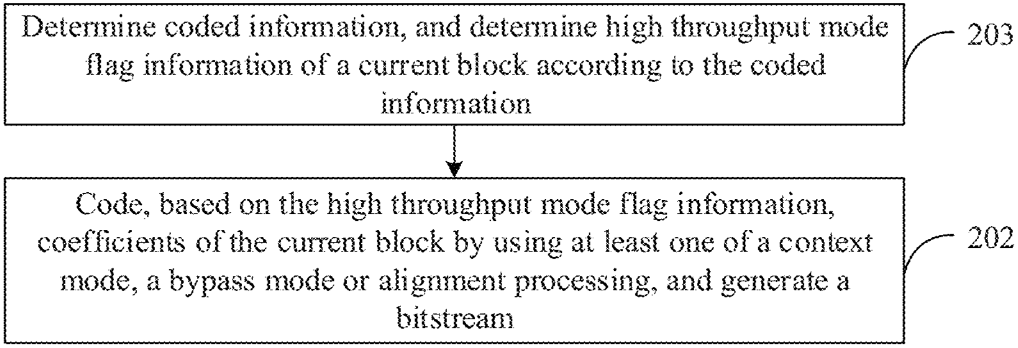
FIG. 16 is a second schematic flowchart of implementation of an encoding method.

Further, in an embodiment of the disclosure, FIG. 16 is a second schematic flowchart of implementation of the encoding method. As shown in FIG. 16, the method for the encoder to perform encoding may include the following operations 203 and 202.

At 203, coded information is determined, and high throughput mode flag information of a current block is determined according to the coded information.

At 202, coefficients of the current block are coded based on the high throughput mode flag information, by using at least one of a context mode, a bypass mode or alignment processing, and a bitstream is generated.

In the embodiment of the disclosure, the coded information may be determined first. Then, the high throughput mode flag information of the current block may be determined according to the coded information. Then, the coefficients of the current block may be coded based on the high throughput mode flag information, by using at least one of the context mode, the bypass mode or the alignment processing, and the bitstream is generated. The high throughput mode flag information may be used to improve throughput of coding and decoding.

It may be understood that in the embodiment of the disclosure, when the current block is coded/decoded, the coded information may indicate information of current coded/decoded blocks. Correspondingly, when current partial contents are coded/decoded, the coded information may indicate information of current coded/decoded partial contents.

Optionally, in the embodiment of the disclosure, the coded information at least includes coded information of one of the following: first n coded slices, first n coded LCUs, first n coded CTUs, first n coded CUs, first n coded TUs, or first n coded TBs, here, n is an integer greater than 0.

That is, in the disclosure, the current partial contents include but are not limited to a current slice, a current CTU, a current LCU, a current CU, a current TU, or a current TB, etc. Correspondingly, the coded/decoded partial contents include but are not limited to coded/decoded slices, coded/decoded LCUs, coded/decoded CUs, coded/decoded TUs, or coded/decoded TBs, etc.

Exemplarily, in the embodiment of the disclosure, the coded/decoded partial contents include but are not limited to the first n slices, the first n CTUs, the first n LCUs, the first n CUs, the first n TUs, the first n TBs, or the like, here, n is 1, 2 . . . etc.

Exemplarily, in the embodiment of the disclosure, the coded/decoded partial contents include but are not limited to all the slices, CTUs, LCUs, CUs, TUs, TBs or the like (in a certain range) before the current partial contents.

Further, in the embodiment of the disclosure, the coded information at least includes one of the following information: bit rate, coefficients, residuals, or number of bits.

That is, in the disclosure, the coded information includes but is not limited to bit rate, coefficients, residuals, number of bits, some other variables or parameters, or statistics of parameters.

Further, in the embodiment of the disclosure, the value of the high throughput mode flag information of the current block may be determined from the coded information, so that it may be determined based on the value of the high throughput mode flag information whether to use the high throughput mode. That is, it may be determined according to information of the current coded/decoded partial contents whether to use high-throughput coding and decoding methods (the high throughput mode) to code and decode the current partial contents.

It should be noted that in the embodiment of the disclosure, when the high throughput mode flag information of the current block is determined according to the coded information, if the coded information meets a second preset condition, value of the high throughput mode flag information is determined as a first value; when the coded information does not meet the second preset condition, the value of the high throughput mode flag information is determined as a second value.

Correspondingly, in the disclosure, the value of the high throughput mode flag information may be the first value or the second value. Specifically, when the high throughput mode flag information has different values, modes of determining the coefficients of the current block (or values of the coefficients of the current block) are also different. The encoding and decoding methods in the high throughput mode include but are not limited to the alignment operation, a full-bypass mode, etc.

It may be understood that in the embodiment of the disclosure, a method which does not use syntax elements of the coefficients coded by using the context mode may be determined as the full-bypass mode.

Further, in the embodiment of the disclosure, the second preset condition may be used to determine a level of the bit rate, that is, the second preset condition may determine whether the bit rate needs to be reduced. Specifically, the second preset condition may include one of the following conditions: the bit rate being equal to or greater than a first threshold, a sum of absolute values of the coefficients being equal to or greater than a second threshold, an average value of the absolute values of the coefficients being equal to or greater than a third threshold, a sum of absolute values of the residuals being equal to or greater than a fourth threshold, an average value of the absolute values of the residuals being equal to or greater than a fifth threshold, or the number of bits being equal to or greater than a sixth threshold.

Exemplarily, in the embodiment of the disclosure, with respect to the current CTU, when some variables or parameters of a previous CTU meet a condition (the coded information meets the second preset condition), for example, a number of bits used by the previous CTU reaches or exceeds a threshold, or a sum of absolute values of coefficient levels or residual levels of the previous CTU exceeds a threshold, or an average value of the absolute values of the coefficient levels or residual levels of the previous CTU exceeds a threshold, then it may be determined that the value of the high throughput mode flag information is the first value, that is, it may be determined that the high throughput mode is used in the current CTU; otherwise, it is considered that the coded information does not meet the second preset condition, then it is determined that the value of the high throughput mode flag information is the second value, that is, the high throughput mode is not used in the current CTU.

Exemplarily, in the embodiment of the disclosure, with respect to the current TB, when some variables or parameters of a previous TB meet a condition (the coded information meets the second preset condition), for example, a number of bits used by the previous TB reaches or exceeds a threshold, or a sum of absolute values of coefficient levels or residual levels of the previous TB exceeds a threshold, or an average value of the absolute values of the coefficient levels or residual levels of the previous TB exceeds a threshold, then it may be determined that the value of the high throughput mode flag information is the first value, that is, it may be determined that the high throughput mode is used in the current TB; otherwise, it is considered that the encoded information does not meet the second preset condition, then it is determined that the value of the high throughput mode flag information is the second value, that is, the high throughput mode is not used in the current TB.

Exemplarily, in the embodiment of the disclosure, with respect to the current CTU, when some variables or parameters of a previously coded CTU in the current slice meet a condition (the coded information meets the second preset condition), for example, an average value of the number of bits used by the previously coded CTU in the current slice reaches or exceeds a threshold, or an average value of absolute values of coefficient levels or residual levels of the previously coded CTU in the current slice exceeds a threshold, then it may be determined that the value of the high throughput mode flag information is the first value, that is, it may be determined that the high throughput mode is used in the current CTU; otherwise, it is considered that the coded information does not meet the second preset condition, then it is determined that the value of the high throughput mode flag information is the second value, that is, the high throughput mode is not used in the current CTU.

Specifically, in the embodiment of the disclosure, based on the value of the high throughput mode flag information, at least one of the context mode, the bypass mode, the alignment processing, or other modes may be selected to be used for coding the coefficients of the current block.

Further, in the embodiment of the disclosure, the high throughput mode flag information may be understood as a flag bit indicating whether to perform the alignment processing. If the value of the high throughput mode flag information is the first value, usage of the alignment processing may be selected to code the coefficients of the current block and generate the bitstream; if the value of the high throughput mode flag information is the second value, skipping of the alignment processing may be selected to code the coefficients of the current block and generate the bitstream.

Further, in the embodiment of the disclosure, the high throughput mode flag information may be understood as a flag bit indicating whether to use only the bypass mode. If the value of the high throughput mode flag information is the first value, usage of the bypass mode may be selected to code the coefficients of the current block and generate the bitstream; if the value of the high throughput mode flag information is the second value, usage of at least one of the context mode or the bypass mode may be selected to code the coefficients of the current block and generate the bitstream.

Further, in the embodiment of the disclosure, the high throughput mode flag information may be understood as a flag bit indicating that an initial value of a quantity parameter is reduced (or, the quantity parameter is set to 0). The initial value of the quantity parameter may be determined first according to the high throughput mode flag information; if the initial value of the quantity parameter is equal to or greater than a quantity threshold, then usage of at least one of the context mode or the bypass mode may be selected to code the coefficients of the current block and generate the bitstream; if the initial value of the quantity parameter is less than the quantity threshold, then usage of the bypass mode may be selected to code the coefficients of the current block and generate the bitstream.

Exemplarily, in the disclosure, the first value may be set to 1, and the second value may be set to 0; or, the first value may be set to "true", and the second value may be set to "false". The disclosure does not impose any limitation thereto.

It may be understood that in the disclosure, it is just because the full-bypass mode or the high throughput mode may significantly improve throughput of coding and decoding, the full-bypass mode or the high throughput mode is suitable for coding and decoding a video with ultra-high bit rate. It is just because coding and decoding of the video with ultra-high bit rate itself have very high requirements on throughput of decoding, and on the other hand, there are usually very large coefficients in a bitstream of the video with ultra-high bit rate, sig_coeff_flag, abs_level_gtx_flag, par_level_flag or the like may not play an apparent role at this time, instead, may increase overhead. In other words, throughput is significantly improved in the full-bypass mode or the high throughput mode when the video with ultra-high bit rate is coded/decoded, while compression efficiency may not be reduced or significantly reduced.

However, the full-bypass mode or the high throughput mode is not suitable for coding and decoding a video with low bit rate or a video without high bit rate. This is because in a scenario where the video with low bit rate is coded/decoded, although throughput is significantly improved, compression performance may be significantly reduced. Furthermore, there are usually small coefficients in coding and decoding of the video with low bit rate, sig_coeff_flag, abs_level_gtx_flag, par_level_flag or the like are very helpful for compression performance at this time, and the full-bypass mode or the high throughput mode may skip sig_coeff_flag, abs_level_gtx_flag, par_level_flag. Such operation cannot guarantee compression performance. In the high throughput mode, all sb_coded_flag use the bypass mode, and the alignment operation may also lose compression efficiency.

It may be seen that when the bit rate of the video is not high, it may be considered that requirements on throughput of coding and decoding are not high either, then it is unnecessary to obtain a higher throughput with cost of sacrificing compression performance. In view of this, an adaptive high throughput mode proposed in the disclosure may adaptively determine whether to use the high throughput mode in the current part according to situations of encoded/decoded videos, so that throughput may be significantly improved without significant loss of compression performance when the bit rate is high enough, and the compression performance may not be significantly lost when the bit rate is not high, thereby having higher adaptability.

It may be understood that in the embodiment of the disclosure, with respect to the adaptive high throughput mode, descriptions are mainly made by selecting the high throughput mode as an example, and the adaptive high throughput mode proposed in the embodiment of the disclosure may also be applied to the full-bypass mode to be evolved into an adaptive full-bypass mode, or applied to other modes for improving throughput. The disclosure does not impose specific limitation thereto.

Further, in the embodiment of the disclosure, VVC uses a history-based Rice parameter derivation technology during high bit width coding. This technology sets a variable StatCoeff[cIdx] for each component, cIdx may take values 0, 1 and 2 indicating three components of YUV respectively. The variable StatCoeff[cIdx] is initialized at the beginning of each slice or tile, and value of the variable StatCoeff[cIdx] is updated once when each TB is coded/decoded. The variable StatCoeff[cIdx] is used to derive Rice parameters for coding the coefficients.

That is, in the disclosure, the adaptive high throughput mode may determine whether to use the high throughput mode in the current part, by using the variable StatCoeff[cIdx].

It should be noted that in the embodiment of the disclosure, when initializing the variable StatCoeff[cIdx], if the history-based Rice parameter derivation technology is not used in the current sequence, the variable StatCoeff[cIdx] is initialized to 0, cIdx is equal to 0, 1, 2. Otherwise, if bitDepth of the variable is greater than 12, the variable StatCoeff[cIdx] is initialized to 4; otherwise, the variable StatCoeff[cIdx] is initialized to 2. Specifically, syntax for updating the variable StatCoeff[cIdx] may be shown above in Table 17. sps_persistent_rice_adaptation_enabled_flag is a flag indicating whether to use the history-based Rice parameter derivation technology in the sequence.

Specifically, in the disclosure, if a first non-zero exponent-Golomb coded coefficient in TB uses abs_remainder, StatCoeff[cIdx] of a corresponding component is updated to StatCoeff[cIdx]=(StatCoeff[cIdx]+Floor(Log 2(abs_remainder[n]))+2)>>1. If the first non-zero exponent-Golomb coded coefficient in the TB uses dec_abs_level, StatCoeff

[cIdx] of the corresponding component is updated to StatCoeff[cIdx]=(StatCoeff[cIdx]+Floor(Log 2(dec_abs_level [n])))>>1.

It may be seen that the case of using abs_remainder has one more "+2" than the case of dec_abs_level, because if there are many large coefficients in the TB, the first non-zero exponent-Golomb coded coefficient in the TB may usually use abs_remainder, and if the first non-zero exponent-Golomb coded coefficient in the TB uses dec_abs_level, it means that coefficients of the TB are generally small, since all the coefficients coded by using the context mode are less than 4. That is, there is a larger possibility that the coefficients are generally large in case that abs_remainder is used, and there is a very small possibility that the coefficients are generally large in case that dec_abs_level is used.

It should be noted that in the embodiment of the disclosure, since the coefficients may only use dec_abs_level in the high throughput mode, the above parts do not consider the high throughput mode. In the high throughput mode, it is apparent that the coefficient levels should be large, and therefore it should be "+2" in this case.

That is, in the disclosure, before coding and decoding of each TB start, a variable StatCoeff[cIdx] determined according to TB of a coded side may be obtained, therefore it may be determined whether to use the high throughput mode in the current TB, according to the variable StatCoeff[cIdx]. The variable StatCoeff[cIdx] is updated in RRC, and it may be determined whether to use the high throughput mode in the current TB of RRC and TSRC, according to the variable StatCoeff[cIdx]. Or, it may only be determined whether to use the high throughput mode in the current TB of RRC, according to the variable StatCoeff[cIdx]. Or, it may be determined whether to use the high throughput mode in the current CU or current CTU of RRC, according to the variable StatCoeff[cIdx].

Further, in the embodiment of the disclosure, if the coded information is a Rice parameter, then when the coded information is determined, a value of a first variable may be determined first, the first variable may be a variable StatCoeff[cIdx]. Then, the coded information may be determined according to the value of the first variable.

Specifically, in the disclosure, when determining the coded information is determined according to the value of the first variable, if the value of the first variable is equal to or greater than a seventh threshold, it is determined that the Rice parameter meets the second preset condition, that is, it is determined that the value of the high throughput mode flag information is the first value, and then usage of the high throughput mode is selected; if the value of the first variable is less than the seventh threshold, it is determined that the Rice parameter does not meet the second preset condition, that is, it is determined that the value of the high throughput mode flag information is the second value, and then usage of the high throughput mode is not selected.

Exemplarily, if the value of the variable StatCoeff[cIdx] is equal to or greater than a threshold, the high throughput mode is used in the current TB; otherwise, the high throughput mode is not used in the current TB. Value of the threshold may be 3, 4, 5, etc.

Further, in the embodiment of the disclosure, a sequence level flag sps_high_throughput_mode_enabled_flag may be set in SPS syntax. A TB level flag high throughput mode flag is set. If the value of sps_high_throughput_mode_enabled_flag is equal to 1, it indicates that the high throughput mode may be used in blocks within the current sequence; otherwise, it indicates that the high throughput mode is not used in blocks within the current sequence.

It may be understood that in the disclosure, if it "may" be used at the sequence level, it is determined whether it is used at TB. Based on Table 1, semantics of sps_high_throughput_mode_enabled_flag is modified as shown above in Table 18 (the modified parts are marked with underline).

Exemplarily, in the disclosure, based on Table 2, semantics of sps_high_throughput_mode_enabled_flag is modified as shown above in Table 19 (the modified parts are marked with underline).

Further, in the embodiment of the disclosure, when the coded information is a Rice parameter, then when the coded information is determined, a value of a second variable may be determined first, the second variable may be a variable sh_ts_residual_coding_rice_idx_minus1. Then, the coded information may be determined according to the value of the second variable.

Specifically, in the disclosure, when determining the coded information according to the value of the second variable, if the value of the second variable is equal to or greater than an eighth threshold, it is determined that the Rice parameter meets the second preset condition, that is, it is determined that the value of the high throughput mode flag information is the first value, and then usage of the high throughput mode is selected; if the value of the second variable is less than the eighth threshold, it is determined that the Rice parameter does not meet the second preset condition, that is, it is determined that the value of the high throughput mode flag information is the second value, and then usage of the high throughput mode is not selected.

It should be noted that in the embodiment of the disclosure, VVC uses a different way from RRC, in a method for deriving a Rice parameter of TSRC during high bit width coding. The Rice parameter of TSRC is derived according to sh_ts_residual_coding_rice_idx_minus1. sh_ts_residual_coding_rice_idx_minus1+1 determines a Rice parameter used by residual_ts_coding(x0, y0, log 2TbWidth, log 2TbHeight, cIdx). Therefore, with respect to TB of TSRC, whether to use the high throughput mode in the current TB, may be determined according to sh_ts_residual_coding_rice_idx_minus1. Specifically, if the value of sh_ts_residual_coding_rice_idx_minus1 is equal to or greater than a threshold, the high throughput mode is used in the TB of TSRC of the current slice; otherwise, the high throughput mode is not used in the TB of TSRC of the current slice. Furthermore, whether to use the high throughput mode in the current TB of RRC, may also be determined according to sh_ts_residual_coding_rice_idx_minus1.

Exemplarily, in the disclosure, based on Table 2, semantics of sps_high_throughput_mode_enabled_flag is modified as shown above in Table 20 (the modified parts are marked with underline).

It may be considered that (a=b? c:d) expresses the same meaning as (if(b){a=c;}else{a=d;}).

It may be seen that in the embodiment of the disclosure, the variable StatCoeff[cIdx] and/or sh_ts_residual_coding_rice_idx_minus1 may be used to determine whether usage of the high throughput mode is suitable, which may improve adaptability of usage of the high throughput mode.

In conclusion, in the embodiment of the disclosure, by setting a high throughput mode, the following items may be taken into consideration in combination: whether to perform coding and decoding by using only the bypass mode, whether to perform coding and decoding by using the context mode, and whether to perform the alignment processing, so as to further determine the coefficients of the current block by using at least one of the context mode, the bypass mode or the alignment processing. Specifically, on one hand, since the distribution rule of coefficients is different from that of a regular video scenario, throughput of decoding the coefficients can be improved by reducing or even eliminating a number of syntax elements decoded by using the context mode during decoding of the coefficients. On the other hand, a large piece of continuous and aligned bypass mode coding can be formed in the high throughput mode, which can further improve throughput. Furthermore, the adaptive high throughput mode can adaptively determine whether to use the high throughput mode in the current part according to situations of encoded/decoded videos, so that throughput can be significantly improved without significant loss of compression performance when the bit rate is high enough, and the compression performance would not be significantly lost when the bit rate is not high, thereby having higher adaptability That is, the high throughput mode proposed in the disclosure takes the following items into consideration in combination: whether to perform coding and decoding by using only the bypass mode, whether to perform coding and decoding by using the context mode, and whether to perform the alignment processing, and may form a piece of aligned bypass mode coding in case that the high throughput mode is used. Furthermore, the adaptive high throughput mode proposed in the disclosure may determine whether to use the high throughput mode in the current part based on information of coded/decoded parts, which can improve adaptability of usage of the high throughput mode.

The embodiment of the disclosure provides an encoding method. When the encoder and decoder code and decode the coefficients respectively, the encoder and decoder may take the following items into consideration in combination: by setting a high throughput mode, whether to perform coding and decoding by using only the bypass mode, whether to perform coding and decoding by using the context mode, and whether to perform the alignment processing, so that the coefficients of the current block are further determined by using at least one of the context mode, the bypass mode or the alignment processing. It can improve throughput for coding the coefficients and coding and decoding speeds, and reduce complexity; furthermore, the adaptive high throughput mode can adaptively determine whether to use the high throughput mode in the current part according to situations of encoded/decoded videos, so that throughput can be significantly improved without significant loss of compression performance when the bit rate is high enough, and compression performance can not be significantly lost when the bit rate is not high, which has higher adaptability, thereby improving compression performance.

Figure 17:
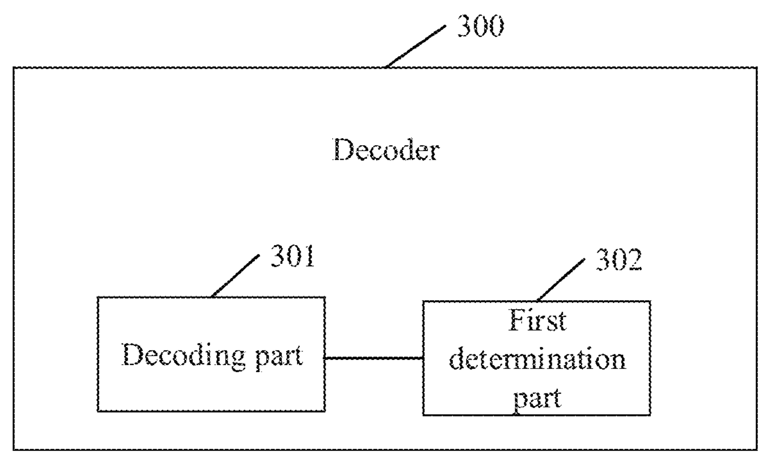
FIG. 17 is a first schematic diagram of compositional structures of a decoder according to an embodiment of the disclosure.

Based on the above embodiments, in another embodiment of the disclosure, FIG. 17 is a first schematic diagram of compositional structures of a decoder according to an embodiment of the disclosure. As shown in FIG. 17, the decoder 300 according to the embodiment of the disclosure may include a decoding part 301 and a first determination part 302.

The decoding part 301 is configured to decode a bitstream.

The first determination part 302 is configured to determine high throughput mode flag information of a current block, and determine, based on the high throughput mode flag information, coefficients of the current block by using at least one of a context mode, a bypass mode or alignment processing.

Further, in the embodiment of the disclosure, the first determination part 302 is configured to: determine decoded information, and determine high throughput mode flag information of a current block according to the decoded information; and determine, based on the high throughput mode flag information, coefficients of the current block by using at least one of a context mode, a bypass mode or alignment processing.

Figure 18:
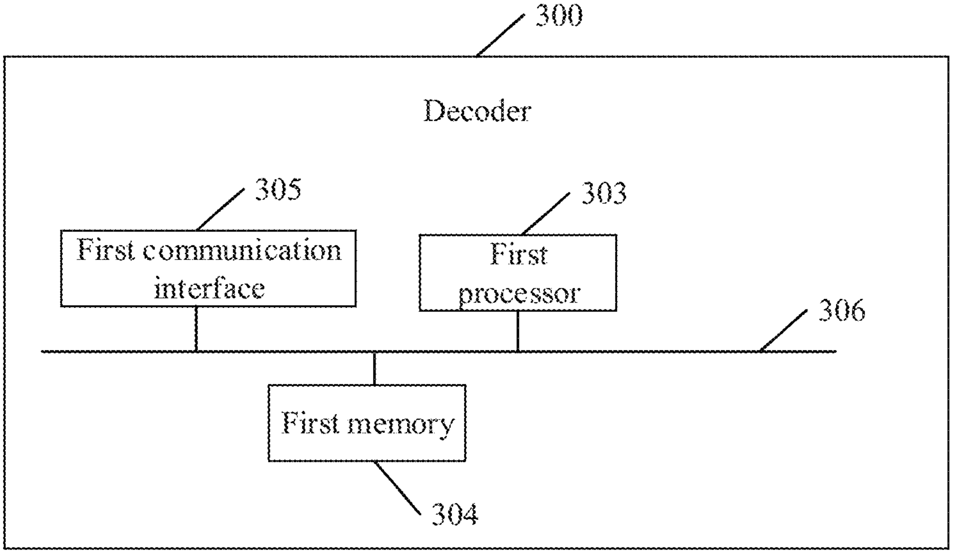
FIG. 18 is a second schematic diagram of compositional structures of a decoder according to an embodiment of the disclosure.

FIG. 18 is a second schematic diagram of compositional structures of a decoder according to an embodiment of the disclosure. As shown in FIG. 18, the decoder 300 according to the embodiment of the disclosure may further include a first processor 303, a first memory 304 storing instructions executable by the first processor 303, a first communication interface 305, and a first bus 306 configured to connect the first processor 303, the first memory 304 and the first communication interface 305.

Further, in the embodiment of the disclosure, the first processor 303 is configured to: decode a bitstream, and determine high throughput mode flag information of a current block; and determine, based on the high throughput mode flag information, coefficients of the current block by using at least one of a context mode, a bypass mode or alignment processing.

Further, in the embodiment of the disclosure, the first processor 303 is configured to: determine decoded information, and determine high throughput mode flag information of a current block according to the decoded information; and determine, based on the high throughput mode flag information, coefficients of the current block by using at least one of a context mode, a bypass mode or alignment processing.

Figure 19:
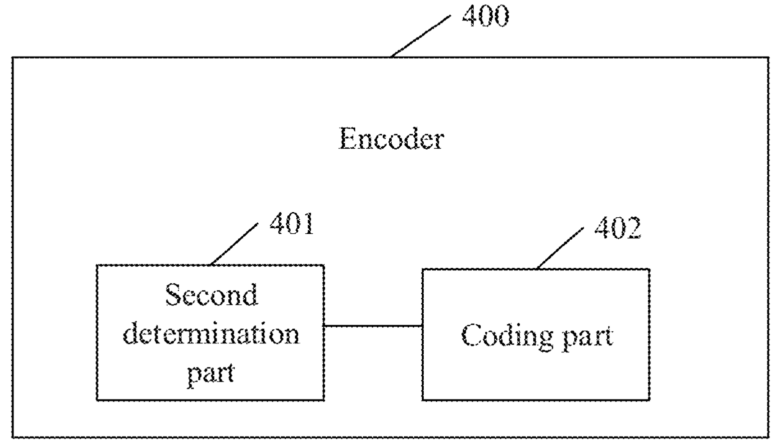
FIG. 19 is a first schematic diagram of compositional structures of an encoder according to an embodiment of the disclosure.

FIG. 19 is a first schematic diagram of compositional structures of an encoder according to an embodiment of the disclosure. As shown in FIG. 19, the encoder 400 according to the embodiment of the disclosure may include a second determination part 401 and a coding part 402.

The second determination part 401 is configured to determine high throughput mode flag information of a current block.

The coding part 402 is configured to code, based on the high throughput mode flag information, coefficients of the current block by using at least one of a context mode, a bypass mode or alignment processing, and generate a bitstream.

Further, in the embodiment of the disclosure, the second determination part 401 is configured to determine decoded information, and determine high throughput mode flag information of a current block according to the decoded information.

The coding part 402 is configured to code, based on the high throughput mode flag information, coefficients of the current block by using at least one of a context mode, a bypass mode or alignment processing, and generate a bitstream.

Figure 20:
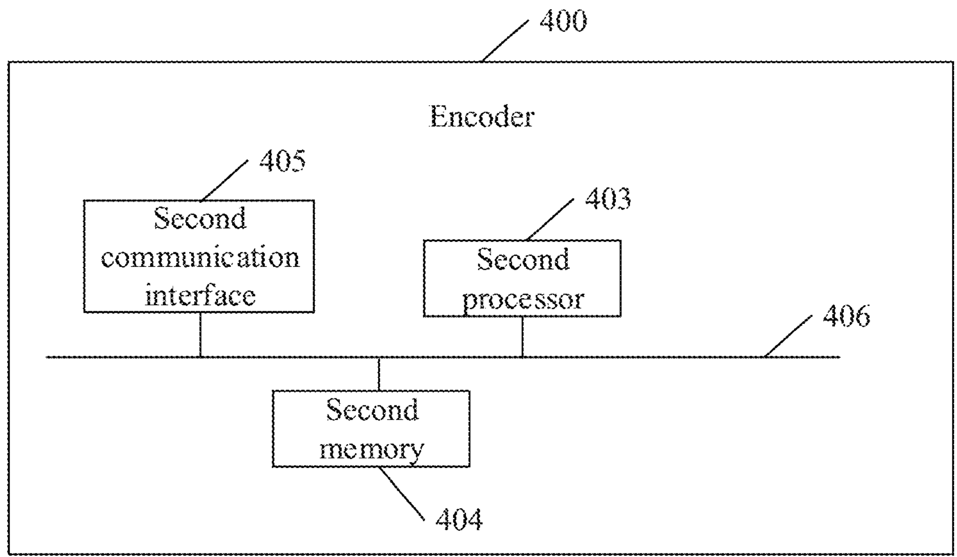
FIG. 20 is a second schematic diagram of compositional structures of an encoder according to an embodiment of the disclosure.

FIG. 20 is a second schematic diagram of compositional structures of an encoder according to an embodiment of the disclosure. As shown in FIG. 20, the encoder 400 according to the embodiment of the disclosure may further include a second processor 403, a second memory 404 storing instructions executable by the second processor 403, a second communication interface 405, and a second bus 406 configured to connect the second processor 403, the second memory 404 and the second communication interface 405.

Further, in the embodiment of the disclosure, the second processor 403 is configured to: determine high throughput mode flag information of a current block; and code, based on the high throughput mode flag information, coefficients of the current block by using at least one of a context mode, a bypass mode or alignment processing, and generate a bitstream.

Further, in the embodiment of the disclosure, the second processor 403 is configured to: determine decoded information, and determine high throughput mode flag information of a current block according to the decoded information; and code, based on the high throughput mode flag information, coefficients of the current block by using at least one of a context mode, a bypass mode or alignment processing, and generate a bitstream.

Furthermore, each function module in the embodiment may be integrated into one processing unit, or each unit may separately exist physically, or two or more units may be integrated into one unit. The above integrated units may be implemented in form of hardware or in form of a software function module.

When the integrated units are implemented in form of a software function module, rather than sold or used as an independent product, the integrated units may be stored in a computer-readable storage medium. Based on such understanding, the technical solutions of the embodiment substantially or parts making contributions to the related art, or all or part of the technical solutions may be embodied in form of a software product, and the computer software product is stored in a storage medium, includes several instructions to enable a computer device (which may be a personal computer, a server, or a network device, etc.) or a processor to execute all or part of operations of the method in the embodiment. The foregoing storage medium includes various media capable of storing program codes, such as a U disk, a mobile hard disk, a Read Only Memory (ROM), a Random Access Memory (RAM), a magnetic disk or an optical disk, etc.

The embodiments of the disclosure provide an encoder and a decoder. when the encoder and decoder code and decode the coefficients respectively, the encoder and decoder may combine whether to perform coding and decoding by using only the bypass mode, whether to perform coding and decoding by using the context mode, and whether to perform the alignment processing by setting a high throughput mode, so that the coefficients of the current block are further determined by using at least one of the context mode, the bypass mode or the alignment processing. It may improve throughput for coding the coefficients and coding and decoding speeds, and reduce complexity; furthermore, an adaptive high throughput mode may adaptively determine whether to use the high throughput mode in a current part according to situations of encoded/decoded videos, so that throughput may be significantly improved without significant loss of compression performance when the bit rate is high enough, and compression performance may not be significantly lost when the bit rate is not high, which has higher adaptability, thereby improving compression performance.

An embodiment of the disclosure provides a computer-readable storage medium, having stored thereon a program. The program implements the methods described in the above embodiments, when the program is executed by a processor.

Specifically, program instructions corresponding to a decoding method in the embodiment may be stored in a storage medium such as an optical disk, a hard disk, a U disk, etc. When the program instructions corresponding to a decoding method in the storage medium are read or executed by an electronic device, the following operations are included.

A bitstream is decoded, and high throughput mode flag information of a current block is determined.

Coefficients of the current block are determined based on the high throughput mode flag information, by using at least one of a context mode, a bypass mode or alignment processing.

Further, in the embodiment of the disclosure, when the program instructions corresponding to a decoding method in the storage medium are read or executed by an electronic device, the following operations are included.

Decoded information is determined, and high throughput mode flag information of a current block is determined according to the decoded information.

Coefficients of the current block are determined based on the high throughput mode flag information, by using at least one of a context mode, a bypass mode or alignment processing.

Specifically, program instructions corresponding to an encoding method in the embodiment may be stored in a storage medium such as an optical disk, a hard disk, a U disk, etc. When the program instructions corresponding to an encoding method in the storage medium are read or executed by an electronic device, the following operations are included.

High throughput mode flag information of a current block is determined.

Coefficients of the current block are coded based on the high throughput mode flag information, by using at least one of a context mode, a bypass mode or alignment processing, and a bitstream is generated.

Further, in the embodiment of the disclosure, when the program instructions corresponding to an encoding method in the storage medium are read or executed by an electronic device, the following operations are included.

Decoded information is determined, and high throughput mode flag information of a current block is determined according to the decoded information.

Coefficients of the current block are coded based on the high throughput mode flag information, by using at least one of a context mode, a bypass mode or alignment processing, and a bitstream is generated.

It should be understood by those skilled in the art that the embodiments of the disclosure may be provided as methods, systems, or computer program products. Therefore, the disclosure may take a form of a hardware embodiment, a software embodiment, or an embodiment combining software and hardware aspects. Furthermore, the disclosure may take a form of a computer program product implemented on one or more computer-available storage media (including, but not limited to a magnetic disk memory, an optical memory, etc.) including computer-available program codes therein.

The disclosure is described with reference to schematic flowcharts and/or block diagrams of implementations of the methods, devices (systems) and computer program products according to the embodiments of the disclosure. It should be understood that each process and/or block in the schematic flowcharts and/or block diagrams, and combinations of processes and/or blocks in the schematic flowcharts and/or block diagrams, may be implemented by computer program instructions. These computer program instructions may be provided to a processor of a general purpose computer, a special purpose computer, an embedded processor, or other programmable data processing devices to produce a machine, such that instructions executed by the processor of the computer or other programmable data processing devices produce a device configured to implement the functions specified in one or more processes of the schematic flowchart and/or one or more blocks of the block diagram.

These computer program instructions may also be stored in a computer-readable memory which may guide a computer or other programmable data processing device to operate in a particular manner, such that the instructions stored in the computer-readable memory produce an article of manufacture including an instruction device, the instruction device implements the functions specified in one or more processes of the schematic flowchart and/or one or more blocks of the block diagram.

These computer program instructions may also be loaded onto a computer or other programmable data processing devices, so that a series of operation steps are performed on the computer or other programmable devices to produce computer-implemented processing. Therefore, the instructions executed on the computer or other programmable devices provide operations to implement the functions specified in one or more processes of the schematic flowchart and/or one or more blocks of the block diagram. The above descriptions are only preferred embodiments of the disclosure, and are not intended to limit the scope of protection of the disclosure.

INDUSTRIAL APPLICABILITY

The embodiments of the disclosure provide an encoding method, a decoding method, an encoder, a decoder, and a storage medium. The decoder decodes a bitstream, and determines high throughput mode flag information of a current block; and determines, based on the high throughput mode flag information, coefficients of the current block by using at least one of a context mode, a bypass mode or alignment processing. The decoder determines decoded information, and determines high throughput mode flag information of a current block according to the decoded information; and determines, based on the high throughput mode flag information, coefficients of the current block by using at least one of a context mode, a bypass mode or alignment processing. The encoder determines high throughput mode flag information of a current block; and codes, based on the high throughput mode flag information, coefficients of the current block by using at least one of a context mode, a bypass mode or alignment processing, and generates a bitstream. The encoder determines decoded information, and determines high throughput mode flag information of a current block according to the decoded information; and codes, based on the high throughput mode flag information, coefficients of the current block by using at least one of a context mode, a bypass mode or alignment processing, and generates a bitstream. That is, in the embodiments of the disclosure, when the encoder and decoder code and decode the coefficients respectively, by setting a high throughput mode, the encoder and decoder may take the following items into consideration in combination: whether to perform coding and decoding by using only the bypass mode, whether to perform coding and decoding by using the context mode, and whether to perform the alignment processing, so that the coefficients of the current block are further determined by using at least one of the context mode, the bypass mode or the alignment processing. It can improve throughput for coding the coefficients and coding and decoding speeds, and reduce complexity; furthermore, an adaptive high throughput mode can adaptively determine whether to use the high throughput mode in a current part according to situations of encoded/decoded videos, so that throughput can be significantly improved without significant loss of compression performance when the bit rate is high enough, and compression performance can not be significantly lost when the bit rate is not high, which has higher adaptability, thereby improving compression performance.

What is claimed is:

1. A decoding method, applied to a decoder, comprising:

decoding a bitstream, and determining high throughput mode flag information of a current block;

determining coefficients of the current block by using alignment processing, in a case that a value of the high throughput mode flag information is a first value; and determining the coefficients of the current block without the alignment processing, in a case that the value of the high throughput mode flag information is a second value;

wherein the alignment processing is used to align a fractional number of bits being processed to an integer number of bits.

2. The method of claim 1, wherein determining the coefficients of the current block by using the alignment processing comprises at least one of the following:

performing the alignment processing, after determining position of a last non-zero coefficient by using a context mode; or performing the alignment processing, before determining a first syntax element by using a bypass mode.

3. The method of claim 1, wherein determining the coefficients of the current block by using the alignment processing comprises:

performing the alignment processing, after determining horizontal coordinate prefix flag information and vertical coordinate prefix flag information of a last non-zero coefficient by using a context mode and before determining horizontal coordinate suffix flag information and vertical coordinate suffix flag information of the last non-zero coefficient by using a bypass mode.

4. The method of claim 1, wherein the method further comprises:

determining the coefficients of the current block by using a bypass mode, in a case that the value of the high throughput mode flag information is the first value; and determining the coefficients of the current block by using at least one of a context mode or the bypass mode, in a case that the value of the high throughput mode flag information is the second value.

5. The method of claim 1, wherein the method further comprises:

determining an initial value of a quantity parameter according to the high throughput mode flag information;

determining the coefficients of the current block by using at least one of a context mode or a bypass mode, in a case that the initial value of the quantity parameter is equal to or greater than a quantity threshold; and determining the coefficients of the current block by using the bypass mode, in a case that the initial value of the quantity parameter is less than the quantity threshold.

6. The method of claim 5, wherein determining the initial value of the quantity parameter according to the high throughput mode flag information comprises:

determining the initial value of the quantity parameter as a first quantity value, in a case that the value of the high throughput mode flag information is the first value, wherein the first quantity value is an integer equal to or greater than 0 and less than the quantity threshold; and determining the initial value of the quantity parameter according to height and width parameters of the current block, in a case that the value of the high throughput mode flag information is the second value.

7. The method of claim 5, wherein determining the initial value of the quantity parameter according to the high throughput mode flag information comprises:

determining the initial value of the quantity parameter as a second quantity value, in a case that the value of the high throughput mode flag information is the first value; and determining the initial value of the quantity parameter according to height and width parameters of the current block, in a case that the value of the high throughput mode flag information is the second value.

8. The method of claim 5, wherein determining the initial value of the quantity parameter according to the high throughput mode flag information comprises:

determining the initial value of the quantity parameter according to height and width parameters of the current block and a first shift parameter, in a case that the value of the high throughput mode flag information is the first value; and determining the initial value of the quantity parameter according to height and width parameters of the current block and a second shift parameter, in a case that the value of the high throughput mode flag information is the second value.

9. The method of claim 1, wherein the high throughput mode flag information comprises sequence-level flag information and slice-level flag information, and wherein the method further comprises:

determining a value of the slice-level flag information, in a case that a value of the sequence-level flag information is a first value; and determining the coefficients of the current block by using the alignment processing, and/or, determining the coefficients of the current block by using a bypass mode, and/or, determining the coefficients of the current block by using at least one of a context mode or the bypass mode, in a case that the value of the slice-level flag information is the first value.

10. The method of claim 1, wherein decoding the bitstream comprises:

determining decoded information, and wherein determining high throughput mode flag information of the current block comprises:

determining high throughput mode flag information of a current block according to the decoded information.

11. The method of claim 10, wherein the decoded information comprises decoded information of at least one of the following:

first n decoded slices, first n decoded Largest Coding Units (LCUs), first n decoded Coding Tree Units (CTUs), first n decoded Coding Units (CUs), first n decoded Transform Units (TUs), or first n decoded Transform Blocks (TBs), wherein n is an integer greater than 0, wherein the decoded information at least comprises one of the following information: bit rate, coefficients, residuals, or number of bits.

12. The method of claim 11, wherein the second preset condition comprises one of the following conditions:

the bit rate being equal to or greater than a first threshold, a sum of absolute values of the coefficients being equal to or greater than a second threshold, an average value of the absolute values of the coefficients being equal to or greater than a third threshold, a sum of absolute values of the residuals being equal to or greater than a fourth threshold, an average value of the absolute values of the residuals being equal to or greater than a fifth threshold, or the number of bits being equal to or greater than a sixth threshold.

13. The method of claim 10, wherein the coded information is a Rice parameter, and determining the coded information comprises:

determining a value of a first variable; and determining the coded information according to the value of the first variable.

14. The method of claim 13, wherein determining the coded information according to the value of the first variable comprises:

determining that the Rice parameter meets the second preset condition, in a case that the value of the first variable is equal to or greater than a seventh threshold; and determining that the Rice parameter does not meet the second preset condition, in a case that the value of the first variable is less than the seventh threshold.

15. The method of claim 10, wherein the coded information is a Rice parameter, and determining the coded information comprises:

determining a value of a second variable; and determining the coded information according to the value of the second variable, and wherein determining the coded information according to the value of the first variable comprises:

determining that the Rice parameter meets the second preset condition, in a case that the value of the second variable is equal to or greater than an eighth threshold; and determining that the Rice parameter does not meet the second preset condition, in a case that the value of the second variable is less than the eighth threshold.

16. An encoding method, applied to an encoder, comprising:

determining high throughput mode flag information of a current block;

in a case that a value of the high throughput mode flag information is a first value, coding coefficients of the current block by using alignment processing, and generating a bitstream; and in a case that the value of the high throughput mode flag information is a second value, coding the coefficients of the current block without the alignment processing, and generating the bitstream;

wherein the alignment processing is used to align a fractional number of bits being processed to an integer number of bits.

17. The method of claim 16, further comprising:

determining coded information, wherein determining high throughput mode flag information of the current block comprises:

determining high throughput mode flag information of a current block according to the coded information, wherein the coded information comprises decoded information of at least one of the following:

first n decoded slices, first n decoded Largest Coding Units (LCUs), first n decoded Coding Tree Units (CTUs), first n decoded Coding Units (CUs), first n decoded Transform Units (TUs), or first n decoded Transform Blocks (TBs), wherein n is an integer greater than 0, wherein the coded information at least comprises one of the following information: bit rate, coefficients, residuals, or number of bits.

18. A non-transitory computer-readable storage medium, having a computer program and a bitstream stored thereon, wherein the computer program, when executed by a processor, enables the processor to perform the steps of the encoding method of claim 16 to generate the bitstream.

19. A decoder, comprising: a first processor; and a first memory storing instructions executable by the first processor, wherein the first processor, when executing the instructions, is configured to:

decode a bitstream, and determine high throughput mode flag information of a current block;

determine coefficients of the current block by using alignment processing, in a case that a value of the high throughput mode flag information is a first value; and determine the coefficients of the current block without the alignment processing, in a case that the value of the high throughput mode flag information is a second value;

wherein the alignment processing is used to align a fractional number of bits being processed to an integer number of bits.

20. An encoder, comprising: a second processor; and a second memory storing instructions executable by the second processor, wherein the second processor, when executing the instructions, is configured to:

determine high throughput mode flag information of a current block;

in a case that a value of the high throughput mode flag information is a first value, code coefficients of the current block by using alignment processing, and generate a bitstream; and in a case that the value of the high throughput mode flag information is a second value, code the coefficients of the current block without the alignment processing, and generate the bitstream;

wherein the alignment processing is used to align a fractional number of bits being processed to an integer number of bits.

* * * * *